(12) United States Patent
Zhang et al.

(10) Patent No.: US 11,518,042 B2
(45) Date of Patent: Dec. 6, 2022

(54) ROBOTIC ASSISTANT

(71) Applicant: UBTECH ROBOTICS CORP LTD, Shenzhen (CN)

(72) Inventors: Chengkun Zhang, Pasadena, CA (US); Marten Byl, Goleta, CA (US); Muhammed Rasid Pac, Temple, CA (US); Raymond Ma, Pasadena, CA (US); Luis Alfredo Mateos Guzman, Pasadena, CA (US); Won Suk You, Pasadena, CA (US); Huan Tan, Pasadena, CA (US); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 412 days.

(21) Appl. No.: 16/870,903

(22) Filed: May 9, 2020

(65) Prior Publication Data
US 2021/0347059 A1 Nov. 11, 2021

(51) Int. Cl.
| | |
|---|---|
| *B25J 9/00* | (2006.01) |
| *B25J 11/00* | (2006.01) |
| *B25J 5/00* | (2006.01) |
| *B65G 1/02* | (2006.01) |
| *B65G 61/00* | (2006.01) |

(Continued)

(52) U.S. Cl.
CPC ............ *B25J 11/009* (2013.01); *B25J 5/007* (2013.01); *B25J 9/0009* (2013.01); *B25J 9/106* (2013.01); *B25J 9/123* (2013.01); *B25J 9/1697* (2013.01); *B25J 19/0075* (2013.01);

(Continued)

(58) Field of Classification Search
CPC . B25J 5/007; B25J 9/0009; B25J 9/106; B25J 9/123; B25J 9/1697; B25J 11/009; G05D 1/0274
See application file for complete search history.

(56) References Cited

U.S. PATENT DOCUMENTS

| | | | |
|---|---|---|---|
| 2012/0029687 A1* | 2/2012 | Hagen ................... | G07F 11/165 700/218 |
| 2019/0291955 A1* | 9/2019 | Bastian, II ........... | B65G 1/1373 |

(Continued)

FOREIGN PATENT DOCUMENTS

| | | |
|---|---|---|
| CN | 104552230 A | 4/2015 |
| CN | 207071924 U | 3/2018 |

(Continued)

OTHER PUBLICATIONS

ISR for PCT/CN2021/091582.
Written opinions of ISA for PCT/CN2021/091582.

*Primary Examiner* — Dale Moyer

(57) ABSTRACT

A robotic assistant includes a wheeled base, a storage unit including drawers, a foldable arm connected to a top of the storage unit and including an end of arm tooling (EOAT) connected to a distal end of the foldable arm, an elevation mechanism positioned on the wheeled base and used to move the storage unit up and down, and a control system that receives command instructions. In response to the command instructions, the control system is configured to move the wheeled base, open or close the one or more drawers, actuate movement of the foldable arm and the EOAT to pick up and place external objects from/to a determined location, and control the storage unit to move up/down.

20 Claims, 55 Drawing Sheets

(51) Int. Cl.
  *B25J 9/16*      (2006.01)
  *B25J 9/10*      (2006.01)
  *B25J 9/12*      (2006.01)
  *B25J 19/00*     (2006.01)
  *B25J 19/02*     (2006.01)
  *G05D 1/02*      (2020.01)

(52) U.S. Cl.
  CPC ............ *B25J 19/023* (2013.01); *B65G 1/026* (2013.01); *B65G 61/00* (2013.01); *G05D 1/0214* (2013.01)

(56) References Cited

U.S. PATENT DOCUMENTS

| | | | |
|---|---|---|---|
| 2020/0171647 A1* | 6/2020 | Theobald | B25J 13/06 |
| 2020/0172339 A1* | 6/2020 | Theobald | G05D 1/0088 |
| 2021/0387328 A1* | 12/2021 | Hahn | B25J 9/08 |

FOREIGN PATENT DOCUMENTS

| | | |
|---|---|---|
| CN | 207858826 U | 9/2018 |
| CN | CN109352571 A | 2/2019 |

* cited by examiner

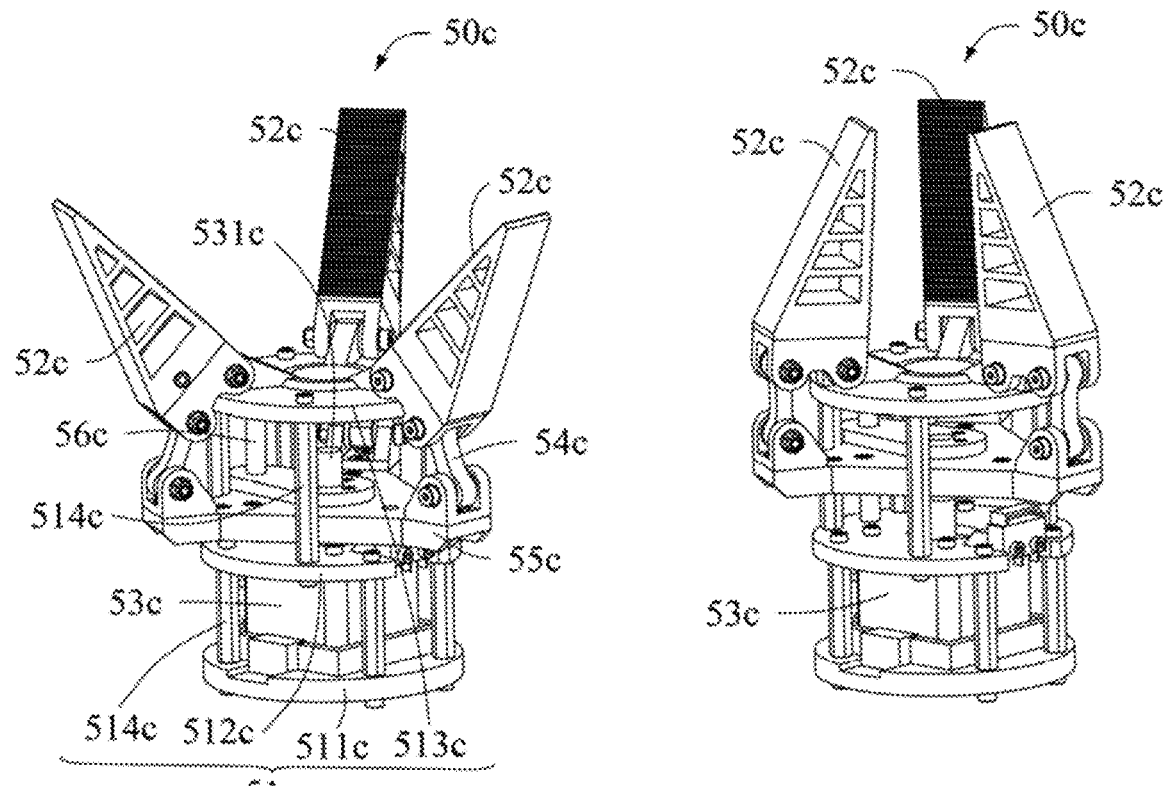
FIG. 16A
FIG. 16B
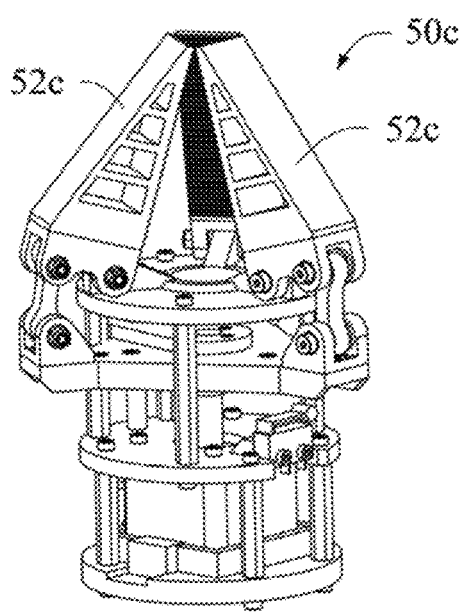
FIG. 16C

ROBOTIC ASSISTANT

BACKGROUND

1. Technical Field

The present disclosure generally relates to robots, and particularly to a smart logistics robotic assistant, which can perform delivery, tracking, and other tasks.

2. Description of Related Art

The huge increase in the global elderly population is accompanied by problems, such as the shortage of health professionals, the reduced quality of elderly care service, and the economic challenges of medical treatment. Recent advances in robotics provide an innovative solution to alleviate these challenges by improving elderly quality of life and prioritizing their dignity and independence. As such, healthcare robots have attracted significant attention in recent years. By providing assistance in tasks, such as monitoring and tracking elderly health, and performing repetitive tasks, the healthcare robots are capable of serving both health professionals and the elderly.

One type of a robotic assistant can be designed to assist humans in performing tasks, such as performing logistics and transportation tasks. For example, robotic assistants, especially in use in the healthcare industry, such as a hospital, typically includes wheels for movement and fixed storage containers/trays, which allows the robotic assistants to deliver objects, such as medicines, equipment, and food to a desired location.

However, because of the fixed nature of the storage containers/trays and absence of attached manipulators, these robotic assistants suffer from lack of reachability, that is, the inability to extend beyond the basic physical footprint of the robotic assistants themselves. Additionally, the non-modular designs of the robotic assistants mean that they can only perform one task and cannot offer end-to-end logistics (e.g., collecting, storing, navigating, distributing) for healthcare facilities, such as elderly care facilities or hospitals. Furthermore, the non-modular designs of the robotic assistants do not allow the repurposing of the platform for different business application scenarios.

Therefore, there is a need to provide a robotic assistant to overcome the above-mentioned problems.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 16A is an isometric view of another EOAT of the robotic assistant according to one embodiment.

FIG. 16B is an isometric view of the EOAT of FIG. 16A.

FIG. 16C is an isometric view of the EOAT of FIG. 16A.

DETAILED DESCRIPTION

Figure 1A:
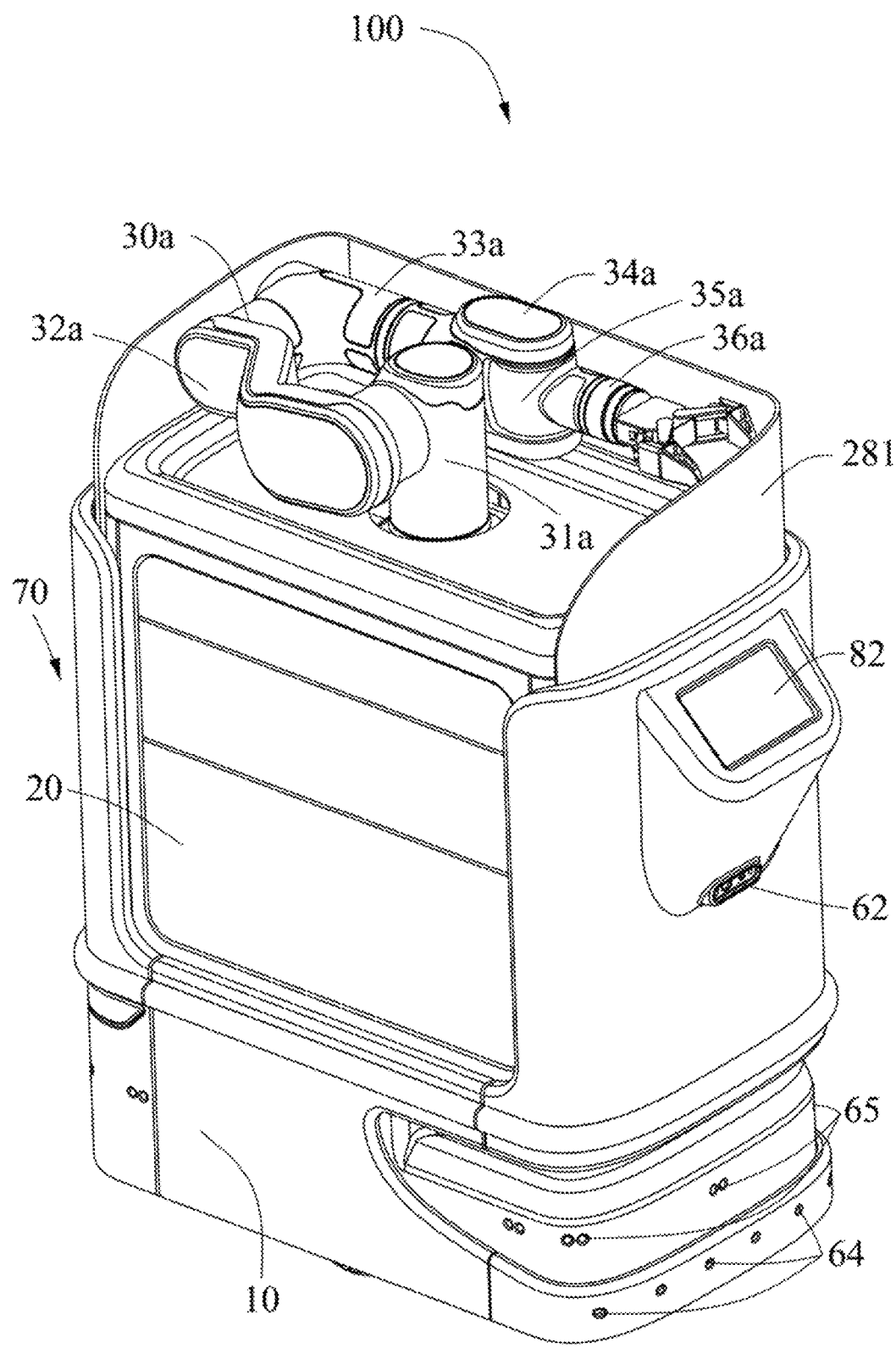
FIG. 1A is an isometric view of a robotic assistant according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 1B:
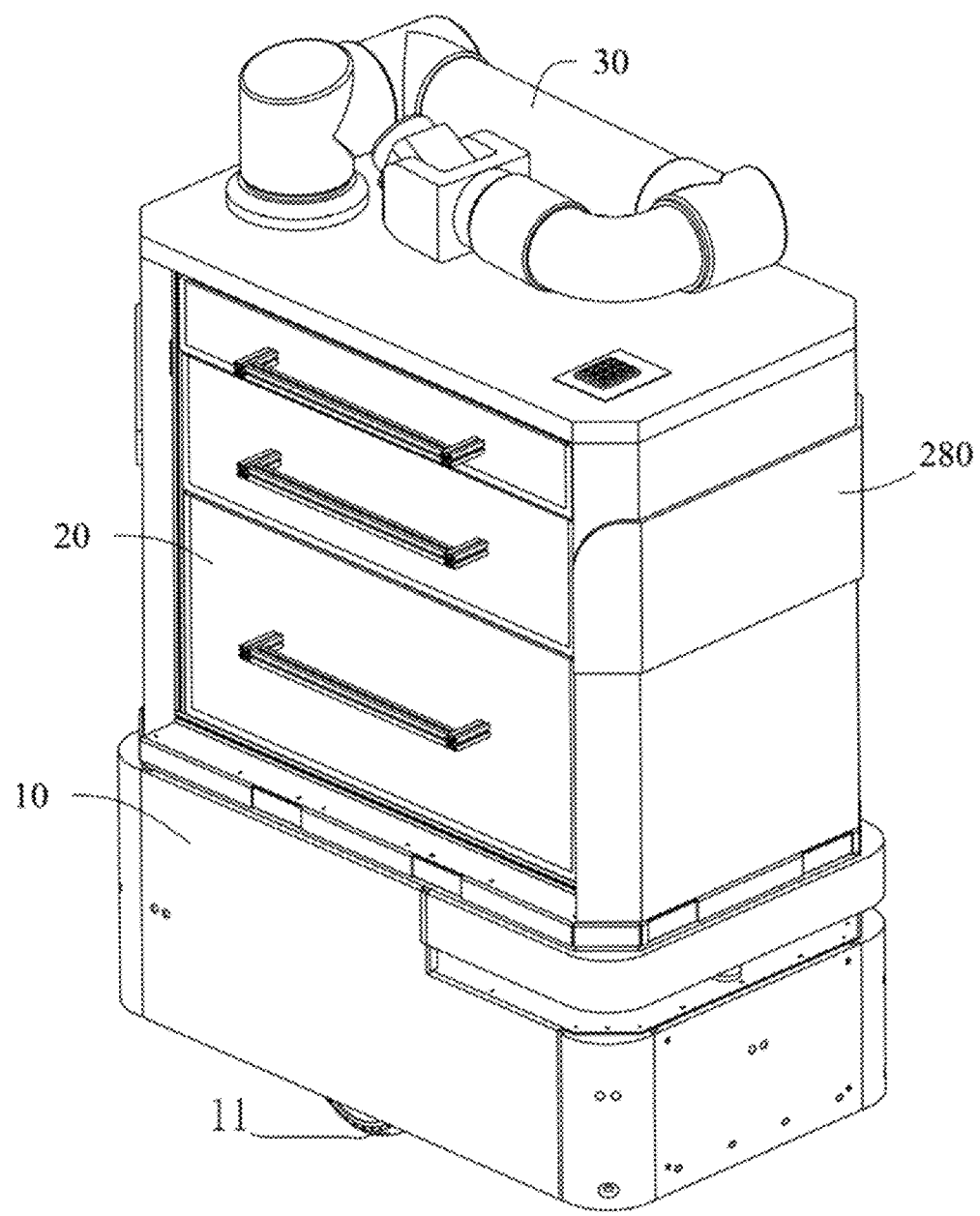
FIG. 1B is an isometric view of a robotic assistant according to another embodiment.
Figure 2:
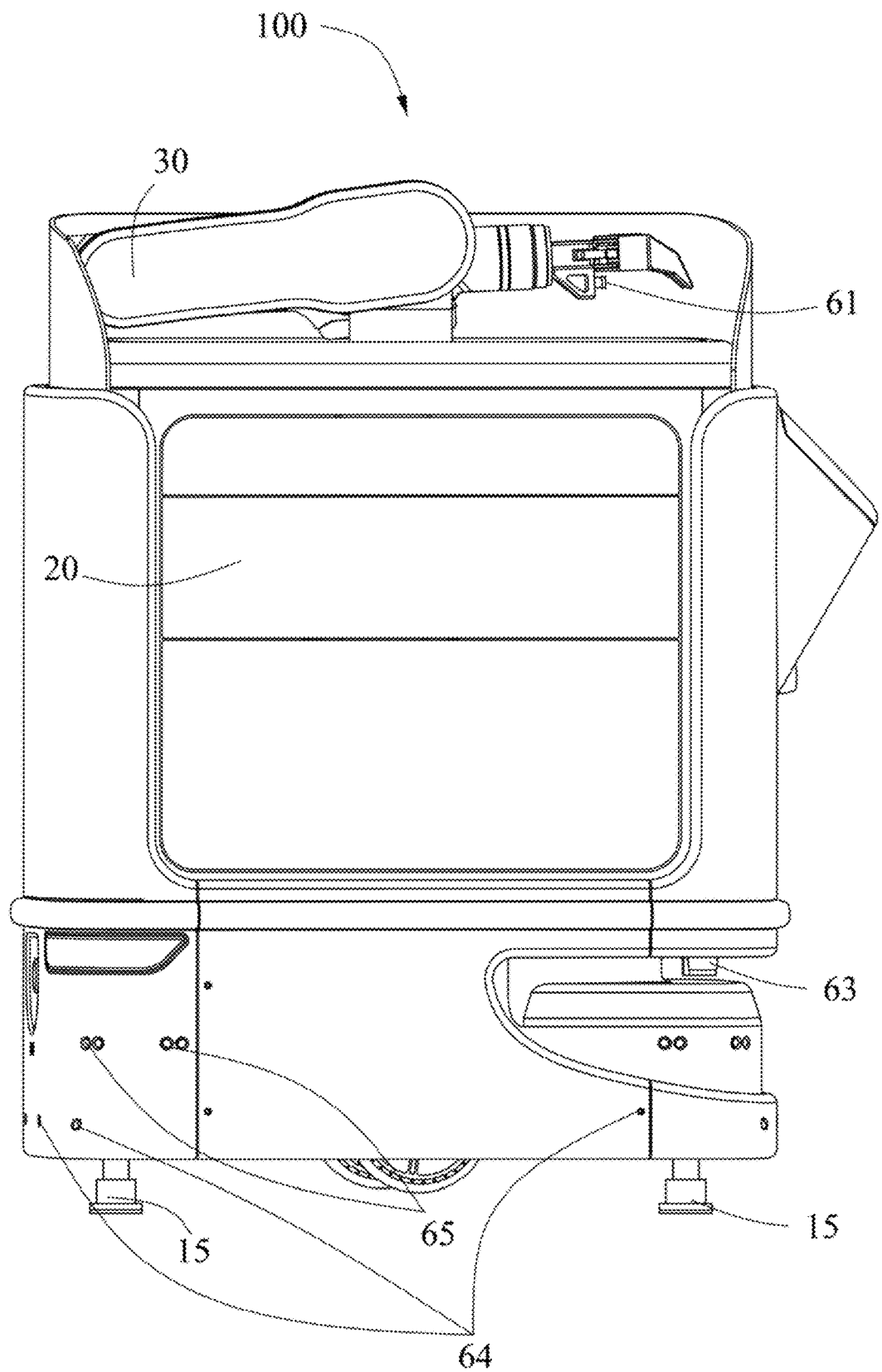
FIG. 2 is a planar view of the robotic assistant of FIG. 1A.

FIG. 1A and FIG. 1B are isometric views of a robotic assistant 100 that employs an elevational and an extended reach mechanism to assist humans in performing tasks, such as logistics and transportation tasks. In one embodiment, the robotic assistant 100 may be employed in facilities, such as a healthcare facility, an elderly care facility, and the like, to aid healthcare professionals in their daily tasks. However, the robotic assistant 100 may also be employed in security/surveillance scenarios. In one exemplary embodiment, the robotic assistant 100 can be employed in assisted living facilities or healthcare facilities to provide an unsupervised end-to-end logistics solution to cater to various delivery and logistics needs, ranging from food to medicines in a timely fashion. The robotic assistant 100 can free healthcare providers from the time-consuming tasks of fetching and delivering objects along with other menial and repetitive errands, so that they can focus on attending to much more important physical and emotional needs of assisted living people or others. However, it should be understood that the robotic assistant 100 may be employed in other facilities, such as warehouses, packaging facilities, schools, and restaurants, etc., depending on the embodiment.

With reference to FIG. 1A to FIG. 3, the robotic assistant 100 includes a wheeled base 10, a storage unit (e.g., drawer mechanism 20 comprising one or more drawers 21), a foldable arm 30 connected to a top of the drawer mechanism 20, an elevation mechanism 40, sensors 62, 63, 64, and 65, and a control system 70 that receives command instructions from a host computer, and a graphic user interface (GUI) displayed on display 82 to allow operators to directly control the robotic assistant. In response to the command instructions, the control system 70 controls movement of the wheeled base 10, the foldable arm 30, and the elevation mechanism 40, and/or other mechanical or software aspects of the robotic assistant 100. In other embodiments, the storage unit may include open shelves. In another embodiment, the foldable arm 30 may be omitted, or replaced with a manipulator of different configuration of different degrees-of-freedom.

The wheeled base 10 provides a movement mechanism for the robotic assistant 100 to go from location to location.

In one embodiment, the wheeled base 10 includes two differentially driven wheel mechanisms 11 and one or more other wheels. The driven wheel mechanisms 11 allow for movement of the wheeled base 10 along a determined path, while the one or more other wheels allow for balance and stability of the wheeled base 10. A suspension system for the wheeled base 10 allows for smoother traveling over small gaps, carpet, mats, and imperfections of a floor. Additionally, use of the wheeled base 10 allows for the robotic assistant 100 to traverse various floors of assisted living facilities via entering and exiting of an elevator. The one or more other wheels may be castor wheels or omni-directional driving wheels. Further description of the wheeled base 10 is provided below.

Figure 3:
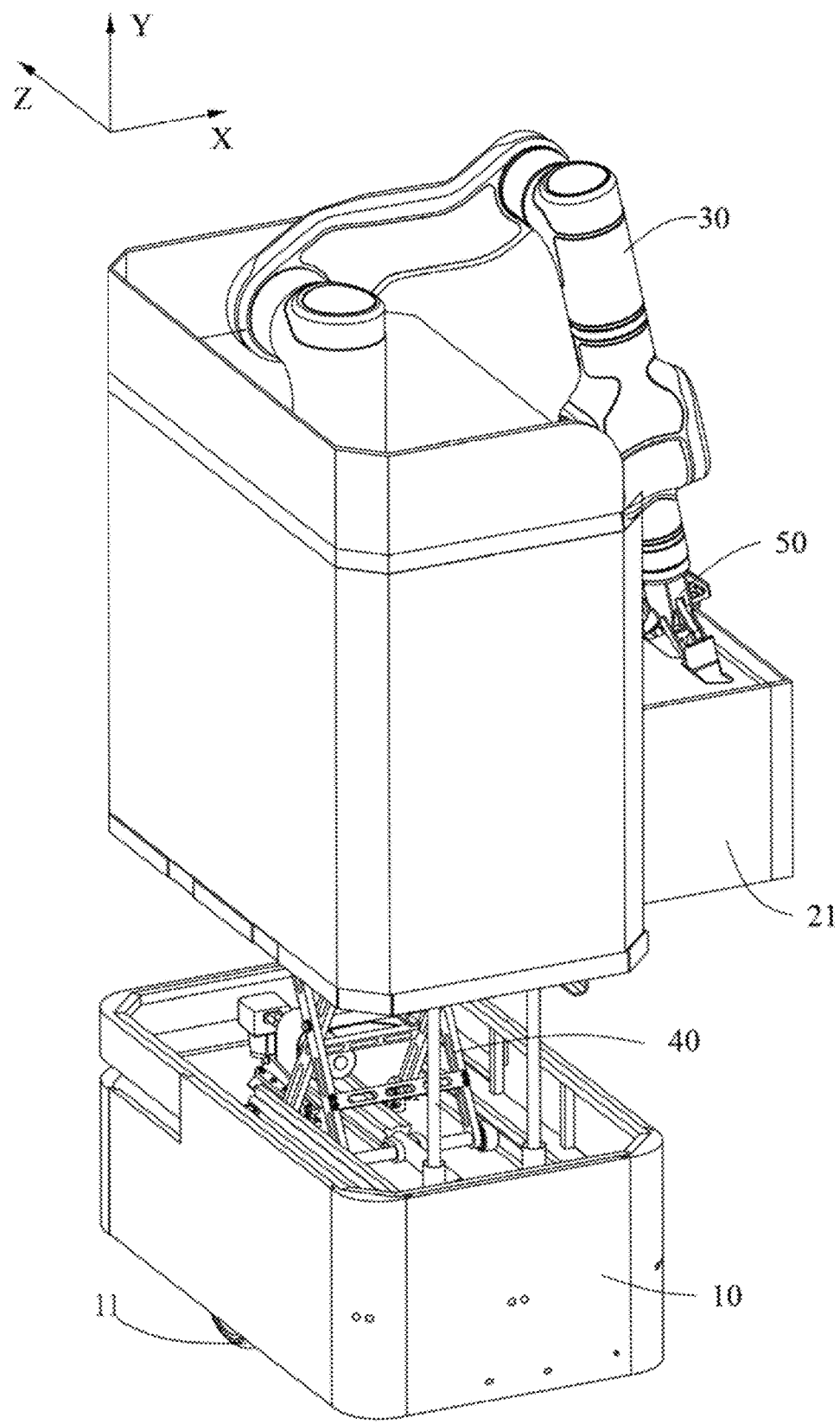
FIG. 3 is an isometric view of the robotic assistant of FIG. 1A in an elevated state.

The storage unit includes the drawer mechanism 20 that is a platform for one or more drawers 21. The drawers 21, via actuation of the drawer mechanism 20, can be in an open state and a closed state. In one embodiment, prescription medicines, needles, and surgical equipment may be stored in the drawers 21. The one or more drawers 21 may be stacked on top of each other in a vertical direction (e.g., along the y-axis as shown in FIG. 3), to save valuable space and/or in a horizontal direction (e.g., along the x-axis as shown in FIG. 3). Each drawer 21 may be opened individually or in combination. In one example, the drawers 21 can be locked and only unlocked and opened by an authorized healthcare professional and/or when the robotic assistant 100 delivers one or more goods to designated location and/or authorized personnel. It should be note that the number and configuration of the drawers 21 are not limited and can change according to actual needs. For example, the drawers 21 may be in the form of open shelves when the robotic assistant 100 is in use in a restaurant. In this example, food items, such as plates, trays, and cups may be placed onto the open shelves and removed quickly and easily. The open shelves may be stacked in a vertical and/or horizontal direction. Alternatively, the drawers 21 may be in the form of a closed or semi-closed housing having a depth, height, length, and width.

The foldable arm 30 is connected to a top of the drawer mechanism 20 and includes an end of arm tooling (EOAT) 50 or EOAT robotic gripper at a distal end of the foldable arm 30. Via actuation of the foldable arm 30, the foldable arm 30 can extend into an open position or a folded position. In the folded position, the foldable arm 30 can be actuated to fold in a flat state or substantially flat state on top of the drawer mechanism 20. A visor or guard, which may be made of clear or translucent plastic/polycarbonate or any other materials, may be used to obscure and/or protect the arm 30. When the foldable arm 30 is in an operation mode, the visor/guard can be automatically retracted to increase the working space of the foldable arm 30. Additionally, this foldable arm 30 together with the elevation mechanism 40 allows the robotic assistant 100 to have an extended reach mechanism that extends beyond the basic physical footprint of the robotic assistant 100. The EOAT 50 is provided at a distal end of the foldable arm 30 and can grasp various objects, such as prescription medicines, gloves, or water bottles. The foldable arm 30 and EOAT 50 may be used to grasp objects on a shelf and deposit those objects into the drawers 21. Later, the foldable arm 30 and EOAT 50 are configured to reach into the drawers 21, retrieve the objects, and deliver them to a different shelf, table, or into hands of a healthcare professional or a patient. The foldable arm 30 and EOAT 50 are also configured to place objects into empty drawers 21 and empty shelves. Further details are provided below. The EOAT 50 can be akin to a human hand, to further personify the robotic assistant 100.

The elevation mechanism 40 is connected between the wheeled base 10 and the drawer mechanism 20. Via actuation of the elevation mechanism 40, the drawer mechanism 20 can move up and down between a retracted position (see FIG. 1A) and an extended position (see FIG. 3). In the retracted position, the elevation mechanism 40 enables the robotic assistant 100 to have a limited height, which facilitates stability during movement and travel of the robotic assistant 100. In the extended position, the elevation mechanism 40 enables the foldable arm 30 to have increased reachability in the vertical direction. The elevation mechanism 40 can be actuated to adjust the robotic assistant 100 to a comfortable height for elderly people who might be lying in the bed, sitting in the wheelchair, or standing. Further description of the elevation mechanism 40 is provided below. In the case the arm guard is stationary, the elevation mechanism 40 allows the base of the foldable arm 30 to be even with the top rim of the arm guard, such that the foldable arm 30 has maximum working space. In an alternative embodiment, the arm guard 281 can be fully retracted to yield maximum operation space for the foldable arm 30 without modulating the height of the elevation mechanism 40.

The sensors enable the robotic assistant 100 to perceive an environment so that the robotic assistant 100 can perform tasks. In one embodiment, the sensors include ranging sensors that require no physical contact with objects being detected. They allow the robotic assistant 100 to perceive an obstacle without actually having to come into contact with it. The ranging sensors may include infrared (IR) sensors 64, ultrasonic sensors 65, one or more light detection and ranging (LiDAR) sensors 63, near field communication (NFC), and RFID sensors/readers. In one embodiment, the sensors may include inertial measurement unit (IMU) sensors and a camera 62. Each IMU sensor 66 incorporates at least one accelerometer and at least one gyroscope. The one or more LiDAR sensors 63 are used to create environment map. In combination with the IMU sensors 66, the LiDAR sensors 63 are used to determine a real-time position of the robotic assistant 100 in the environment map. Data from the ranging sensors and the camera 62 are used to detect obstacles, such as equipment or people, during movement of the robotic assistant 100. The robotic assistant 100 can thus move autonomously along a determined path. These sensors can be positioned along the wheeled base 10 or other positions of the robotic assistant 100, such as being on the foldable arm 30 or EOAT 50. Further description of the sensors is provided below.

Figure 4:
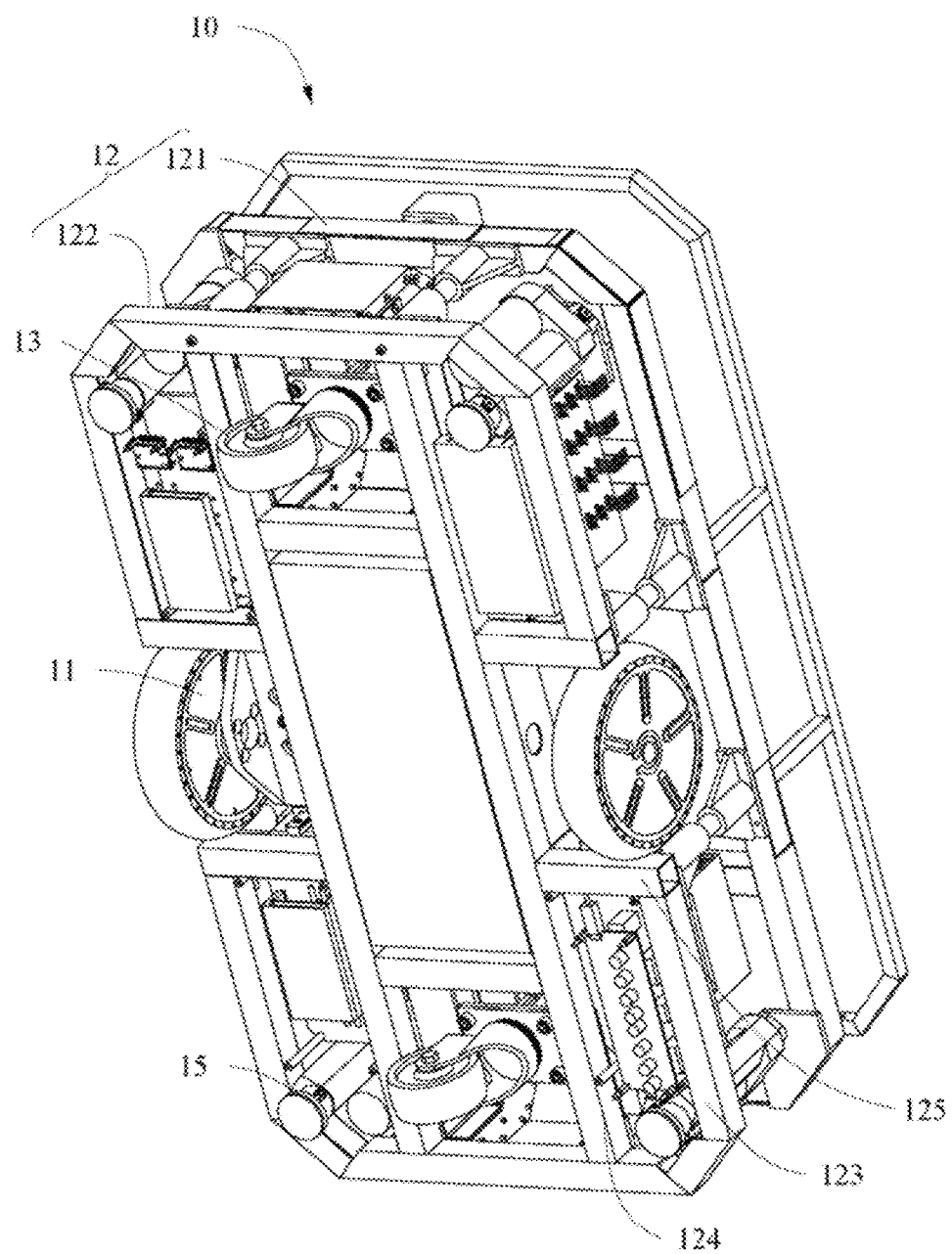
FIG. 4 is an isometric view of a wheeled base of the robotic assistant of FIG. 1A.
Figure 10A:
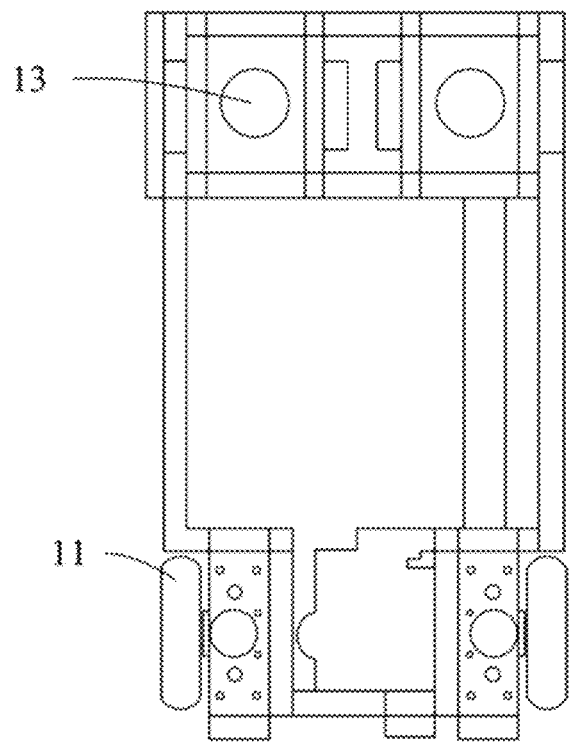
FIG. 10A shows a schematic view of a wheeled base including driven wheel mechanisms and caster wheels according to one embodiment.
Figure 10B:
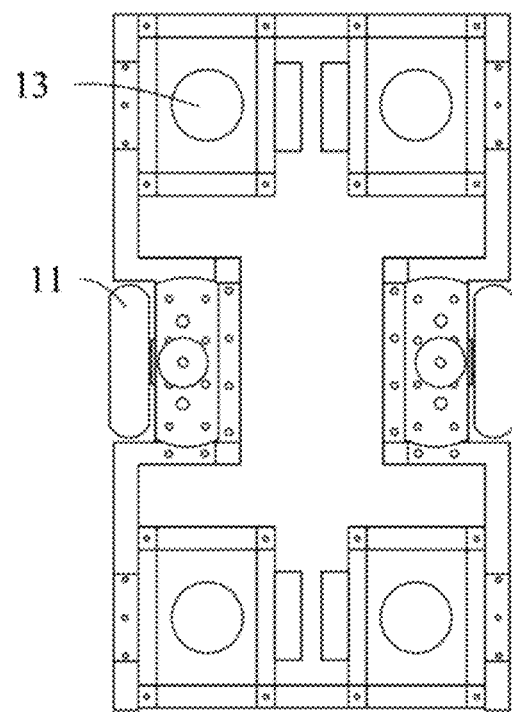
FIG. 10B shows a schematic view of an alternative wheeled base including two driven wheel mechanisms and four caster wheels that are arranged at four corners of the wheeled base according to one embodiment.

The control system 70 is electronically connected to the wheeled base 10, the drawer mechanism 20, the foldable arm 30, the elevation mechanism 40, and the sensors, and is configured to receive command instructions to control the robotic assistant 100 to perform tasks. The command instructions can be received from the control system 70 in response to movement/action of the robotic assistant, or the control system 70 can receive command instructions from a host computer either wirelessly or through a wired connection, or through the GUI on the display 82. In response to the command instructions, the control system 70 controls movement of the wheeled base 10, opens or closes the one or more drawers 21, actuates movement of the foldable arm 30 and the EOAT 50 to pick up and place external objects from/to a determined location, and controls the drawer mechanism 20 to actuate the one or more drawers 21. Further description of the control system 70 is provided below. The determined location may be a location within the one or more drawers when fully opened The wheeled base 10 is a differential drive platform, in one example. With reference to FIG. 4, in one embodiment, the wheeled base 10 includes two independently actuated driven wheel mechanisms 11 and two castor wheel mechanisms 13. The two driven wheel mechanisms 11 are spaced apart from each other and arranged at opposite sides of the wheeled base 100, with their rotation axes aligned with each other and extending along a widthwise direction of the wheeled base 10. The two castor wheel mechanisms 13 are respectively arranged adjacent to opposite ends in the lengthwise direction of the wheeled base 10. It should be noted that the number and arrangement of the driven wheel mechanisms 11 and castor wheel mechanisms 13 may change according to actual needs. For example, in an alternative embodiment as shown in FIG. 10A, two driven wheel mechanisms 11 and two castor wheel mechanisms 13 may be respectively arranged at four corners of the wheeled base 10. In yet an alternative embodiment as shown in FIG. 10B, two driven wheel mechanisms 11 may be arranged in a way similar to one embodiment of FIG. 4, and four castor wheel mechanisms 13 may be respectively arranged at four corners of the wheeled base 10.

Figure 5:
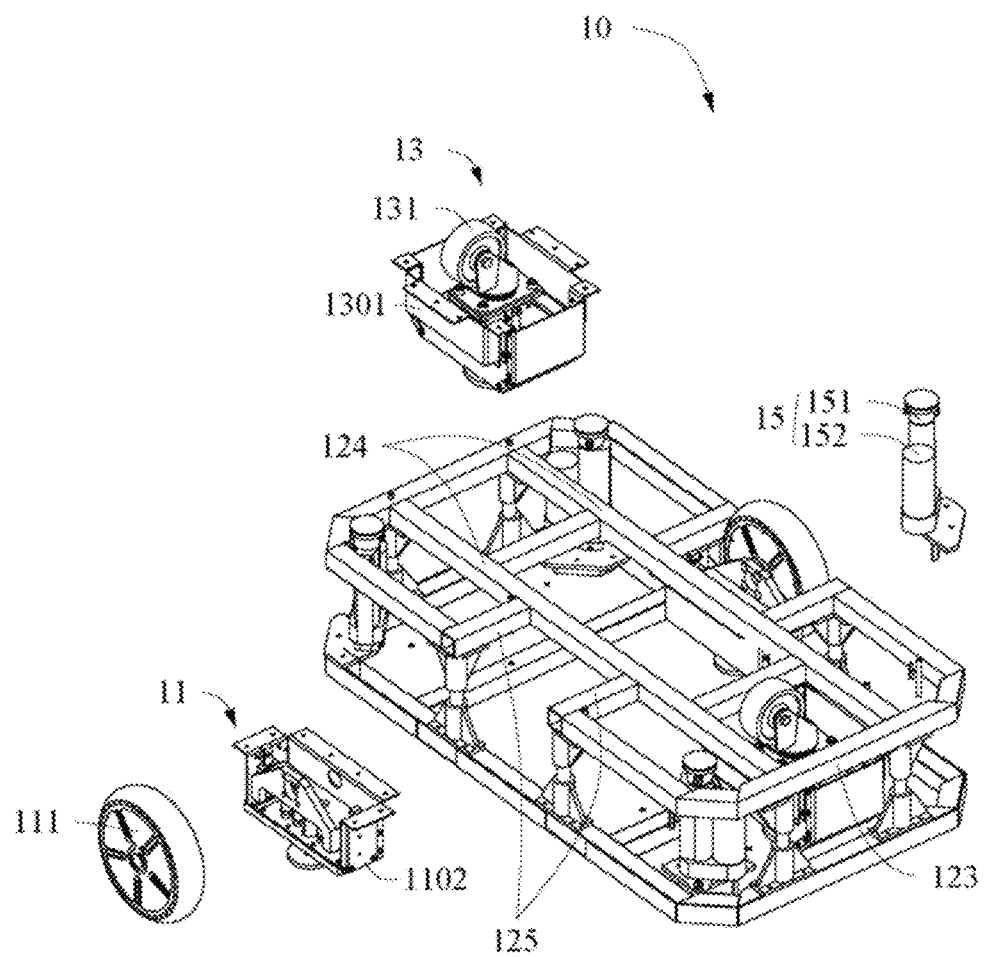
FIG. 5 is a semi-exploded view of the wheeled base of FIG. 4, viewed from a different perspective.

With reference to FIGS. 4 and 5, in one embodiment, the wheeled base 10 includes a base body 12 including a top member 121 and a bottom member 122 that are spaced apart from and connected to each other. In one embodiment, the top member 121 is in the form a rectangular frame and includes a number of bars that are connected to one another. The bottom member 122 includes a number of outer bars 123 that are connected to one another, two inner bars 124, and four connection bars 125. The two inner bars 124 are received in the space defined by the outer bars 123, and extend along a lengthwise direction of the base body 12. Opposite ends of each inner bar 124 are respectively connected to the outer bars 123 at opposite end of the base body 12. A first pair of the connection bars 125 are connected to one inner bar 124 and the outer bars 123 at one side of the base body 12, which defines a space to receive one driven wheel mechanism 11. A second pair of the connection bars 125 are connected to the other inner bar 124 and the outer bars 123 at the opposite side of the base body 12, which define a space to receive the other driven wheel mechanism 11. Of course, it should be understood that the connection bars 125 provide support and placement and number of them can be adjusted according to actual needs.

In one embodiment, one driven wheel mechanism 11 is connected to the first pair of connection bars 125 and one inner bar 124, and another driven wheel mechanism 11 is connected to the second pair of connection bars 125 and the other inner bar 124. Caster wheels 13 are connected to the inner bars 124 and located adjacent to opposite longitudinal ends of the base body 12.

Figure 6:
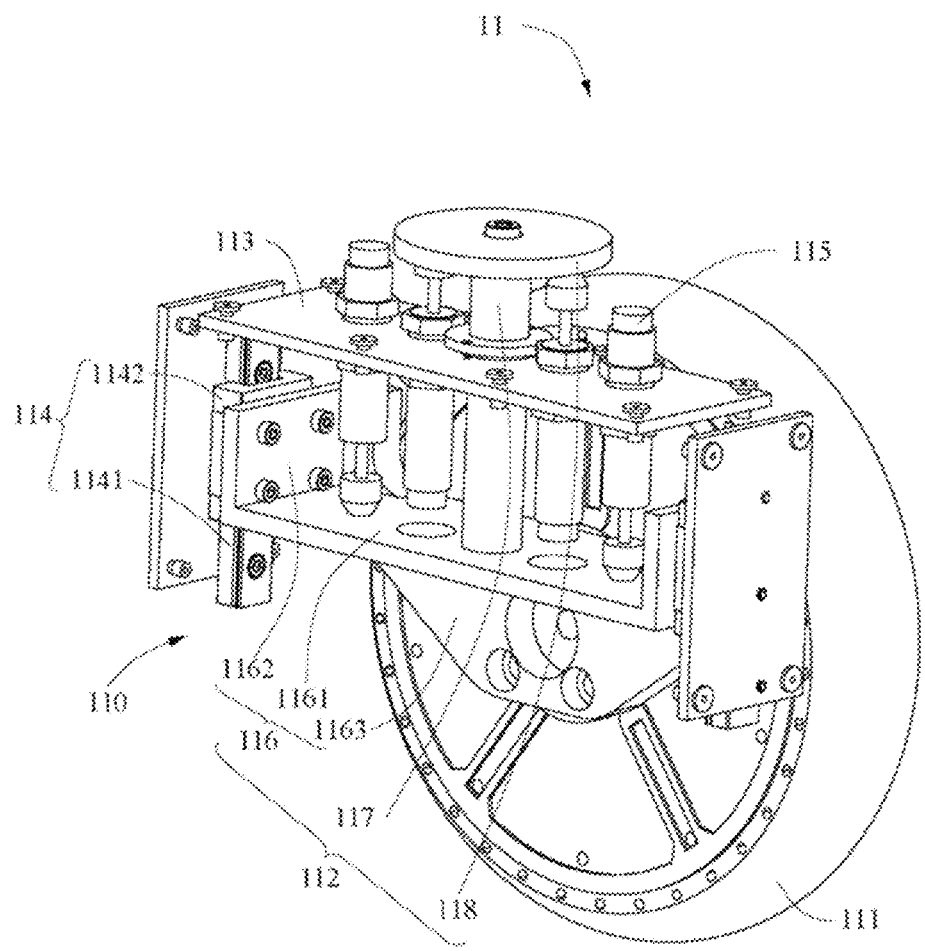
FIG. 6 is an isometric view of a driven wheel mechanism of the wheeled base of FIG. 4.

With reference to FIGS. 5 and 6, in one embodiment, each driven wheel mechanism 11 includes a spring and damper suspension mechanism 110, and a wheel 1 that is connected to the suspension mechanism 110. In one embodiment, a motor can be arranged within the wheel 111 and configured to drive the wheel 111 to rotate. The suspension mechanism 110 gives each wheel 111 the freedom to slightly move up and down with respect to the base body 12, which enables smooth travelling over a gap between the floor and the elevator as well as other small bumps or gaps. In one embodiment, the suspension mechanism 110 includes a housing 1102 fixed to a pair of connection bars 125 and one inner bar 124, a fixed member 113 fixed to the housing 1102, a slidable member 112, two linear slide bearings 114 that enable the slidable member 112 to move up and down with respect to the fixed member 113, and a number of dampers 115 fixed to the fixed member 113. In another embodiment, damping performance can be achieved by replacing the driving wheels with ones with pneumatic tires or modulating tire materials of the driving wheels.

With reference to FIGS. 5 and 6, the housing 1102 is a structure that receives components of the suspension mechanism 110. In one embodiment, the fixed member 113 is a flat plate and substantially horizontal when fixed to the housing 1102. The slidable member 112 includes a main body 116, a cap 118, and a post 117 having opposite ends respectively fixed to the main body 116 and the cap 118. In one embodiment, the main body 116 is connected to the housing 11 via the linear slide bearings 114. The main body 116 includes a base 1161, two sidewalls 1162 protruding from opposite ends of the base 1161, and a wheel connecting portion 1163 protruding from a lower side of the base 1161. The lower end of the post 117 is fixed to the base 1161. Each slide bearing 114 includes a slide rail 1141 and a slider 1142 that is slidable on the slide rail 1141. The slide rail 1141 is fixed to the housing 1102 and extends in a substantial vertical direction. The sidewalls 1162 are respectively fixed to the sliders 1142, which enables the main body 116 to move together with the sliders 1142 in the substantially vertical direction. The wheel 111 can be fixed to the wheel connecting portion 1163, in one embodiment.

With reference to FIG. 6, the post 117 is substantially perpendicular to the main body 116 and passes through a through hole in the fixed member 113, which allows the post 17 to move together with the main body 116 in the vertical direction. The cap 118 is a flat tab fixed to the top end of the post 117, and the cap 118 and the main body 116 and located at opposite sides of the fixed member 113. The dampers 115 can be internal spring dampers which are well known and will not be described herein. Each includes a hollow tube 1151 and a spring-loaded rod 1152 that is partly received in the tube 1151 and slidable with respect to the tube 1151. The rod 1151 can move into the tube 1151 and compress a spring to absorb shock, and restores to a normal position when pushed by the spring. In one embodiment, four dampers 115 are fixed to the fixed member 113, with the rods 1151 of two dampers 115 abutting against the main body 116 and the rods of the other two dampers 115 abutting against the cap 118. It should be noted that the driven wheel mechanism 11 may further include one or more springs. The springs restore the neutral position in response to ground irregularities, and the dampers 115 smooth motion and to limit resonance effects resulting from movement of the driven wheel mechanisms 11 and springs.

Figure 7:
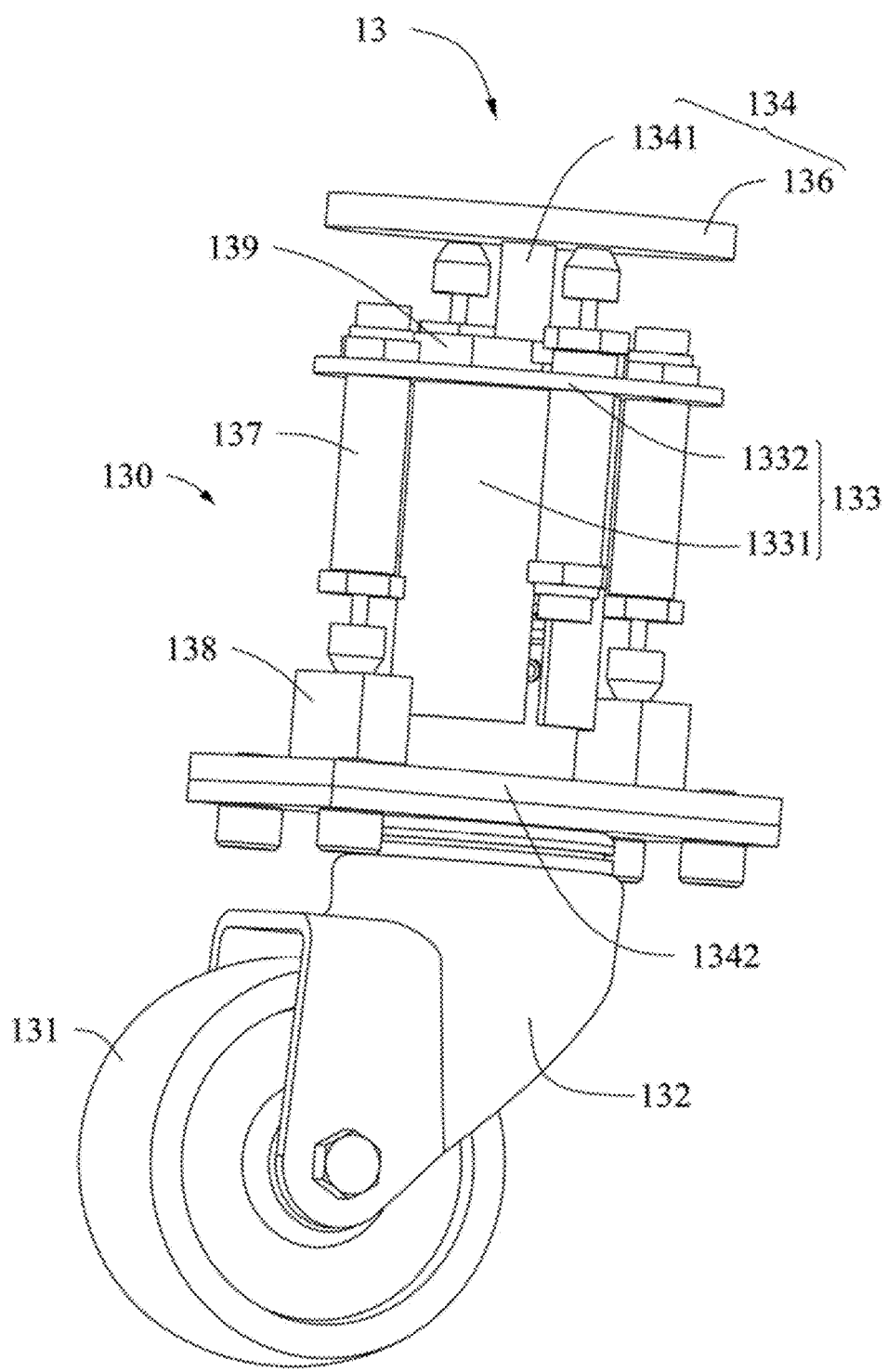
FIG. 7 is an isometric view of a caster wheel of the wheeled base of FIG. 4.

With reference to FIGS. 5 and 7, in one embodiment, each castor wheel mechanism 13 includes a spring and damper suspension mechanism 130, a wheel connection member 132 that is connected to the bottom of the suspension mechanism 130 and rotatable about a substantially vertical axis, and a wheel 131 that is connected to the wheel connection member 132 and rotatable about a substantially horizontal axis. With such arrangement, the wheel 131 has two degrees of freedom, and can thus align itself to the direction of travel.

With reference to FIGS. 5 and 7, in one embodiment, the suspension mechanism 130 includes a housing 1301 (FIG. 5) that receives other components of the suspension mechanism 130. The suspension mechanism 130 further includes a hollow tube 133, a movable member 134 and a number of dampers 137. The hollow tube 133 includes a tube portion 1331 and a tab 1332 that is formed at the top end of the tube portion 1331 and extends in an axial direction of the tube portion 1331. The tab 1332 is fixed to the housing 1301.

As shown in FIG. 7, the movable member 134 includes a spring-loaded rod 1341 that is connected to and passes through the tube 133, a connection plate 1342 and a tab 136 are respectively connected to opposite ends of the rod 1341. The rod 1341 is slidable in a vertical direction and can be movably connected to the tube portion 1331 through a slide bearing 139. The slide bearing 139 is fixed to the tab 1332 of the tube 133. The connection plate 1342 is connected to the wheel connection member 132. The rod 1341 can move with respect to the tube 133 and compress a spring to absorb shock, and restore to a normal position when pushed by the spring.

In one embodiment, as shown in FIG. 7, four dampers 137 are fixed to the tab 1332 and have the same configuration as the dampers 115. The rods of two dampers 137 abut against the tab 136 and the rods of the other two dampers 137 abut against two blocks 138 protruding from the connection plate 1342 to allow bi-directional damping performance. It should be noted that the two blocks 138 may be omitted and the rods of the other two dampers 137 may directly come into contact with the connection plate 1342. With such arrangement, the dampers 137 can absorb the shocks and vibrations that are inflicted on the wheels 131 by the gap between the floor and the elevator as well as other small bumps or gaps. It should be noted that the suspension mechanism 130 may be modified by using one pair of dampers or one damper to provide a unidirectional damping performance.

Figure 8A:
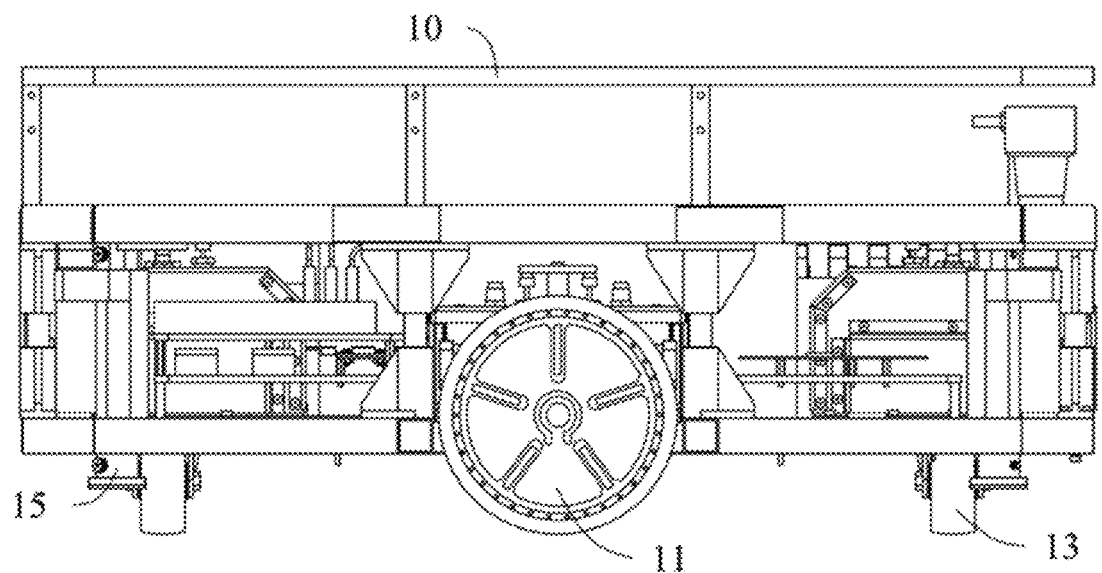
FIG. 8A is a planar view of the wheeled base of FIG. 4, with actuated feet in their retracted positions.
Figure 8B:
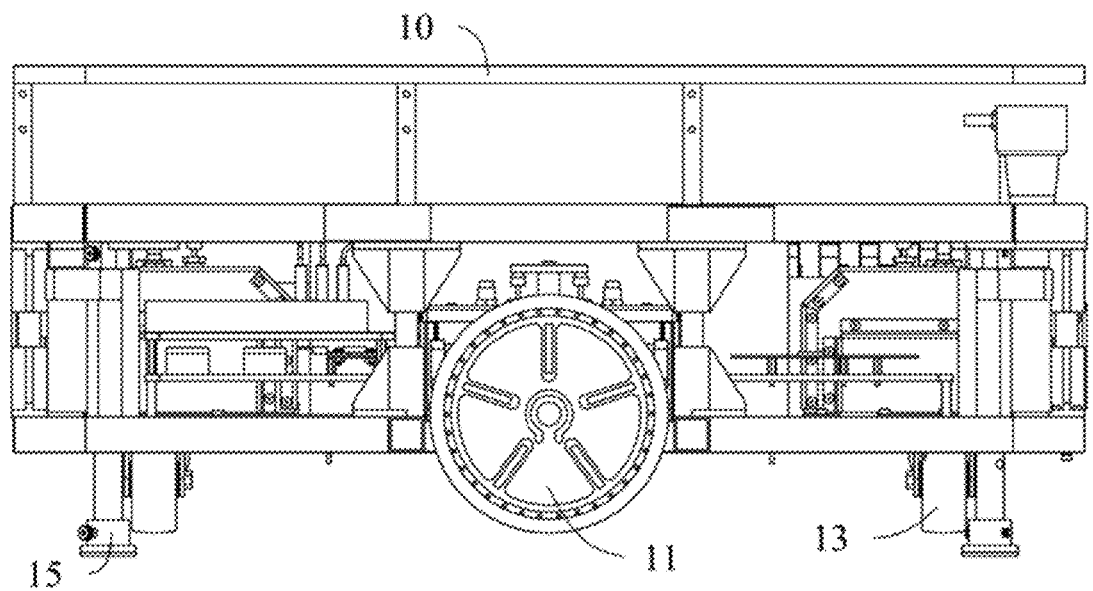
FIG. 8B is a planar view of the wheeled base of FIG. 4, with actuated feet in their extended positions.

With reference to FIGS. 5, 8A and 8B, in one embodiment, the robotic assistant 100 further includes a number of actuated feet 15 connected to the wheeled base 10. In one embodiment, four actuated feet 15 are arranged at four corners of the wheeled base 10. Each actuated foot 15 includes a motor 152 (e.g., a linear motor) fixed to top member 121 of the wheeled base 10 and a foot 151 that is driven by the linear motor and movable between a retracted position (see FIG. 8A) and an extended position (see FIG. 8B). During movement of the wheeled base 10, the feet 151 are controlled to move to their retracted positions such that the wheels 111 and 131 can come into contact with a support surface (e.g., floor). During a manipulation task when the arm 30 is unfolded (in the extended position or the process of extending) and the drawers 21 are opened, the feet 151 are controlled to move to their extended positions and come into contact with the support surface, with the wheels 111 and 131 being out of contact with the support surface to isolate the suspension mechanism from the whole system to allow more accurate grasping and manipulation performance. Since the feet 151 can provide a greater support polygon than the wheels 111 and 131, the robotic assistant 100 can have increased static stability, which is a key factor during the manipulation task. The feet 151 also eliminate the effects of the suspension and provide a stiffer connection to the floor so that the arm base does not shift around as much due to its motion.

Figure 9:
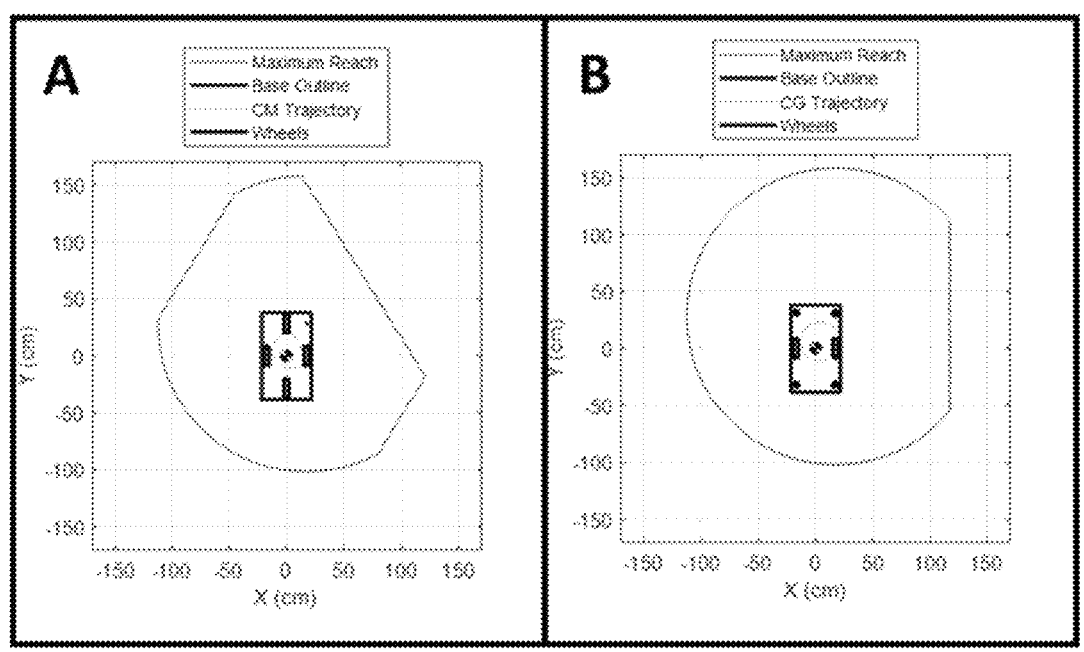
FIG. 9 shows a comparison between the reachability of foldable arms of robotic assistants with and without actuated feet of FIG. 4.

With reference to FIG. 9, the arrangement of the actuated feet 15 can also facilitate the increase of reachability of the foldable arm 30. Specifically, compared to a wheeled base without the actuated feet, the wheeled base 10 including the actuated feet 15 enables the foldable arm 30 to have a significant increase in the stable reachable area, which is represented by the curves (see diagrams A and B of FIG. 9) around the wheeled base without the actuated feet and the wheeled base 10 including the actuated feet 15. It should be noted that the four actuated feet 15 can be omitted in one embodiment when the wheeled base 10 does not include any suspension systems.

Figure 11:
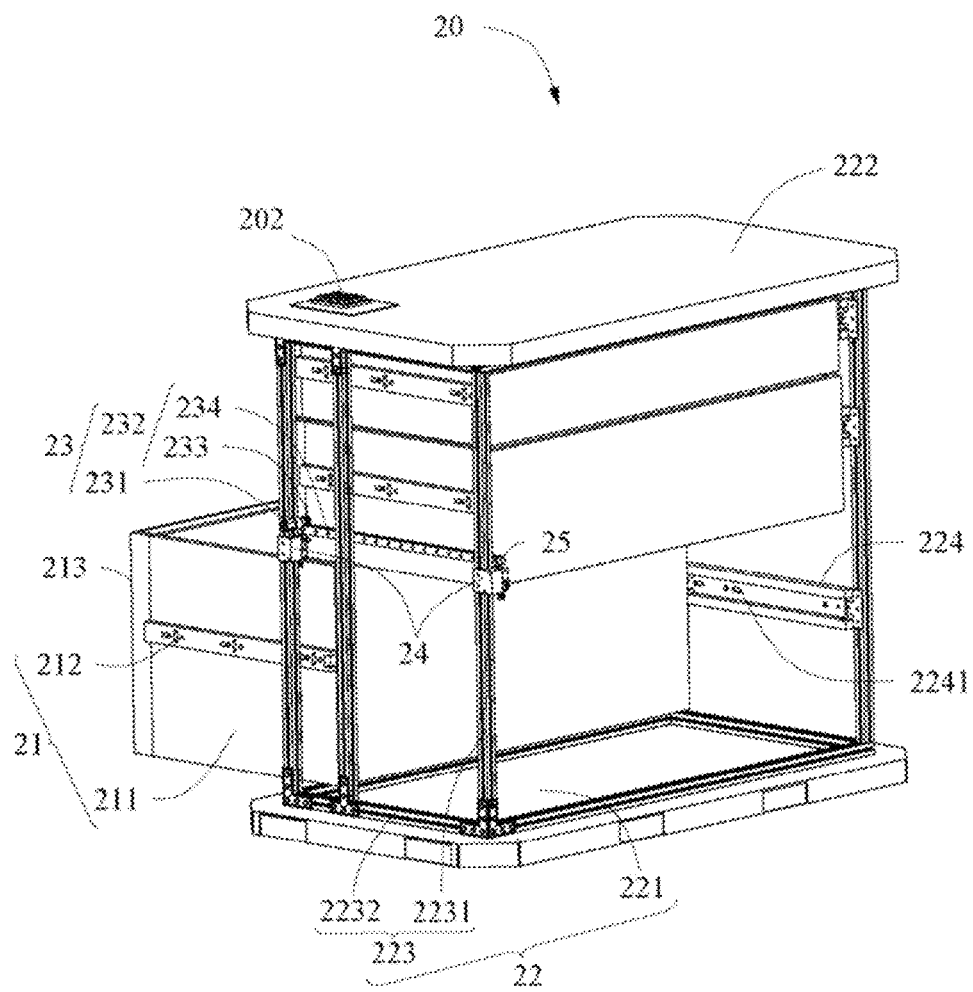
FIG. 11 is an isometric view of a drawer mechanism of the robotic assistant according to one embodiment.

With reference to FIG. 11, the drawer mechanism 20 includes a housing 22 enclosing the drawers 21. In one embodiment, the housing 22 includes a body 223, a bottom plate 221, and a top plate 222. The bottom plate 221 and the top plate 222 are fixed to the bottom and the top of the frame 223, respectively. In one embodiment, the body 223 is a frame that includes a number of substantially vertical bars 2231 that are connected to one another via a number of connection bars 2232. The bottom plate 221 and the top plate 222 are fixed to the connection bars 2232. In an alternative embodiment, the vertical bars 2231 may be directly connected to the bottom plate 221 and the top plate 222. In another embodiment, the housing 22 may be made of bent sheet metals. In yet another embodiment, the body 223 may be a structure frame made of bent sheet metal ribs, which are secured to metal sheets to reduce weight without compromising rigidity.

With reference to FIG. 11, the drawers 21 are slidable with respect to the housing 22. In one embodiment, the housing 22 further includes a number of slide rails 224 that are fixed to the vertical bars 223 to provide support to the drawers 21. Each slide rail 224 extends in a substantial horizontal direction and defines a slot 2241 extending along the lengthwise direction of the slide rail 224. Correspondingly, each drawer 21 includes a main body 211 and two sliders 212 on opposite sides of the main body 211. The sliders 212 extend in a substantially horizontal direction and are respectively fit in and slidable in the slots 2241 of two slide rails 224. With such arrangement, each drawer 21 can slide with respect to the housing 22 between an open position (see FIG. 11) and a closed position (see FIG. 1).

With reference to FIG. 11, in one embodiment, the drawer mechanism 20 further includes a number of driving devices 23 for respectively driving the drawers 21 to slide between their open positions and closed positions. Each driving device 23 includes a motor 231 fixed to one of the vertical bars 2231 and a transmission device 232 for converting rotational motion from the motor 231 into sliding motion. In one embodiment, the transmission device 232 includes an output gear 233 fixed to the output shaft of the motor 231 and a rack 234 fixed to one side of the main body 211 of the drawer 21. The rack 234 is substantially parallel to one slider 212 that is fixed to the same side of the main body 211, and engaged with the output gear 233. When the output gear 233 rotates together with the output shaft of the motor 231, the rack 234 moves and drives a corresponding drawer 21 to slide with respect to the housing 22.

With reference to FIG. 11, in one embodiment, the drawer mechanism 20 further includes two limit switches 24 for each drawer 21. The two limit switches 24 are respectively fixed to two vertical bars 2231 and can come into contact with a block 25 that can be fixed to and slidable together with the rack 234 or the main body 211 of one drawer 21. When one of the limit switches 24 come into contact with the block 25, it sends a signal to a motor controller which in turn stops rotation of the motor 231. The movement of the drawer 21 is thus stopped. With such arrangement, the travel limits of the drawers 21 can be monitored and the motors 231 are de-energized when the travel limits of the drawers 21 have been reached. It should be noted that other type of limit switches which require no physical contact for activation may be used according to actual needs. In another embodiment, the driving motors of the driving devices may include an absolute encoder attached to determine the precise location of the drawer.

In one embodiment, collision detecting sensors, such as force sensitive resistors and tactile sensors, can be disposed on the robotic assistant 100, such as on the front surfaces 213 and inner surfaces 214 of the drawers 21. If a collision is detected (e.g., someone bumping into the robotic assistant 100), the collision detecting sensors can send signals to the motor controller, which in turn, deactivate power to the motors 231, which can prevent the motors 231 from being damaged. Furthermore, other non-contact sensors, such as distance sensors and safety light curtains, can be disposed on the drawers 21 to determine potential collision, such that the drawers 21 open only when there is sufficient space to open. Alternatively, the collision can be detected by sensing the current of the motor and setting a threshold to determine whether a collision has been detected or not during the drawer opening operation. On the other hand, when the drawers 21 are closing, potential blockage caused by human fingers or objects that are not properly inserted in the drawers 21 can be detected. In this case, the motion of the drawers 21 may be stopped.

Figure 12:
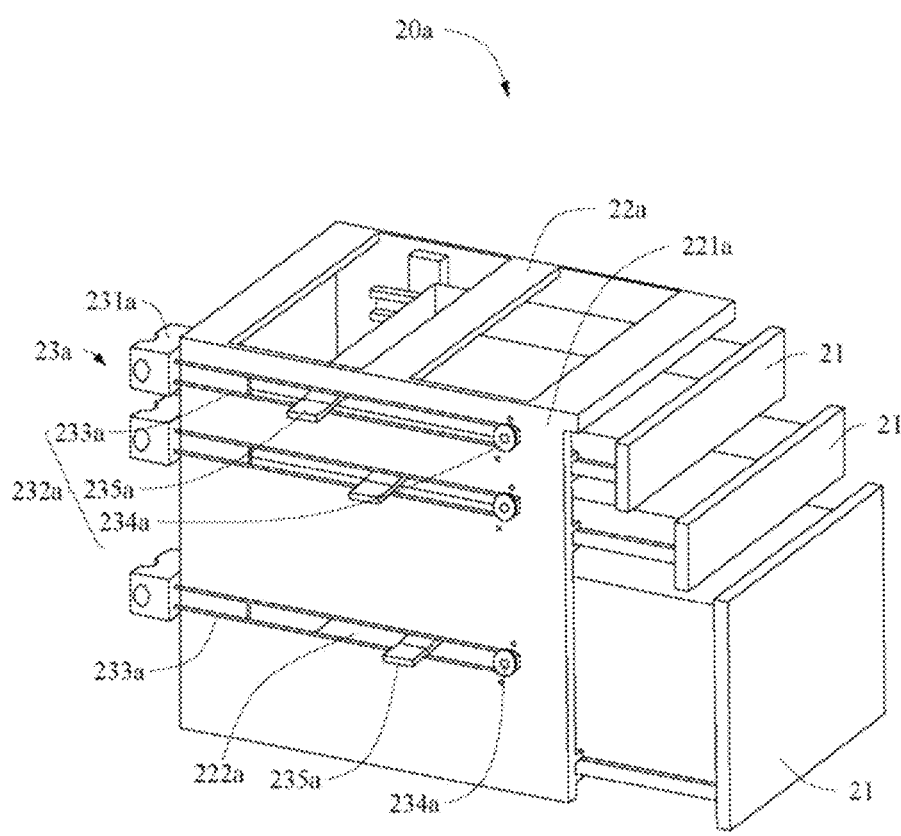
FIG. 12 is an isometric view of the drawer mechanism of the robotic assistant, viewed from a different perspective, according to another embodiment.

FIG. 12 shows a drawer mechanism 20a according to an alternative embodiment, which differs from the drawer mechanism 20 in that the drawer mechanism 20a includes a housing 22a and a driving device 23a. The housing 22a includes two side panels 221a, where the drawers 21 are connected to and slidable with respect to the side panels 221a in a similar mechanism described above. Each driving device 23a includes a motor 231a and a transmission device 232a including a timing belt 233a, a pulley 234a rotatably connected to one side panel 221a, and a rack 235a fixed to one drawer 21 and protruding out of a longitudinal slot 222a defined in the side panel 221a where the pulley 234a is located. The timing belt 233a is arranged around the pulley 234a and an output gear connected to the output shaft of the motor 231a, and engaged with the rack 235a. When the output gear rotates, the timing belt 233a moves and drives the rack 235a to move. The drawer 21a then slides with respect to the housing 22a between an open position and a closed position. It should be noted that the actuation mechanism for moving the drawers 21 is not limited to the embodiments above and can change according to actual needs. For example, linear actuators can be used to move the drawers 21 between an open position and a closed position.

It should be noted that the actuation mechanism for driving the drawers 21 is not limited to the embodiments as shown in FIGS. 11 and 12, and can change according to actual needs. In one example, a piston-like linear actuator can be used to drive each of the drawers 21. The linear actuator can be disposed under the drawer 21, with the drawer 21 fixed to the shaft of the linear actuator. The drawer 21 can slide together with the shaft of the linear actuator. In another example, a stepper motor can be used to drive each of the drawers 21. The stepper motor may include a lead screw and a nut that is slidable along the lead screw. The drawer 21 can be fixed to the nut and slidable along the lead screw when the lead screw rotates. In yet another example, the actuation mechanism may include a motor and a friction wheel fixed to the output shaft of the motor. The friction wheel can be disposed under each drawer 21 and stay in contact with the bottom surface of the drawer 21. When the friction wheel rotates, it can drive the drawer 21 to slide with respect to the housing 22.

In one embodiment, as shown in FIGS. 11 and 12, three drawers 21 are stacked on top of one another in the vertical direction within the housing of the drawer mechanism 20. However, the number and the arrangement of the drawers 21 may be adjusted according to actual needs. For example, the drawer mechanism 20 may include only one drawer 21, or two drawers 21 arranged side by side.

In one embodiment, the drawer mechanism 20 may further include an ID checking module. In one example, the ID checking module may include a keypad 202 (FIG. 11) to allow a passcode to be entered, a card reader, a face recognition camera, or the like. With the ID checking module, the robotic assistant can allow access to the stored items by authorized personnel.

Figure 13:
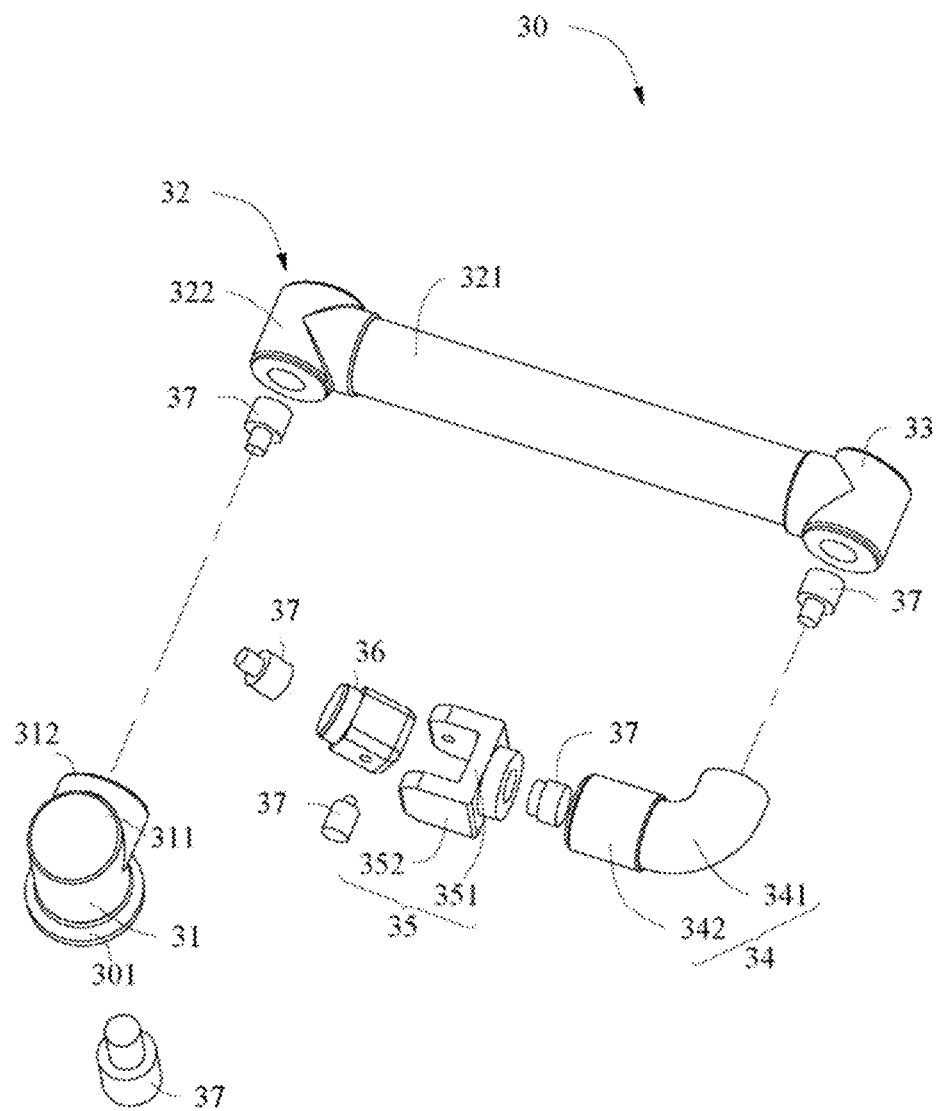
FIG. 13 is an isometric exploded view of a foldable arm of the robotic assistant of FIG. 1B according to one embodiment.

With respect to FIG. 13, in one embodiment, the foldable arm 30 is an articulated arm having single axis revolute type joints. This chain of revolute joints provides great freedom and dexterity in movement of the foldable arm. It should be noted that the configuration of the foldable arm 30 may change according to need. For example, the foldable arm 30 may be a selective compliant articulated robot arm (SCARA) in an alternative embodiment.

In one embodiment, the foldable arm 30 includes a first link 31, a second link 32, a third link 33, a fourth link 34, a fifth link 35, and a sixth link 36. The foldable arm 30 further includes six revolute joints 37 for providing rotary motion to the links above. In one embodiment, the second link 32, a third link 33, a fourth link 34, a fifth link 35, and a sixth link 36 are rotatably connected to one another, in series, through five of the revolute joints 37 ("first revolute joints 37"). The first link 31 is substantially vertical and rotatably connected, via the rest revolute joint ("second revolute joint 37"), to a base 301 fixed to the top of the drawer mechanism 20. In an alternative embodiment, the base 301 may be omitted and the first link 31 may be directly rotatably connected to the top of the drawer mechanism 20. The first link 31 is rotatable with respect to the top of the drawer mechanism 20 about a substantially vertical axis. The first link 31 may be hollow and receives the second revolute joint 37.

In one embodiment, the first link 31 includes a vertical body 311 and a connection portion 312 protruding from a lateral surface of the vertical body 311. The second link 32 is rotatably connected to the connection portion 312 and rotatable about an axis that is substantially perpendicular to the vertical body 311. In one embodiment, the second link 32 includes an elongated body 321 and a connection portion 322 connected to a first end of the elongated body 321. One of the connection portion 312 of the first link 31 and the connection portion 322 of the second link 32 receives one first revolute joint 37 and the other is fixed to the output shaft of the first revolute joint 37, which rotatably connects the second link 32 to the first link 31. In one embodiment, the second link 32 is rotatable about an axis that is substantially perpendicular to the elongated body 321.

In one embodiment, one end of the third link 33 is fixed to a second end of the elongated body 321 of the second link 32 opposite the connection portion 322.

Figure 14A:
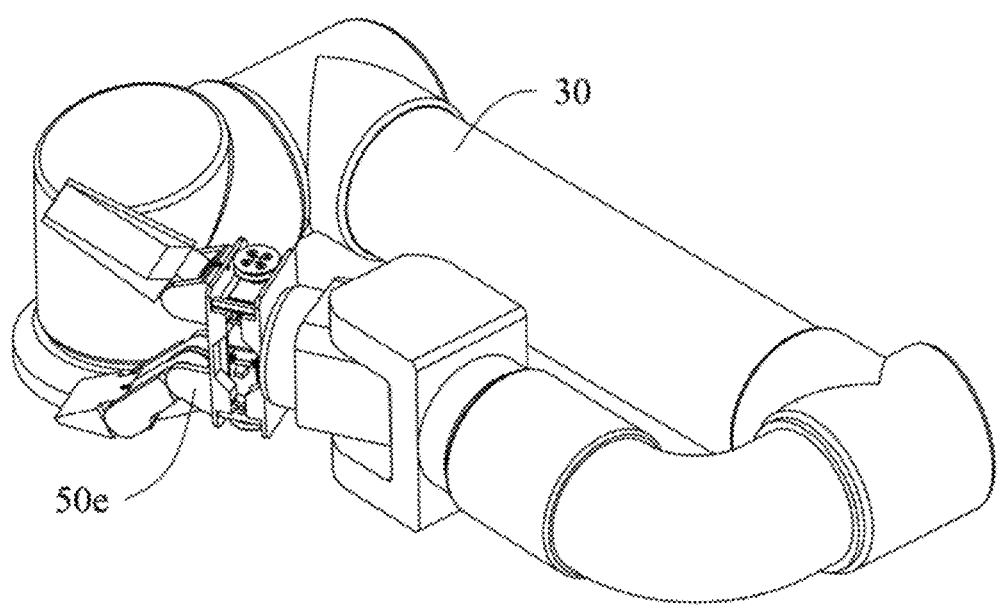
FIG. 14A is an isometric view of the foldable arm of FIG. 13, with an end of arm tooling (EOAT) or EOAT robotic gripper, according to one embodiment, in an original flat state.
Figure 14B:
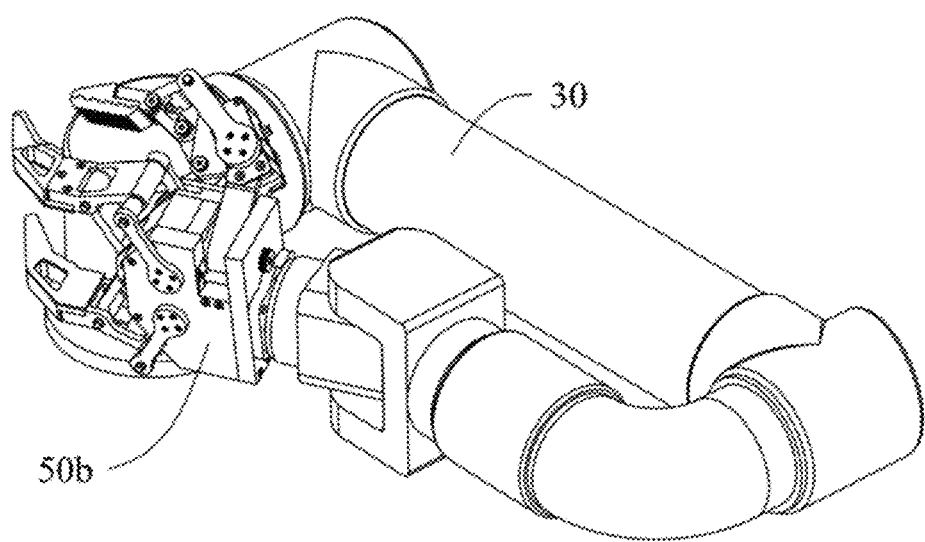
FIG. 14B is an isometric view of the foldable arm of FIG. 13, with the EOAT, according to another embodiment, in an original flat state.
Figure 14C:
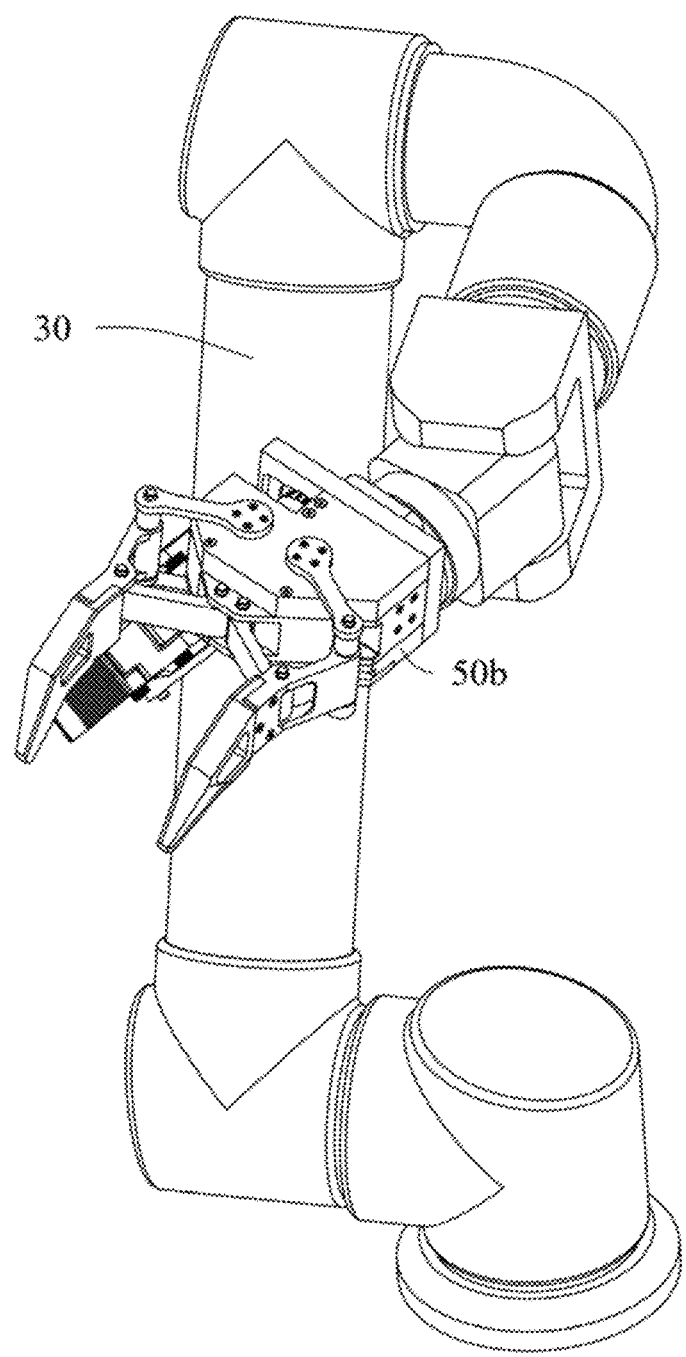
FIG. 14C is an isometric view of the foldable arm of FIG. 14B in an intermediate state.
Figure 14D:
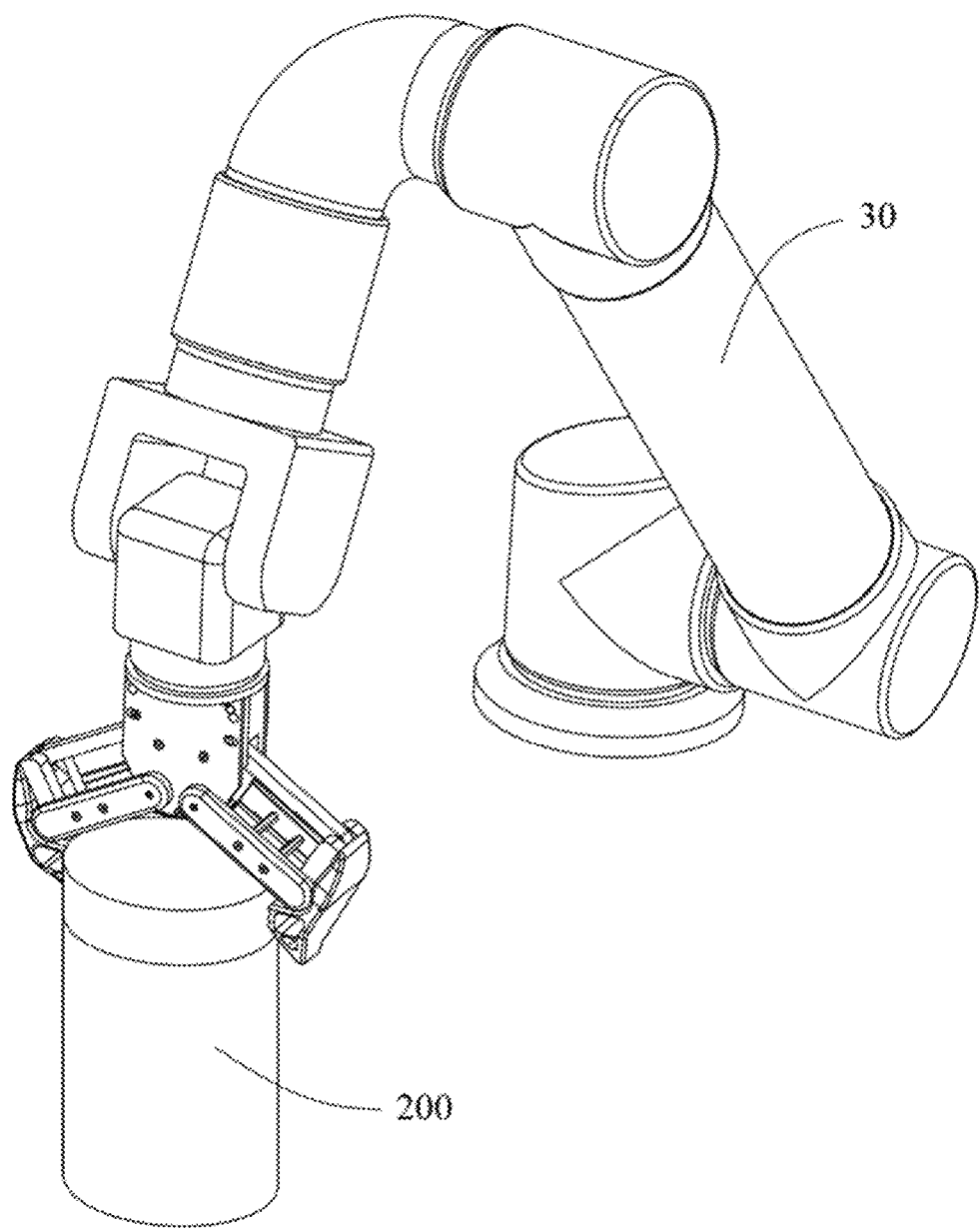
FIG. 14D is an isometric view of the foldable arm of FIG. 14B in a final state when grasping an object.

In one embodiment, the fourth link 34 includes a curved body 341 and a connection portion 342 connected to one end of the curved body 341. One of the third link 33 and the curved body 341 receive one first revolute joint 37 and the other is fixed to the output shaft of the first revolute joint 37, which rotatably connects the fourth link 34 to the third link 33. The fourth link 34 is rotatable about an axis that is substantially perpendicular to the lengthwise direction of the elongated body 321 of the second link 32. As shown in FIGS. 14A and 14B, with the arrangement of the curved body 341, the EOAT, the sixth link 36, the fifth link 35, and the fourth link 34 can be moved to a position adjacent to the first link 31 and the elongated body 321 of the second link 32. As a result, the foldable arm 30, as a whole, can be actuated to fold in a compact and substantially flat state on top of the drawer mechanism 20. This saves valuable real estate in the horizontal and vertical direction. As noted above, a visor/guard may be used to partially or fully enclose the foldable arm 30 when the foldable arm 30 is in the folded position. The visor/guard may be retractable from an open position to a closed position.

In one embodiment, the fifth link 35 is substantially U shaped and includes a base 351 and two sidewalls 352 connected to the base 351. The connection portion 342 of the fourth link 34 receives one first revolute joint 37 and the base 351 is fixed to the output shaft of the first revolute joint 37, which rotatably connects the fifth link 35 to the fourth link 34. The fifth link 35 is rotatable about an axis that is substantially perpendicular to the rotation axis of the fourth link 34.

In one embodiment, the sixth link 36 is partly received in the space defined by the base 351 and the two sidewalls 352. The sixth link 36 is rotatably connected to the sidewalls 352 through one first revolute joint 37. The sixth link 36 is rotatable about an axis that is substantially perpendicular to the rotation axis of the fifth link 35. The sixth link 36 further receives therein one first revolute joint 37 that rotatably connects the EOAT 50 to the sixth link 36. The EOAT 50 is rotatable about an axis that is substantially perpendicular to the rotation axis sixth link 36. The revolute joint 37 connecting the EOAT 50 to the sixth link 36, the revolute joint 37 connecting the sixth link 36 to the fifth link 35, and the revolute 37 connecting the fifth link 35 to the fourth link 34, form a ball joint.

In one embodiment, each revolute joint 37 may be a motor assembly including a motor, an encoder, a motor controller, a transmission device, and a brake. The encoder provides closed loop feedback signals by tracking the speed and/or position of the output shaft of the motor. The transmission device is configured to transmit motion from the motor to one link that is driven by the motor assembly. The brake is configured to lock the link that is driven by the motor assembly in place such that the foldable arm 30 can be locked in place in the case of power failure or other technical glitches. It should be noted that revolute joints for robotic arms are well developed and the configuration of the revolute joints 37 may change according to actual needs.

It should be noted that the number, length, and arrangement of the links and the revolute joints may change according to actual needs. For example, the foldable arm 30 may have more or less freedoms, which requires more or less links and revolute joints. Specifically, the foldable arm 30 includes N links, M first revolute joints, and a second revolute joint. The N links are rotatably connected to one another, in series, through the M first revolute joints, and a first of the N links is rotatably connected to the drawer mechanism 20 through the second revolute joint, where N is a natural number greater than two, and N=M+1.

Each of the revolute joints 37 can be independently controlled, which enables the foldable arm 30 to be in various determined poses during object manipulation tasks. For example, FIGS. 14A to 14D show the change of the state of the foldable arm 30 during a pickup task, including an original compact and substantially flat state (FIGS. 14A and 14B), an intermediate state (FIG. 14C), and a final pose (FIG. 14D) to grasp a determined object 200. In the original compact and substantially flat state, the foldable arm 30 can be even with the rim of the visor/guard, or the guard can be fully retracted. This may allow for a maximum working reachability for the foldable arm 30.

Figure 15A:
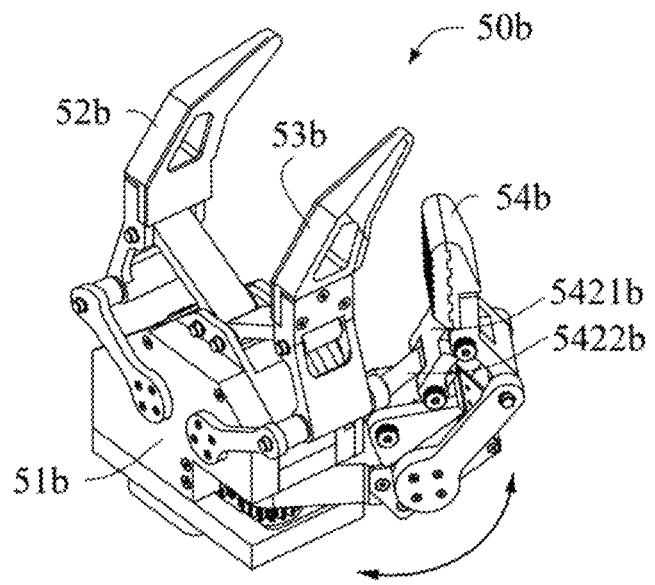
FIG. 15A is an isometric view of another embodiment of an EOAT of the robotic assistant according to one embodiment.
Figure 15C:
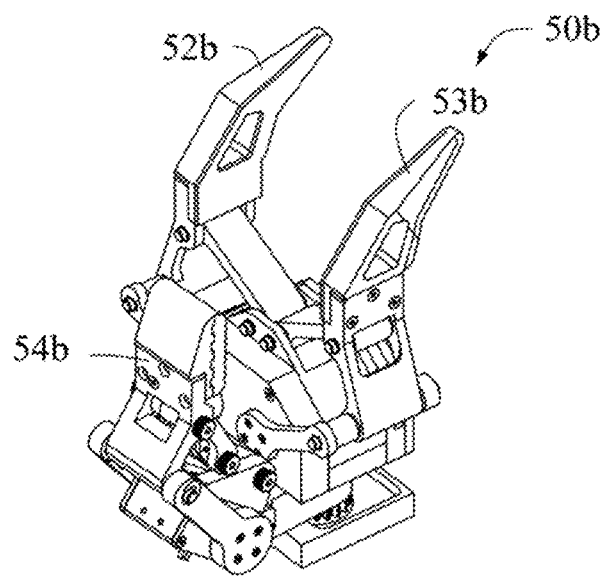
FIG. 15C is an isometric view of the EOAT of FIG. 15A.
Figure 15B:
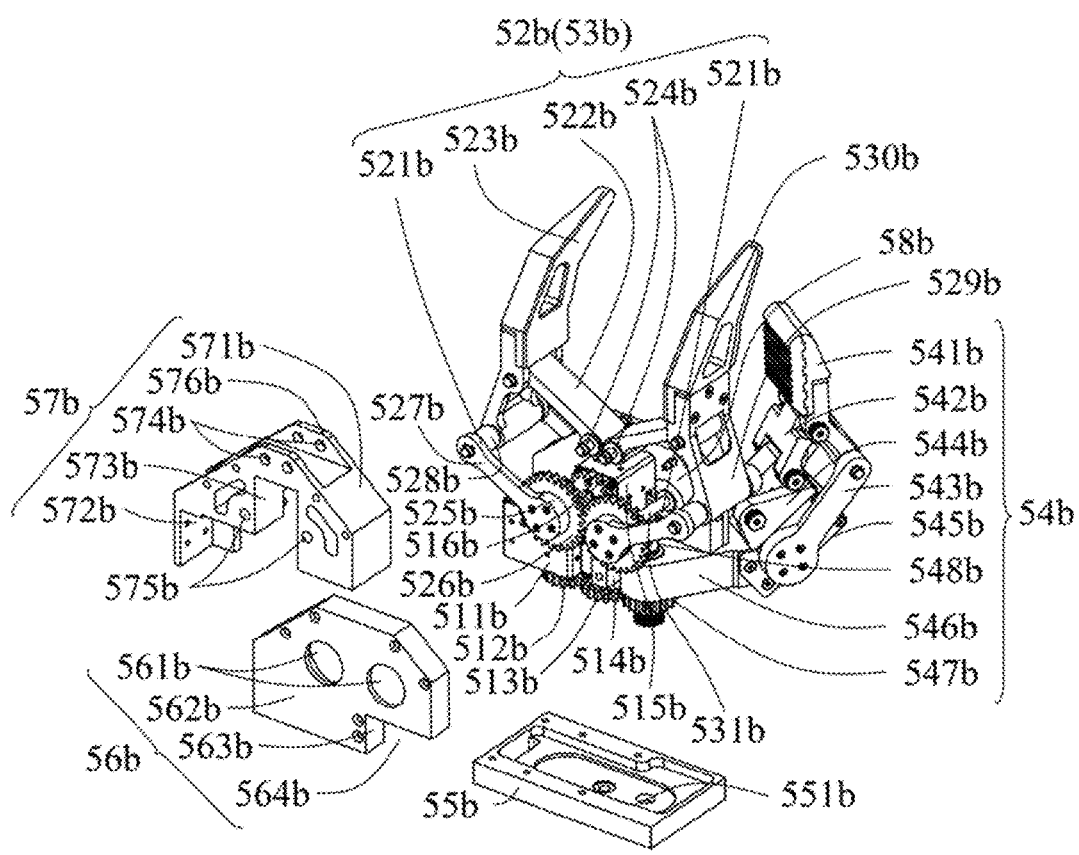
FIG. 15B is an isometric exploded view of the EOAT of FIG. 15A.

With reference to FIGS. 15A to 15C, in one embodiment, an EOAT 50$b$ includes two parallel jaw fingers 52$b$ and 53$b$ and an adaptive thumb 54$b$. This configuration allows for both precision pinch grasps using only the two parallel-jaw fingers 52$b$, 53$b$ as well as a grasp for larger, heavier objects when the thumb 54$b$ is engaged and fingers 52$b$ and 53$b$ are jointed together or separated from each other. Specifically, the EOAT 50$b$ further includes a base 51$b$ where the fingers 52$b$ and 53$b$ and the thumb 54$b$ are connected. The base 51$b$ includes a bottom plate 55$b$, a front cover 56$b$ and a rear cover 58$b$ that are spaced from each other and fixed to the bottom plate 55$b$, and an internal support 57$b$ fixed to and located between the front cover 56$b$ and the rear cover 58$b$. In one embodiment, the fingers 52$b$ and 53$b$ have the same configuration and each of the fingers 52$b$ and 53$b$ and the base 51$b$ form a four-bar linkage mechanism. Specifically, each of the fingers 52$b$ and 53$b$ includes a crank 521$b$, a rocker 522$b$, and a coupler 523$b$.

With reference to FIG. 15B, in one embodiment, the crank 521$b$ includes two bars 527$b$ that are spaced apart from and parallel to each other. The two bars 527$b$ have substantially the same configuration and are connected to each other, at their first ends, through a shaft 528$b$. The two bars 527$b$ are rotatably connected to the front cover 56$b$ and the rear cover 58$b$, respectively, at their second ends, which allows the two bars 527$b$ to rotate about one common axis. In one embodiment, one axle 525$b$ is fit in each through hole 561$b$ defined in a main body 562$b$ of the front cover 56$b$. The other bar 527$b$ can be rotatably connected to the rear cover 58$b$ in the same way, which is not repeated here. The rocker 522$b$ is rotatably connected to the internal support 57$b$ and the coupler 523$b$, respectively, at its opposite ends. In on embodiment, the internal support 57$b$ includes a main body 571$b$ and two spaced tabs 576$b$ protruding on the top of the main body 571$b$. Each rocker 522$b$ is rotatably connected to the tabs 576$b$ by a shaft 524$b$ whose opposite ends extend out of the rocker 522$b$ and are received in the through holes 574$b$ defined in the tabs 576$b$.

With reference to FIG. 15B, in one embodiment, the coupler 523$b$ includes a connection bar 529$b$ and a fingertip 530$b$. One end of the connection bar 529$b$ is rotatably connected to the two bars 527$b$ through the shaft 528$b$, and the opposite end of the connection bar 529$b$ is rotatably connected to the rocker 522$b$. The fingertip 530$b$ is fixed to the connection bar 529$b$ adjacent to the opposite end of the connection bar 529$b$. In one embodiment, one bar 527$b$ rotates when driven by a motor 515$b$, and drives the coupler 523$b$ and the rocker 522$b$ to rotate. The grippers 523$b$ of the two fingers 52$b$ and 53$b$ can then move toward/away from each other, which allows the grippers 523$b$ to grasp/release objects. In the embodiment, the crank 521$b$, the rocker 522$b$, and the coupler 523$b$ are configured in such a way that the grippers 523$b$ stay substantially parallel to each other during their movement toward/away from each other. In one embodiment, the fingertips 530$b$ each have a curved configuration which allow for non-prehensile tasks, such as pulling on handles, hoisting an object with a loop feature or repositioning objects.

With reference to FIG. 15B, in one embodiment, the motor 515$b$ is received in a space 573$b$ defined in the main body 571$b$ of the internal support 57$b$. A transmission mechanism transmits motion from the motor 515$b$ to the two bars 527$b$ of the fingers 52$b$ and 53$b$. The transmission mechanism includes an output gear 516$b$ fixed to the output shaft of the motor 515$b$, and two gears 526$b$ rotatably arranged around the axles 525*b*. The two bars 527*b* are fixed to the two gears 526*b*. In one embodiment, one of the two gears 526*b* is a stepped gear that includes a large gear engaged with the other gear 526*b*, and a small gear engaged with the output gear 516*b*. When the output gear 516*b* rotates, the small gear is driven to rotate and the large gear rotates synchronously and drives the other gear 526*b* to rotate. The two gears 526 then drives two bars 527*b* of the fingers 52*b* and 53*b* to rotate. In one embodiment, the EOAT 50*b* may further include two shafts 531*b* rotatably passing through two through holes 575*b* defined in the main body 571*b* of the internal support 57*b*. Two bars 527*b* of the finger 52*b* are respectively fixed to the opposite ends of one shaft 531*b*, and two bars 527*b* of the finger 53*b* are respectively fixed to the opposite ends of the other shaft 531*b*.

With reference to FIG. 15B, in one embodiment, the thumb 54*b* includes a base 546*b*, a motor assembly 545*b*, a crank 543*b*, a coupler 541*b*, and a rocker 542*b*. The base 546*b* is connected to the bottom plate 55*b*. The lower end of the crank 543*b* is fixed to the output shaft of the motor assembly 545*b*, and the upper end of the crank 543*b* is rotatably connected to the lower end of the coupler 541*b*. The lower end of the rocker 542*b* is rotatably connected to a connection member 544*b* fixed to the top of the motor assembly 545*b*. The upper end of the rocker 542*b* is rotatably connected to the coupler 541*b*. The crank 543*b* rotates when driven by the motor assembly 545*b*, and drives the coupler 541*b* to rotate toward/away from the two fingers 52*b* and 53*b*. The thumb 54*b* can then work with the fingers 52*b* and 53*b* to grasp larger, heavier objects.

With reference to FIG. 15B, in one embodiment, the thumb 54*b* is rotatably connected to the bottom plate 55*b*. The main body 562*b* of the front cover 56*b* defines a space 563*b* in a lower corner. The top surface 564*b* of the space 563*b*, a bottom surface of the internal support 57*b* and a bottom surface of the rear cover 58*b* are substantially flush with each other. Theses surfaces face the bottom plate 55*b* and a receiving space is formed between these surfaces and the bottom plate 55*b*, which allows the base 546*b* of the thumb 54*b* to rotate in the receiving space. Specifically, the base 546*b* is partly received in the receiving space and rotatably connected to the bottom plate 55*b* through a shaft 548*b*. A lower end of the shaft 548*b* is rotatably fit in a through hole 551*b* defined in the bottom plate 55*b*, and a top end of the shaft 548*b* is rotatably received in a hole defined in the internal support 57*b*. The shaft 548*b* is substantially vertical, and the base 546*b* is thus rotatable about a vertical axis. FIG. 15A shows that the thumb 54*b* is in a first position, while FIG. 15C shows that the thumb 54*b* has rotated from the first position to a second position to free up operating space for fingers 52*b* and 53*b*. In one embodiment, the rocker 542*b* is a spring-loaded, two-link component. Specifically, the rocker 542*b* includes a first member 5421*b* and a second member 5422*b* that is rotatably connected to the first member 5421*b*. The rocker 542*b* passively reconfigures when it makes contact with an object. After the object has been released, the first member 5421*b* and the second member 5422*b* return to their original positions by a spring. With such configuration, the thumb 54*b* can rotate to various positions to adapt different objects having different shape and size, which enable the EOAT 50*b* to have great versatility to grasp different objects. In one embodiment, sensors may be embedded into fingers 52*b*, 53*b* and 54*b* for additional robustness of grasping.

With reference to FIG. 15B, in one embodiment, the EOAT 50*b* further includes a motor 511*b* fixed to the internal support 57*b* and received in a space 572*b* defined in the internal support 57*b*. Motion from the motor 551*b* is transmitted to the base 546 of the thumb 54*b* by an output gear 512*b* fixed to the output shaft of the motor 511*b*, an intermediate gear 513*b* that is rotatably connected to a block 514*b* fixed to the front cover 56*b* and engaged with the output gear 512*b*, and a gear 547*b* that is fixed to the shaft 548*b* and engaged with the intermediate gear 513*b*.

With reference to FIGS. 16A to 16C, in one embodiment, an EOAT 50*c* includes base 51*c* and three fingers 52*c* rotatably connected to the base 541*c*. The base 51*c* includes a bottom plate 511*c*, an intermediate plate 512*c*, and a top plate 513*c* that are spaced apart from one another in a vertical direction, and connected to one another via a number of vertical bars 514*c*. The EOAT 50*c* further includes a linear stage 55*c* that is connected to a post 56*c* fixed to the bottom plate 511*c* and the top plate 513*c*. The post 56*c* is substantially vertical and the linear stage 55*c* is slidable along the post 56*c*. The linear stage 55*c* is arranged between the intermediate plate 512*c* and the top plate 513*c*. The EOAT 50*c* further includes three couplers 54*c* that each include opposite ends rotatably connected to the linear stage 55*c* and one finger 52*c*. Each finger 52*c* is further rotatably connected to the top plate 513*c*.

With reference to FIG. 16A, when the linear stage 55*c* moves up and down, the fingers 52*c* are driven to rotate toward/away from one another, which enables the fingers 52*c* to grasp/release objects. In one embodiment, the EOAT 50*c* further includes a linear motor 53*c* arranged between the bottom plate 511*c* and the intermediate plate 512*c*. The linear stage 55*c* is fixed to the slider that connected to the output shaft of the linear motor 53*c*. The linear stage 55*c* moves up/down together with the slider when the output shaft of the linear motor 53*c* rotates. In one embodiment, the fingers 52*c* can be made of elastic material and passively deform and cage around smaller objects for a more secure grasp. In one embodiment, sensors may be embedded into fingers 52*c*. The use of elastic material as a monolithic structure may increase robustness.

Figure 17A:
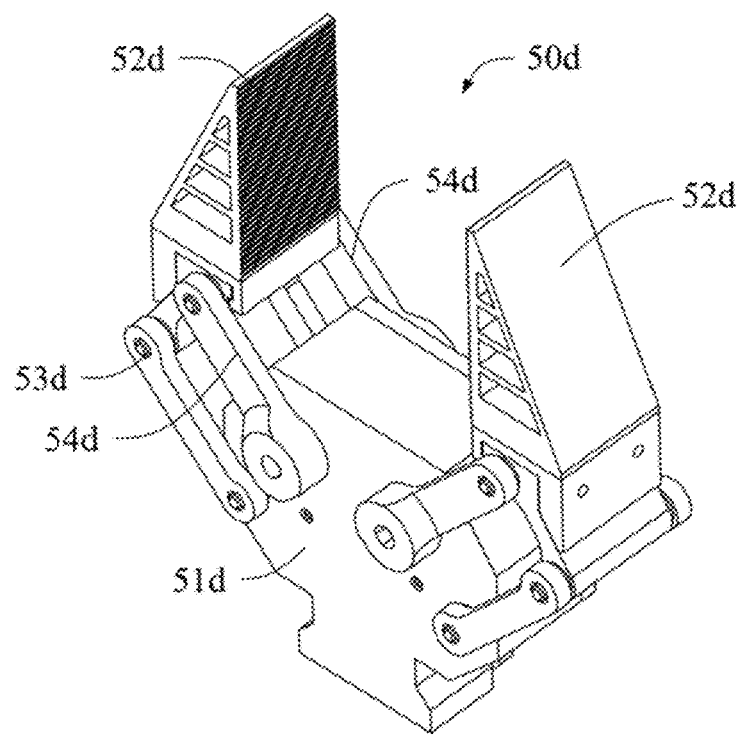
FIG. 17A is an isometric view of another embodiment of an EOAT of the robotic assistant according to one embodiment.
Figure 17B:
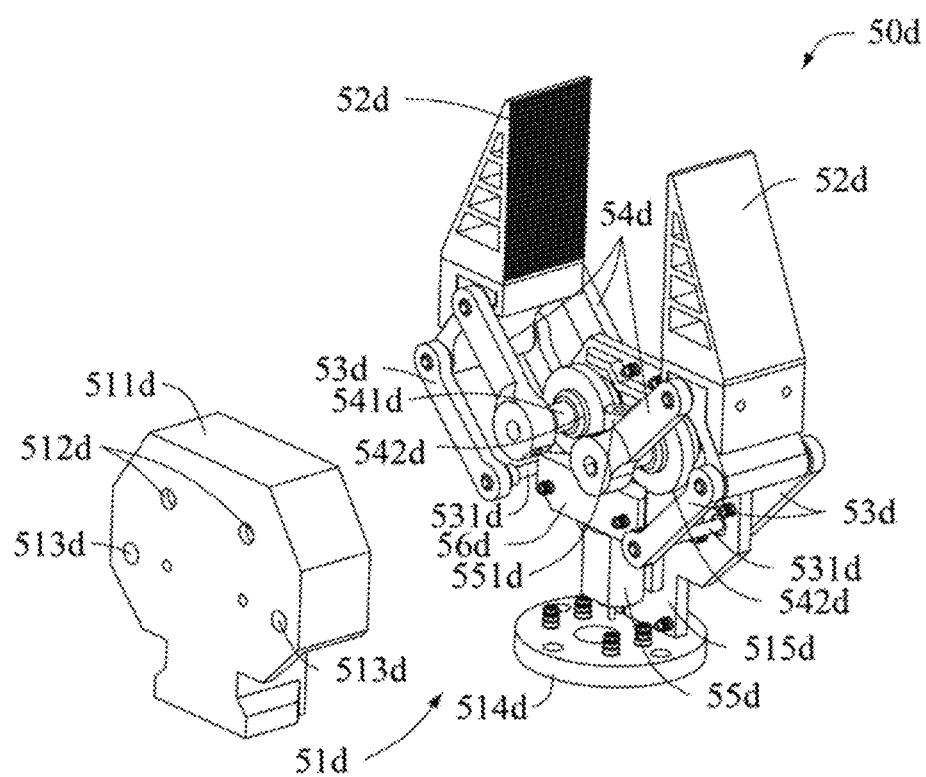
FIG. 17B is an isometric exploded view of the EOAT of FIG. 17A.
Figure 17C:
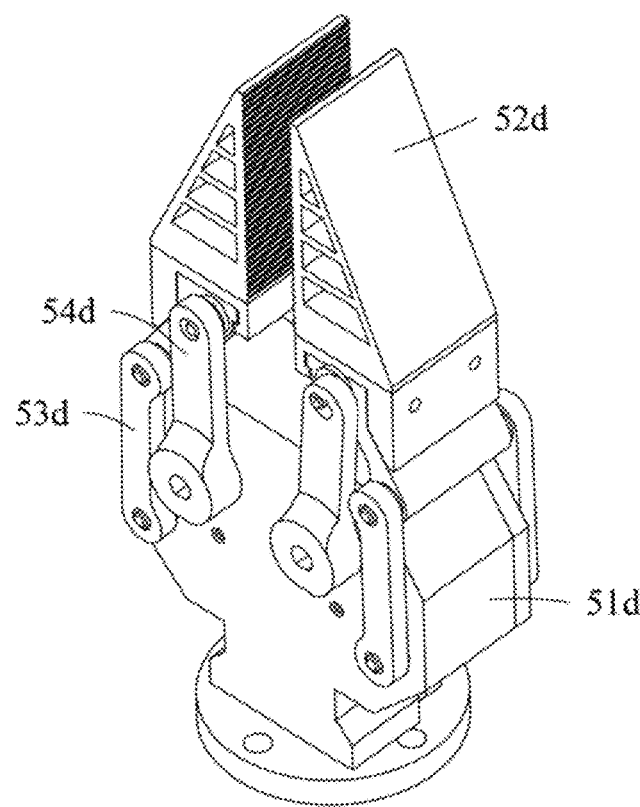
FIG. 17C is an isometric view of the EOAT of FIG. 17A.

With reference to FIGS. 17A to 17C, in one embodiment, an EOAT 50*d* includes a base 51*d* and two fingers 52*d* that are connected to the base 51*d*. The EOAT 50*d* further includes a crank 54*d* and a rocker 53*d* for each finger 52*d*. The base 51*d* includes a front cover 511*d*, a bottom plate 514*d* and a rear cover 515*d*. The front cover 511*d* is fixed to the bottom plate 514*d*, and the rear cover 515*d* is fixed to the front cover 511*d*. In one embodiment, each crank 54*d* is in the form of two bars that are parallel to each other and fixed to opposite ends of a shaft 541*d* which extends out of a through hole 512*d* in the front cover 511*d* and a through hole (not shown) in the rear cover 515*d*. The two bars of each crank 54*d* are rotatably connected to one finger 52*d*.

With reference to FIG. 17B, in one embodiment, each rocker 53*d* is in the form of two bars that are parallel to each other and fixed to opposite ends of a shaft 531*d* which extends out of a through hole 513*d* in the front cover 511*d* and a through hole (not shown) in the rear cover 515*d*. The two bars of each rocker 53*d* are rotatably connected to one finger 52*d*. With such configuration, each finger 52*d*, the crank 54*d* and the rocker 53*d* of the linger 52*d*, and the base 51*d* compositely form a four-bar linkage mechanism. When the cranks 54*d* of the two fingers 52*d* rotate, the two fingers 52*d* move toward/away from each other, which allow the two fingers 52*d* to grasp/release objects. In one embodiment, each finger 52*d* and its crank 54*d* and rocker 53*d* are configured in such a way that gripping surfaces 521*d* of the two fingers 52*d* stay parallel to each other during movement of the two fingers 52*d*. In one embodiment, the fingers 52*d* are made of elastic material and passively deform and cage around smaller objects for a more secure grasp. In one embodiment, sensors may be embedded into fingers 52d for additional robustness.

With reference to FIG. 17B, in one embodiment, the EOAT 50d further includes a motor 55d fixed to the rear cover 515d through a fixing member 56d. The motor 55d is configured to drive the cranks 54d of the two fingers 52d to rotate. In one embodiment, the motor 55d includes a worm 55l d fixed to an output shaft of the motor 55d. The EOAT 50d further includes two worm gears 542 fixed to the shafts 541d and engaged with the worm 551d, which allows rotary motion to be transmitted from the output shaft of the motor 55d to the cranks 54d.

Figure 17D:
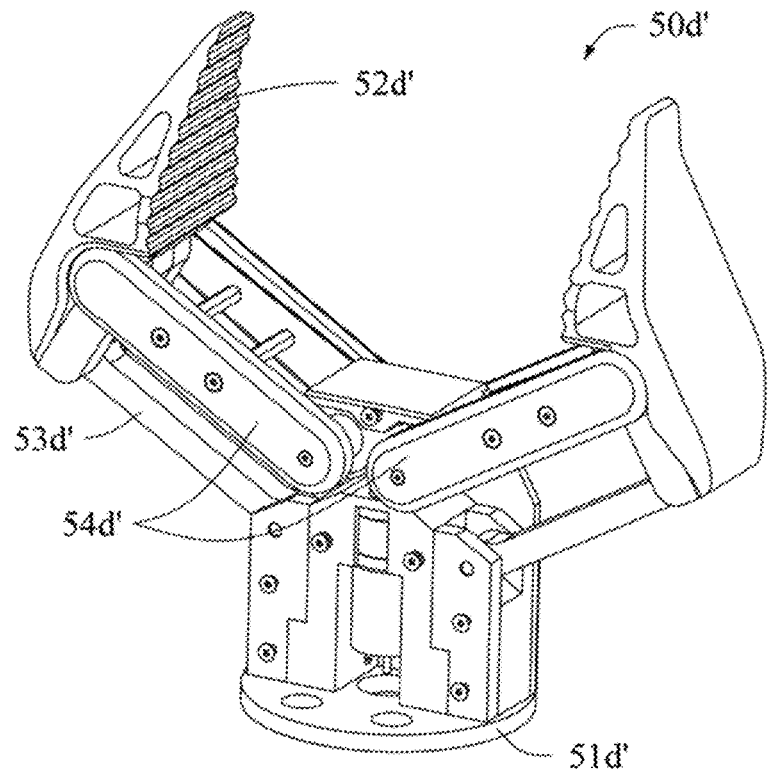
FIG. 17D is an isometric view of another embodiment of an EOAT of the robotic assistant according to one embodiment.

FIG. 17D shows an EOAT 50d' according to one embodiment which is similar to the EOAT 50d. The EOAT 50d' includes a base 51d', two fingers 52d', and a crank 54d' and a rocker for each finger 52d'. The EOAT 50d' further includes a motor 55d' for driving the two cranks 54d' to rotate. The EOAT 50d' is constructed and operated in a way similar to the EOAT 50d. The EOAT 50d' differs from the EOAT 50d in that the rocker 53d' is in the form of a single bar. The EOAT 50d' is also different from the EOAT 50d in that the curved fingertips allow for more varied non-prehensile tasks.

Figure 18A:
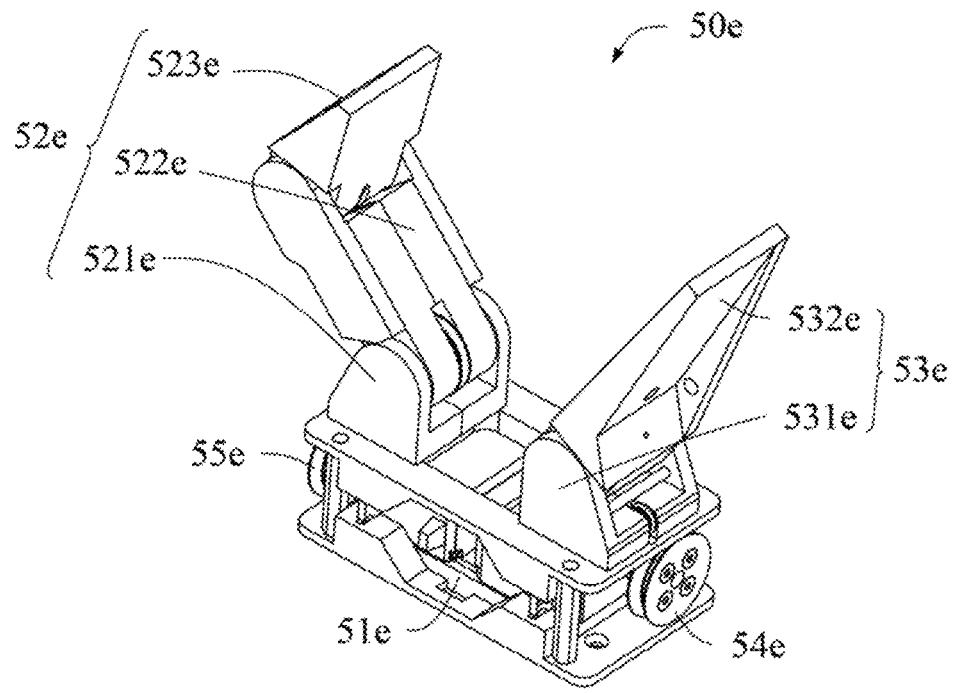
FIG. 18A is an isometric view of another embodiment of an EOAT of the robotic assistant according to one embodiment.
Figure 18B:
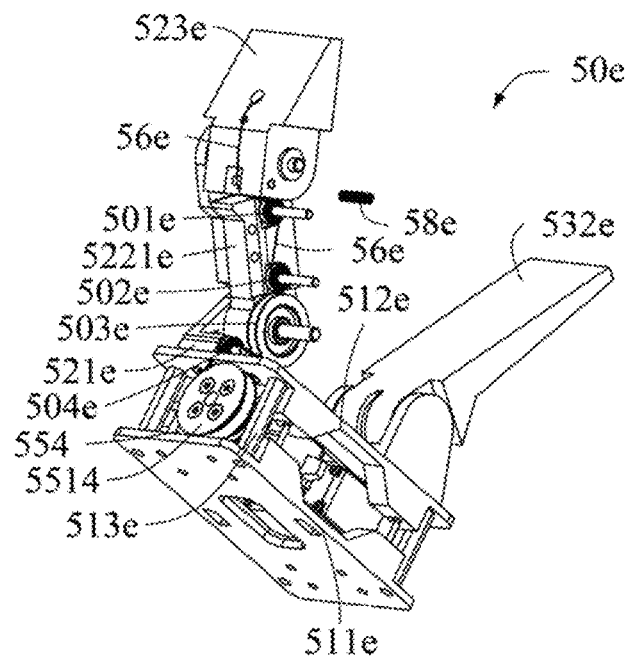
FIG. 18B is an isometric exploded view of the EOAT of FIG. 18A.
Figure 18C:
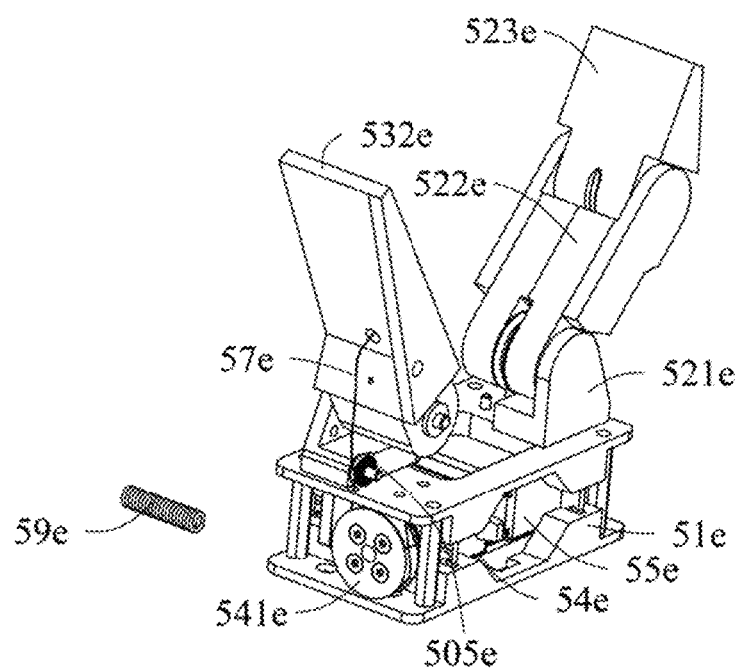
FIG. 18C is an isometric exploded view of the EOAT of FIG. 18A, viewed from a different perspective.

With reference to FIGS. 18A to 18C, in one embodiment, an EOAT 50e includes a base 51e, a first finger 52e, a second finger 53e, a first motor 55e for driving the first finger 52e, and a second motor 54e for driving the second finger 53e. The base 51e includes a bottom plate 511e and a top plate 512e that are spaced apart from each other and fixe to each other by a number of posts 513. In one embodiment, the first finger 52e includes a connection base 521e fixed to the top of the top plate 512e, a first phalange 522e rotatably connected to the connection base 521e, and a second phalange 523e rotatably connected to the top end of the first phalange 522e. The first phalange 522e includes two phalange halves 5221e that are arranged side by side and connected to each other. The EOAT 50e further includes three pulleys 501e, 502e and 503e arranged between the first phalange halves 5221e and a pulley 504 connected to the connection base 521e. The pulley 501e is arranged adjacent to the second phalange 523e, the pulley 503e having a greater diameter is arranged adjacent to the connection base 521e, and the pulley 502e is arranged between the pulleys 501e and 503e. It should be noted that the number, size, and arrangement of the pulleys may be adjusted according to actual needs.

With reference to FIG. 18B, the EOAT 50e further includes a first tendon 56e. The top end of the tendon 56e is fixed to the second phalange 523e, and the tendon 56e is successively wound around the pulleys 501e, 502e, 503e and 504e. The tendon 56e then passes through a through hole in the top plate 512e and is wound around a wheel 551e fixed to the output shaft of the motor 55e. In one embodiment, the first finger 52e and the second finger 53e are initially in contact with each other. During the process of grasping a determined object, the wheel 551e rotates together with the output shaft of the motor 55e and pulls the tendon 56e. The second phalange 523e rotate with respect to the first phalange 522e, and the first phalange 522e rotates away from the second finger 53e, when the tendon 56e pulls the second phalange 523e. In one embodiment, the EOAT 50e further includes an extension spring 58e arranged between second phalange 523e and the first phalange 522e. The extension spring 58e is extended when the tendon 56e pulls the second phalange 523e to move, and urges the second phalange 523e to return to its original position after the motor 55e has been de-energized. The tendon 56e routes across the phalanges 522e and 523e to enable adaptive behavior through under-actuated design. Similarly, an extension spring (not shown) is arranged between the first phalange 522e and the connection base 521e and urges the first phalange 522e to return to its original position after the motor 55e has been de-energized. The extension springs here can keep the tendon 56e under tension after the motor 55e has been de-energized. It should be noted that the use of tendons in robotic applications has been studied since the 1980s, and the tendon 56e will not be described in detail here.

With reference to FIGS. 18A and 18C, the second finger 53e includes a connection base 531e fixed to the top of the top plate 512e, a phalange 532e rotatably connected to the connection base 531e, and a tendon 57e. One end of the tendon 57e is fixed to the phalange 532e, wound around a pulley 505e rotatably connected to the connection base 531e, passes through a through hole in the top plate 512e, and is wound around a wheel 541e fixed to the output shaft of the motor 54e. When the wheel 541e rotates together with the output shaft of the motor 54e, the tendon 57e pulls the phalange 532e to rotate away from the first finger 52e. The EOAT 50e further includes an extension spring 59e arranged between the connection base 531e. The extension spring 58e is extended when the tendon 56e pulls the second phalange 523e to move, and urges the second phalange 523e to return to its original position after the motor 55e has been de-energized. In another embodiment, the tendon 57e may be replaced by a timing belt wound around the pulley 505e.

With such configuration, the first finger 52e and the second finger 53e can be controlled to move away from each other to create sufficient space for objects, and rotate back to come into contact with the objects when urged by springs.

Figure 19A:
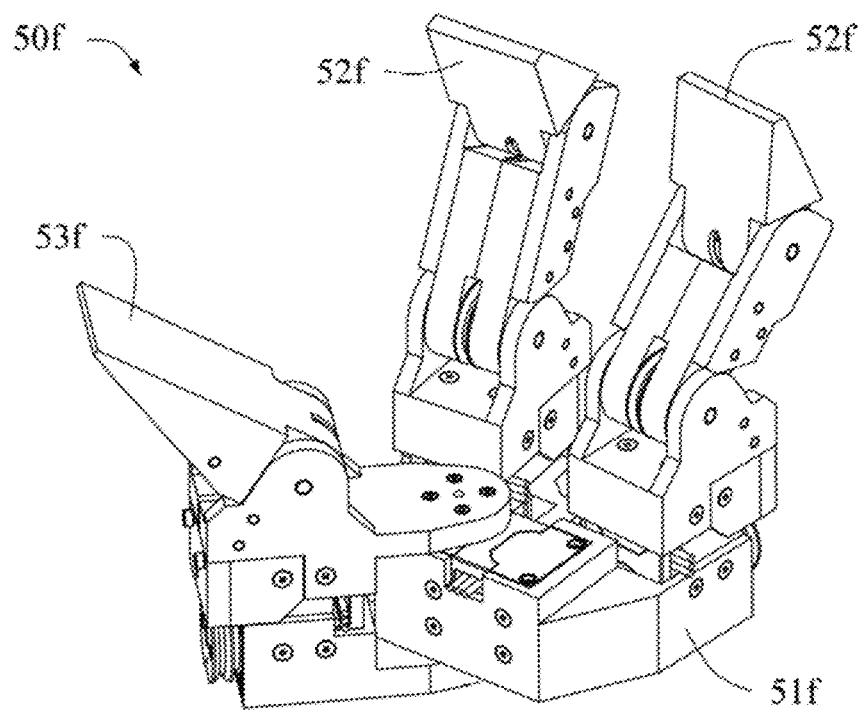
FIG. 19A is an isometric view of another embodiment of an EOAT of the robotic assistant according to one embodiment.
Figure 19B:
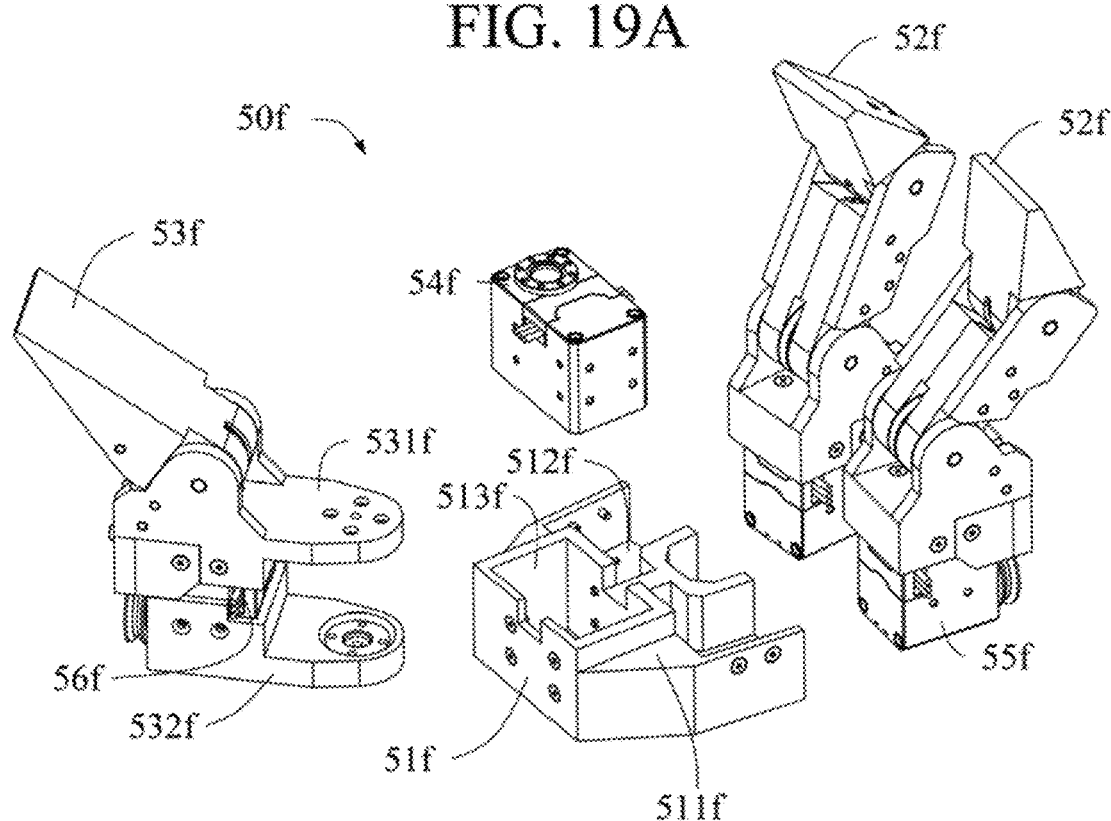
FIG. 19B is an isometric exploded view of the EOAT of FIG. 19A.

With reference to FIGS. 19A and 19B, in one embodiment, an EOAT 50f includes a base 51f, two first fingers 52f, and a second finger 53f that are connected to the base 51f. Each first finger 52f is constructed the same way as the first finger 52e of FIG. 18A and stacked on a motor 55f. The motor 55f is configured to drive the first finger 52f the same way as the motor 55e of FIG. 18A. The second finger 53f is constructed the same way as the second finger 53e of FIG. 18A and stacked on a motor 56f. The motor 56f is configured to drive the second finger 53f the same way as the motor 54e of FIG. 18A. With such configuration, each of the first fingers 52f and the second finger 53f can be controlled to move away from each other to create sufficient space for objects, and rotate back to come into contact with the objects when urged by the springs.

With reference to FIG. 19B, in one embodiment, the base 51f defines a first chamber 511f and a second chamber 512f to receive the motors 55f of the two first fingers 52f. The EOAT 50f further includes a motor 54f received in a third chamber 513 defined in the base 51f. The motor 54f is configured to drive the second finger 531 and the motor 56f, as a whole, to rotate about a substantially vertical axis. The second finger 53f further includes a first tab 531f and a second tab 532f that are spaced apart from each other. The first tab 531f and a second tab 532f are connected to the output shaft and a bearing on the bottom surface and the top surface of the motor 54f. When the motor 54f is in operation, the second finger 53f and the motor 56f, as a whole, can rotate with respect to the base 51f to a determined position. With such configuration, the second finger 53f can rotate to various positions to adapt different objects having different shape and size, which enable the EOAT 50f to have great versatility to grasp different objects. Each of the fingers 52f and 531 is designed to be modular so that maintenance is simplified, and parameters for each finger (such as link length or degrees of freedom) can be modified to suit the target task.

In one embodiment, the EOATs as described above may have integrated sensors to aid in grasping and manipulation behavior. For example, the sensors may include IR range sensors, similar to the ones used in the wheeled base 10, used in combination with a high-definition 2D RGB camera to enable the same capability of a bulkier 3D RGBD camera. In practice, this allows the robotic assistant 100 to acquire higher definition images than conventional systems for object recognition. This also enables the use of smaller, more compact camera modules that can be more tightly integrated into the EOATs. As a result, the overall size of the EOATs can be minimized for operation in more cluttered environments. The camera may also have active lighting to make the vision system more adaptable to varying environmental lighting conditions and help the camera capture object details with maximal clarity. In one embodiment, the sensors may include tactile sensors used to detect contact and identify stable grasps. The tactile sensors may be resistive bend sensors, which change in electrical resistance in response to bending strain and can be overmolded in the flexible fingertips of one or more of the EOATs as described above. The tactile sensors may be resistive pressure pads overmolded in compliant finger pads of one or more of the EOATs as described above. The tactile sensors may be mechanical switches fixtured behind compliant finger pads of one or more of the EOATs as described above, where the stiffness of the finger pad material determines the force threshold at which contact events are detected. These tactile sensors can act as the "skin" and can sense and react to external stimuli.

Figure 20:
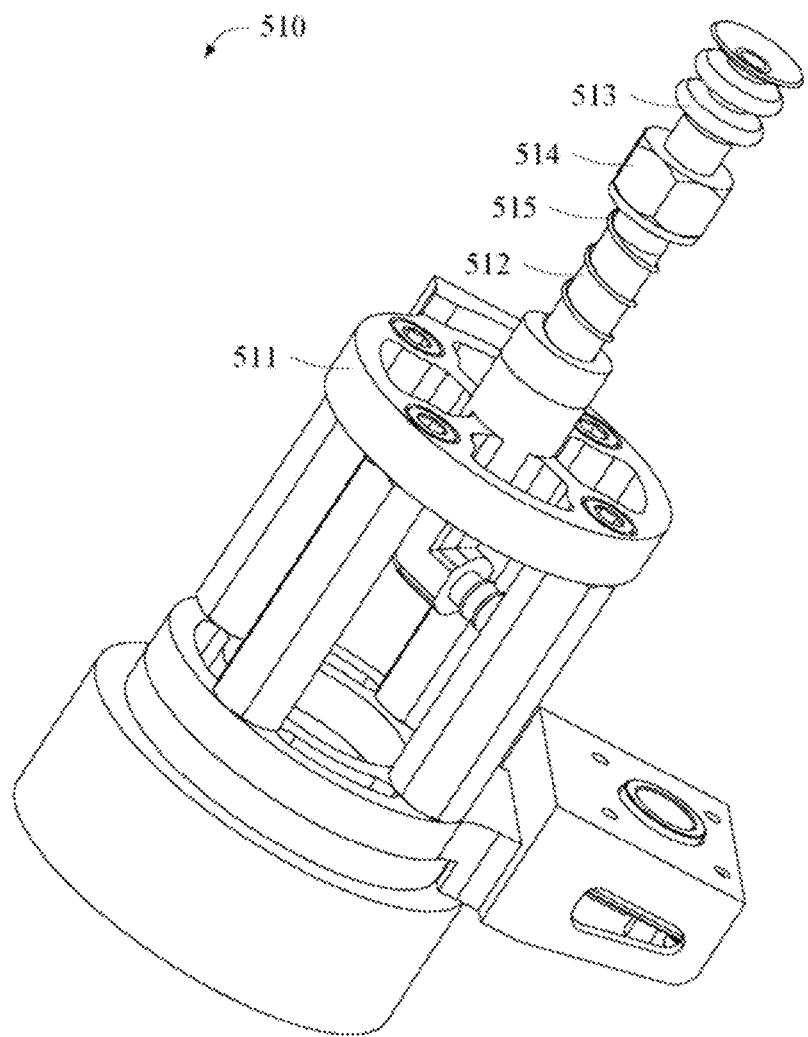
FIG. 20 is an isometric exploded view of a vacuum module EOAT of the robotic assistant according to one embodiment.

With reference to FIG. 20, in one embodiment, the robotic assistant 100 may further include a vacuum module 510 that can be fixed to the EOATs described above. The vacuum module 510 includes a base 511, a connection tube 512, and a soft rubber, plastic, or elastic suction cup 513. The suction cup 513 is configured to be pressed onto an object by pushing downward, which creates a seal as the air under the suction cup is expelled, thereby provide a lifting force to the object. The vacuum module 510 can be used as a standalone picking tool or to aid in non-prehensile (pushing/pulling) tasks that puts target objects in a more advantageous pose to be grasped by the jaws/fingers of the EOAT 50. In one embodiment, the suction cup 513 is connected to and slidable along the connection tube 512 via a nut 514. The nut 514 is connected to the base 511 through a spring 515 arranged around the connection tube 512. When the suction cup 513 is pressed onto an object, the nut 514 pushes and compresses the spring 515 which in turn pushes the suction cup 513 to tightly abut against the object.

With to FIGS. 21A to 21D, in one embodiment, the robotic assistant 100 further includes a camera 61. The camera 61 assists the robotic assistant 100 to perceive environment and guide the foldable arm 30 to conduct object manipulation tasks. In one embodiment, the control system 70 of the robotic assistant directs the foldable arm 30 to be in a determined orientation by articulation of one or more of the N revolute joints and N links of the foldable arm 30, and directs the EOAT 50 to pick up and place external objects from/to the one or more drawers 21 based on output from the camera 61 according to command instructions.

Figure 21A:
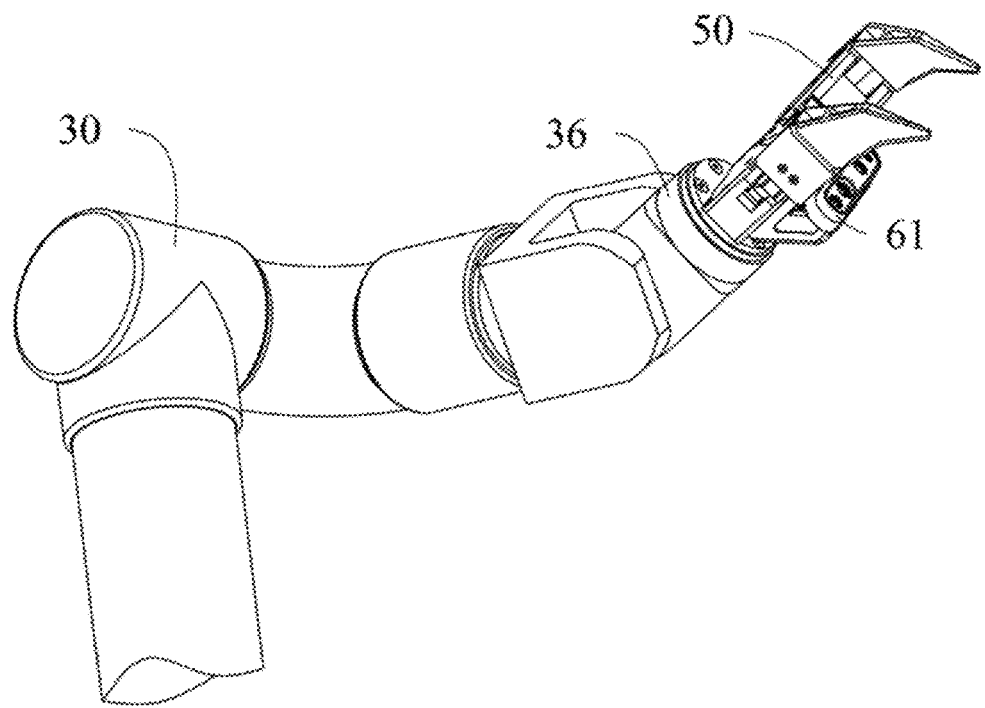
FIG. 21A shows a camera mounted to the EOAT of the foldable arm of FIG. 13.
Figure 21B:
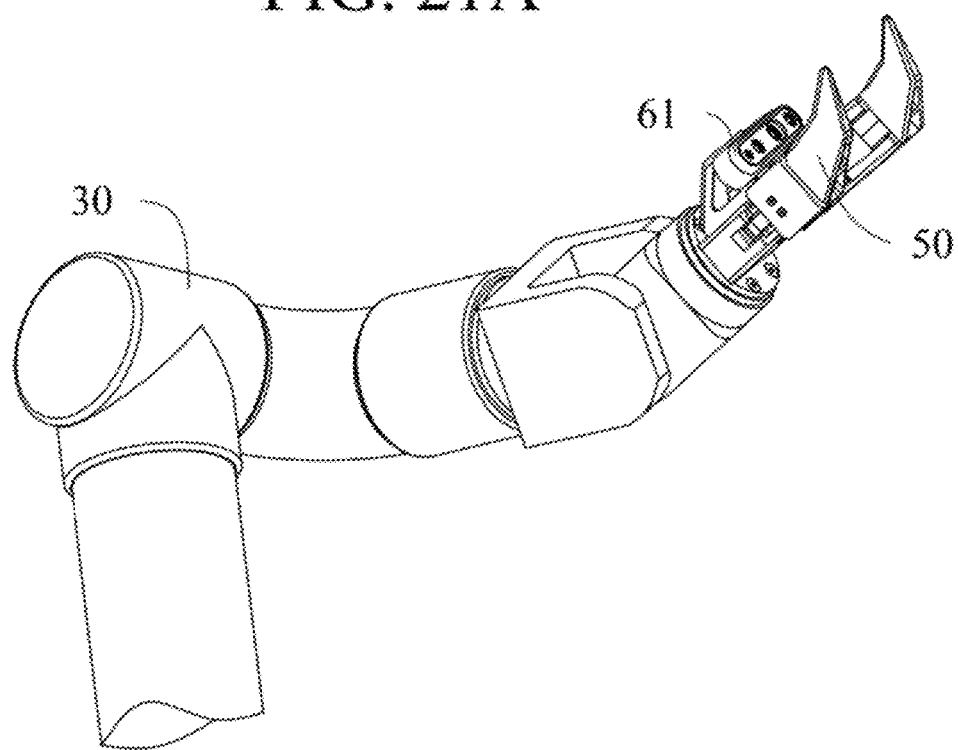
FIG. 21B is similar to FIG. 20A and shows the EOAT mounted with a camera and rotated to a different orientation.
Figure 21C:
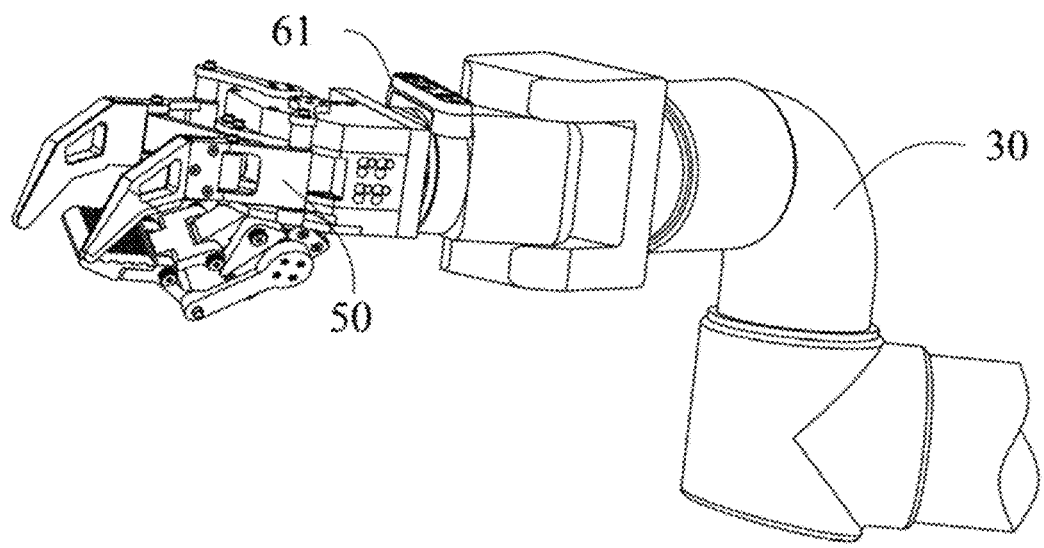
FIG. 21C shows a camera connected to the foldable arm of FIG. 13 adjacent to the EOAT of the robotic assistant.
Figure 21D:
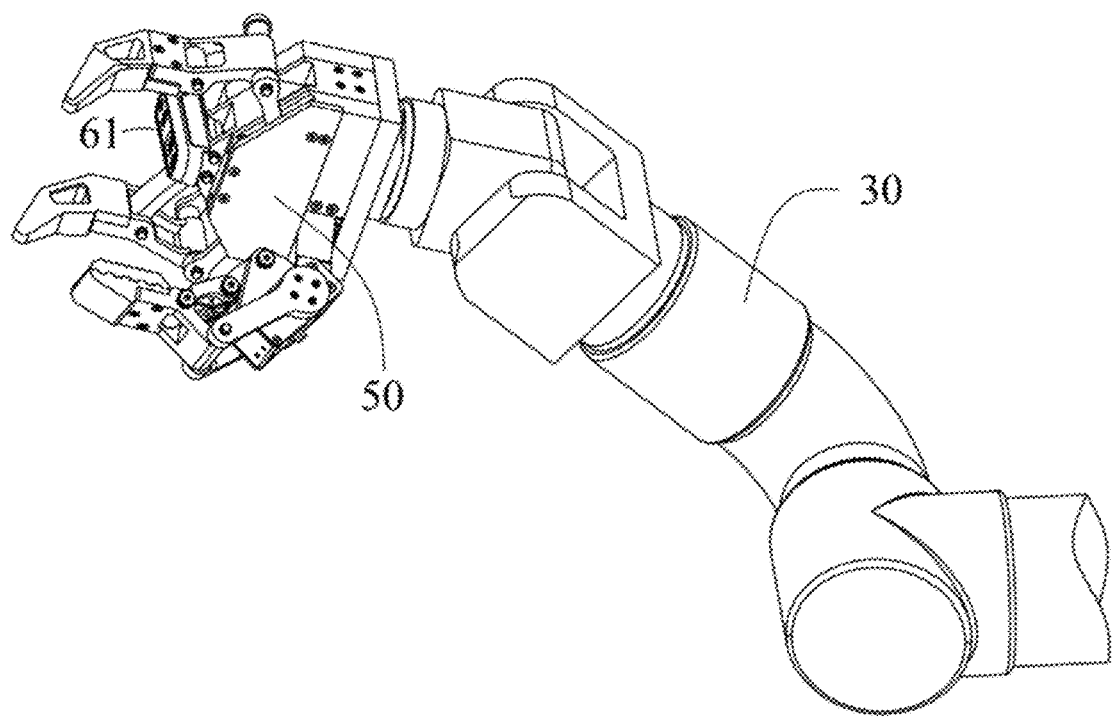
FIG. 21D shows a camera connected to the EOAT of the robotic assistant.

In one embodiment, the camera 61 may be a wrist-mounted camera. Specifically, as shown in FIG. 21C, the camera 61 is connected to the lateral surface of the output disc of the revolute joint 37 received in the sixth link 36 of the foldable arm 30 next to the EOAT 50 that is connected to the end surface of the output disc of the revolute joint 37 received in the sixth link 36. In the wrist-mounted configuration, the camera 61 is able to view the task environment with as little obstruction from the manipulation system as possible, while minimizing the overall footprint. It should be noted that the camera 61 can be disposed on a different position of the foldable arm 30 adjacent to the EOAT 50, or rotatable, according to actual needs. Rotability of the camera 61 can allow the camera to face the grasping working space at all times regardless of placement of the jaw/fingers of the EOAT 50.

In the wrist-mounted designs, termination may end with a revolute joint with a rotational axis parallel to the EOAT "palm" normal vector. However, it may be appreciated that alternative joint designs with additional offsets or a terminating prismatic joint can be considered to minimize singularities in the arm workspace and achieve dual design goals above.

In another embodiment, the camera 61 may be a camera-in-hand or palm-mounted camera. In such a design, the camera may be disposed in the "palm" of the EOAT 50 (i.e., FIG. 21D), or mounted to an external surface of the EOAT 50 (i.e., FIG. 21A and FIG. 21B). This allows for the EOAT to continuously visualize the environment during approach to the object without resetting to a pre-defined configuration for scanning, and allows for persistent view of the object. Persistent view of the task during reach and grasp may be helpful in minimizing pre-grasp pose errors. It should be noted that one or more cameras may be disposed on the ceiling or a high rack of a shelf, such as in a stocking room. In this configuration, the ceiling disposed cameras may provide information a fixed point of visual information of the environment including the foldable arm 30, the shelves, obstacles, and the object to grasp. Use of the ceiling mounted cameras and the camera disposed on/adjacent to the EOAT 50 and/or palm allows for improved object manipulation tasks.

Because of possible near-range object detection issues of vision sensors, it may be difficult to adaptively adjust with respect to the visual feedback as the EOAT gets within a close distance (e.g., 30-50 mm) of the target object. To overcome this limitation, either tactile or close-proximity sensors can be incorporated into the EOAT 50 or in the palm.

In one embodiment, the camera 61 can be a 3D vision system including one or more 3D cameras. In such a configuration, the camera 61 may be chosen from a number of commercially available 3D vision systems, depending on the objects that need to be detected. For example, while laser range finders using time of flight methods can be used to locate distant objects, stereo imaging systems may be better suited to imaging high-contrast objects. In case when objects are highly specular, it may be more useful to employ projected texture techniques, such as structured light. The 3D vision systems for assisting robots to detect and pick up objects are well known and will not be described in detail herein.

Figure 22:
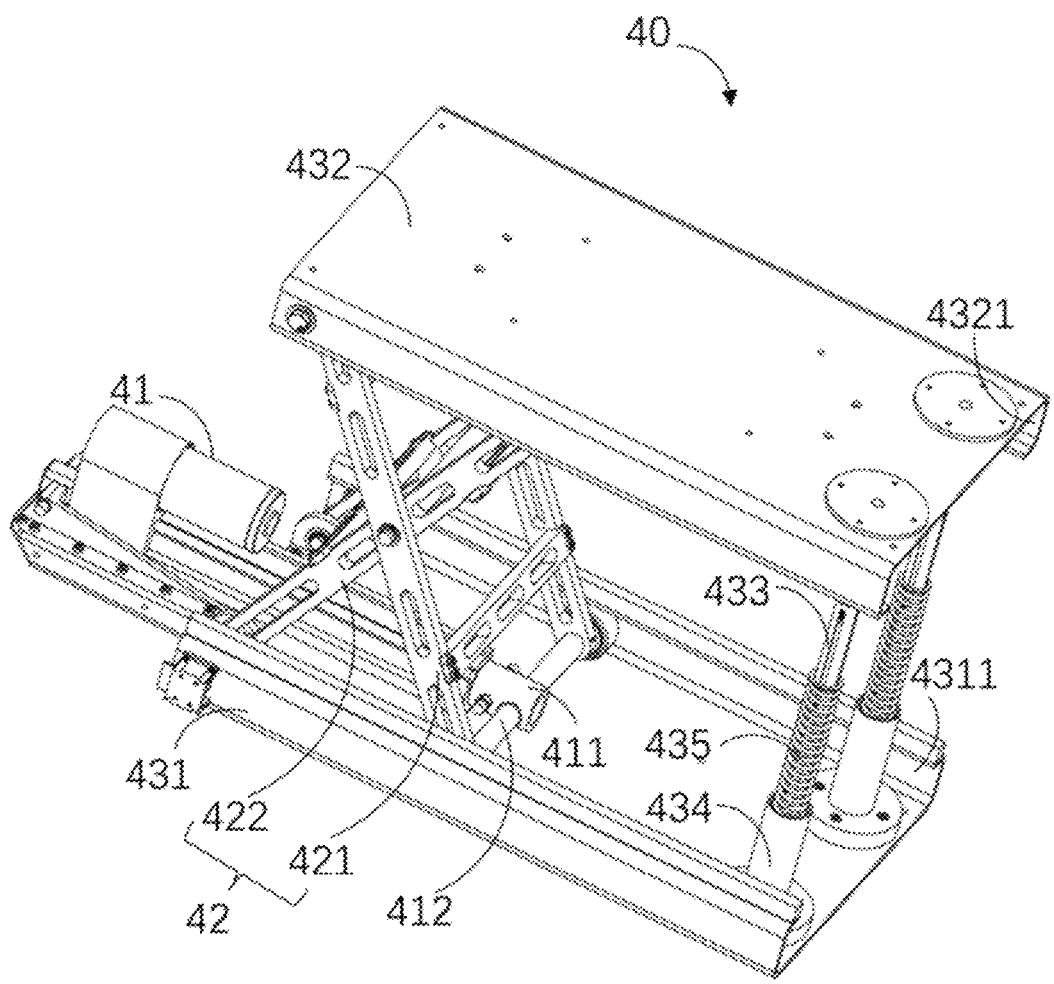
FIG. 22 is an isometric view of an elevation mechanism of the robotic assistant.
Figure 23:
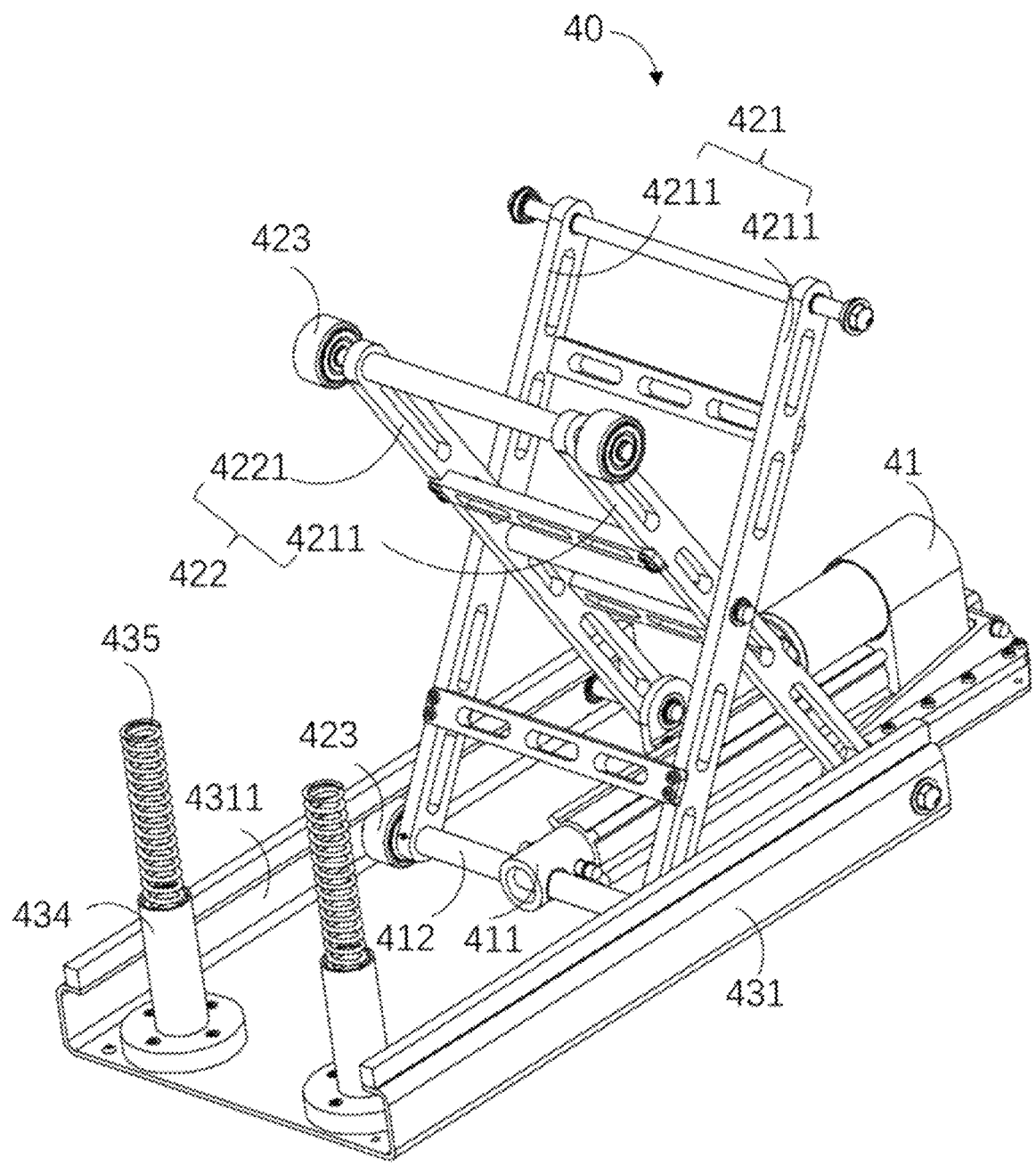
FIG. 23 is an isometric view of the elevation mechanism of FIG. 22 with the top plate detached, viewed from a different perspective.

With reference to FIGS. 22 and 23, in one embodiment, the elevation mechanism 40 is based on a lifting mechanism. Specifically, the elevation mechanism 40 includes a lifting mechanism 42 connected to the drawer mechanism 20 and the wheeled base 10, and an actuator 41 that is fixed to the wheeled base 10 and configured to drive the lifting mechanism 42 to elongate or retract in a vertical direction. The drawer mechanism 20 moves up in the vertical direction when the lifting mechanism 42 elongates, and moves down in the vertical direction when the lifting mechanism 42 retracts. It should be noted that the elevation mechanism 40 is not limited and can be adjusted according to actual needs. In one embodiment, the lifting mechanism may be a scissor lift mechanism.

With reference to FIGS. 22 and 23, the lifting mechanism 42 includes a pair of supports 421 and 422 that are rotatably connected to each other and form a crisscross "X" pattern. The support 421 includes two bars 4211 that have substantially the same length and parallel to and fixed to each other. Top ends of the two bars 4211 are rotatably connected to a top plate 432 where the drawer mechanism 20 is connected. Lower ends of the two bars 4211 are rotatably connected to a bottom plate 431 fixed to the wheeled base 10. In one embodiment, the bottom plate 431 defines two grooves 4311 to receive two wheels 423 rotatably connected to the lower ends of the two bars 4211, respectively. The two wheels 423 are able to roll and move in the two grooves 4311 when the supporting lower ends of the support 421 are driven by the actuator 41. In another embodiment, the two wheels 423 may be replaced by two sliders that are rotatably connected to the lower ends of the two bars 4211, and received in the two grooves 4311. The two sliders are able to slide in the two grooves 4311 when the supporting lower ends of the support 421 are driven by the actuator 41.

With reference to FIGS. 22 and 23, in one embodiment, the support 422 is constructed and arranged in a way similar to the support 421. Specifically, the support 422 includes two bars 4221 that have substantially the same length and parallel to and fixed to each other. One bar 4221 is rotatably connected to one bar 4211 at their middle positions, and the other bar 4221 is rotatably connected to the other bar 4211 at their middle positions. Bottom ends of the two bars 4221 are rotatably connected to the bottom plate 431. Upper ends of the two bars 4221 are movably connected to the top plate 432. In one embodiment, the top plate 432 defines two grooves 4321 to receive two wheels 423 rotatably connected to the upper ends of the two bars 4221, respectively. The two wheels 423 are able to roll and move in the two grooves 4321 when the support 422 is driven by the support 421. In another embodiment, the two wheels 423 may be replaced by two sliders that are rotatably connected to the upper ends of the two bars 4221, and received in the two grooves 4321. The two sliders are able to slide in the two grooves 4321 when the supporting lower ends of the support 421 are driven by the linear rail 41. In another embodiment, the linear rail 41 may be positioned with an angular displacement relative to the bottom plate and the lower ends of the support 422 are located at a displacement away from the end of the bottom plate.

Figure 24:
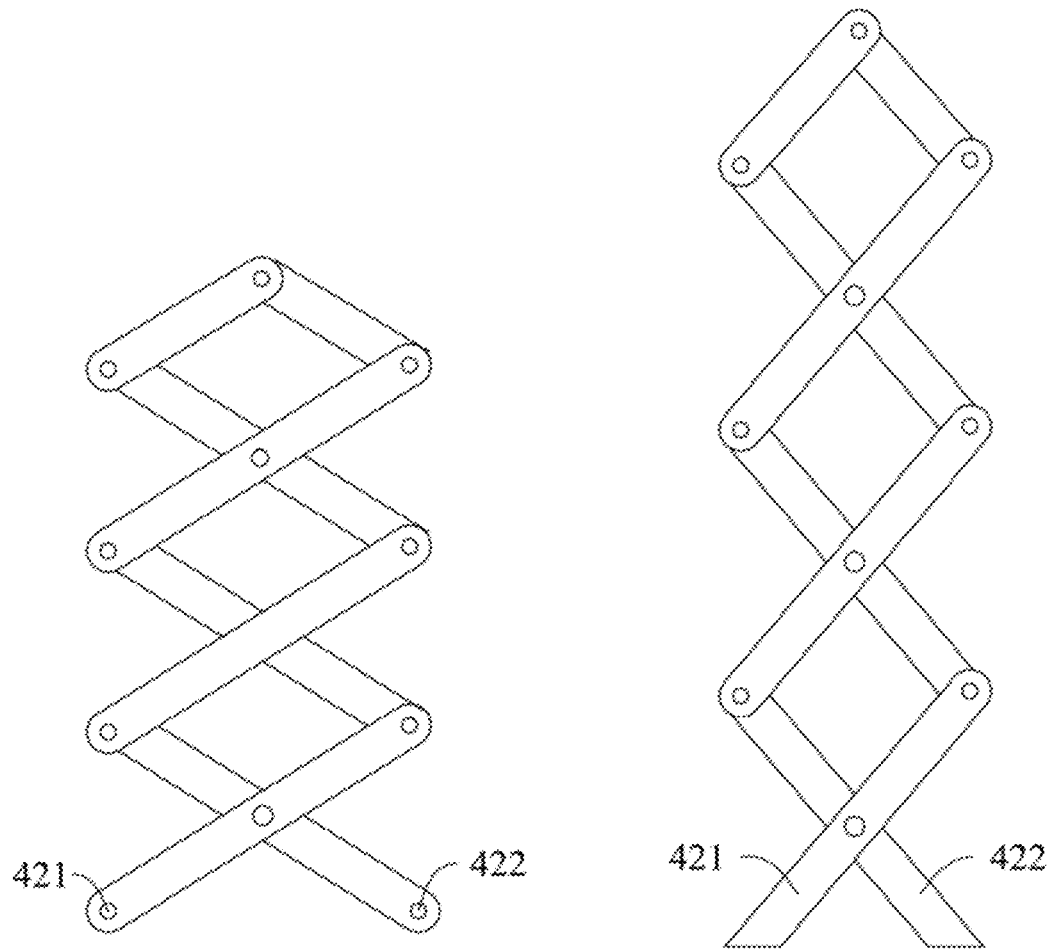
FIG. 24 shows a planar view of a lifting mechanism of the drawer mechanism of FIG. 22.

With such configuration, when the lower ends of the support 421 or the upper ends of the support 422 are pushed/pulled by the actuator 41, the two wheels 423 of the support 421 move in the grooves 4311 or the two wheels 423 of the support 422 move in the grooves 4321. The lifting mechanism 42 then elongates/retracts in the vertical direction, which moves the drawer mechanism 20 to a raised/lowered position. As shown in FIG. 24, it should be noted that the lifting mechanism 42 may include more than one pair of supports 421 and 422. The arrangement of these pairs of supports 421 and 422 is well known and will not be described in detail here.

With reference to FIGS. 22 and 23, in one embodiment, the actuator 41 is a linear actuator configured to apply a pushing force or a pulling force to the lifting mechanism 42 to drive the lifting mechanism 42 to elongate or retract in the vertical direction. The actuator 41 includes an output shaft 411 that is movable in a direction parallel to the grooves 4311 of the bottom plate 431. Lower ends of the bars 4211 of the support 421 are connected to the output shaft 411 through a connection rod 412. The output shaft 411 can then apply a pushing/pulling force to the lower ends of the bars 4211 of the support 421. The wheels of the support 421 can then move in the grooves 4311, which drives the lifting mechanism 42 to elongate or retract. In one embodiment, the elevation mechanism 40 further includes two rods 433 fixed to the top plate 432, and two tubes 434 fixed to the bottom plate 431. The guiding rods 433 are substantially perpendicular to the top plate 432. The tubes 434 are substantially perpendicular to the bottom plate 432, and arranged according to the two rods 433. The elevation mechanism 40 further includes two springs 435. The bottom end of each spring 435 is fixedly received in one tube 434, and each rod 433 is received in one spring 435. When the lifting mechanism 42 is in a fully retracted state, the springs 435 are compressed by the top plate 432. When the lifting mechanism 42 is in a fully elongated state, the springs 435 return to their original form. When the drawer assembly 20 is moving down, the springs 435 are gradually compressed by the top plate 432, which can reduce load acting on the linear rail of the actuator 41. In another embodiment, four springs 435 are disposed at four corners of the bottom plate.

Figure 25:
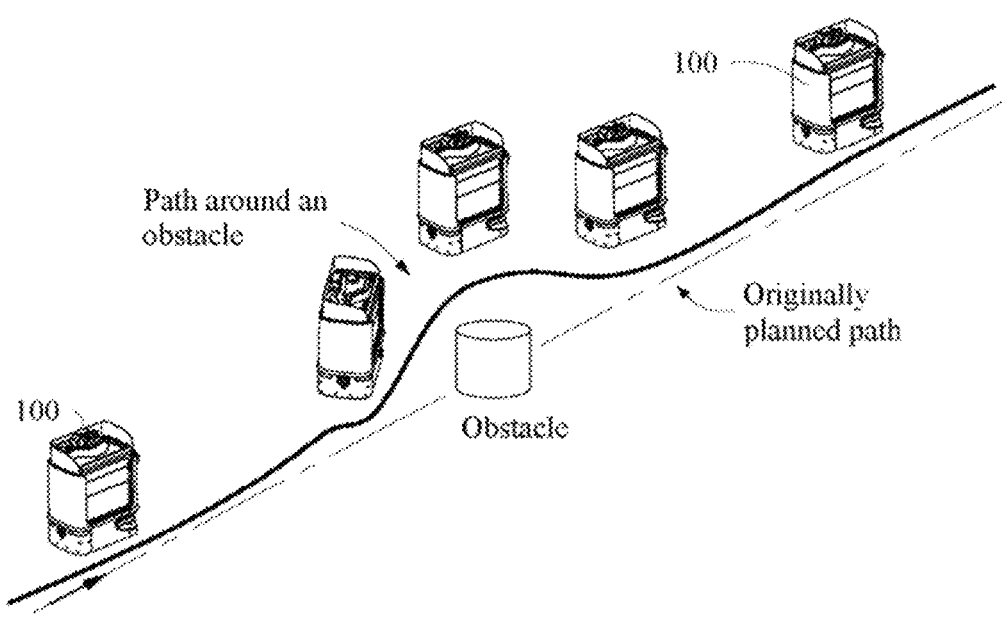
FIG. 25 is a schematic view showing the robotic assistant avoiding an obstacle during movement along a planned path.
Figure 26:
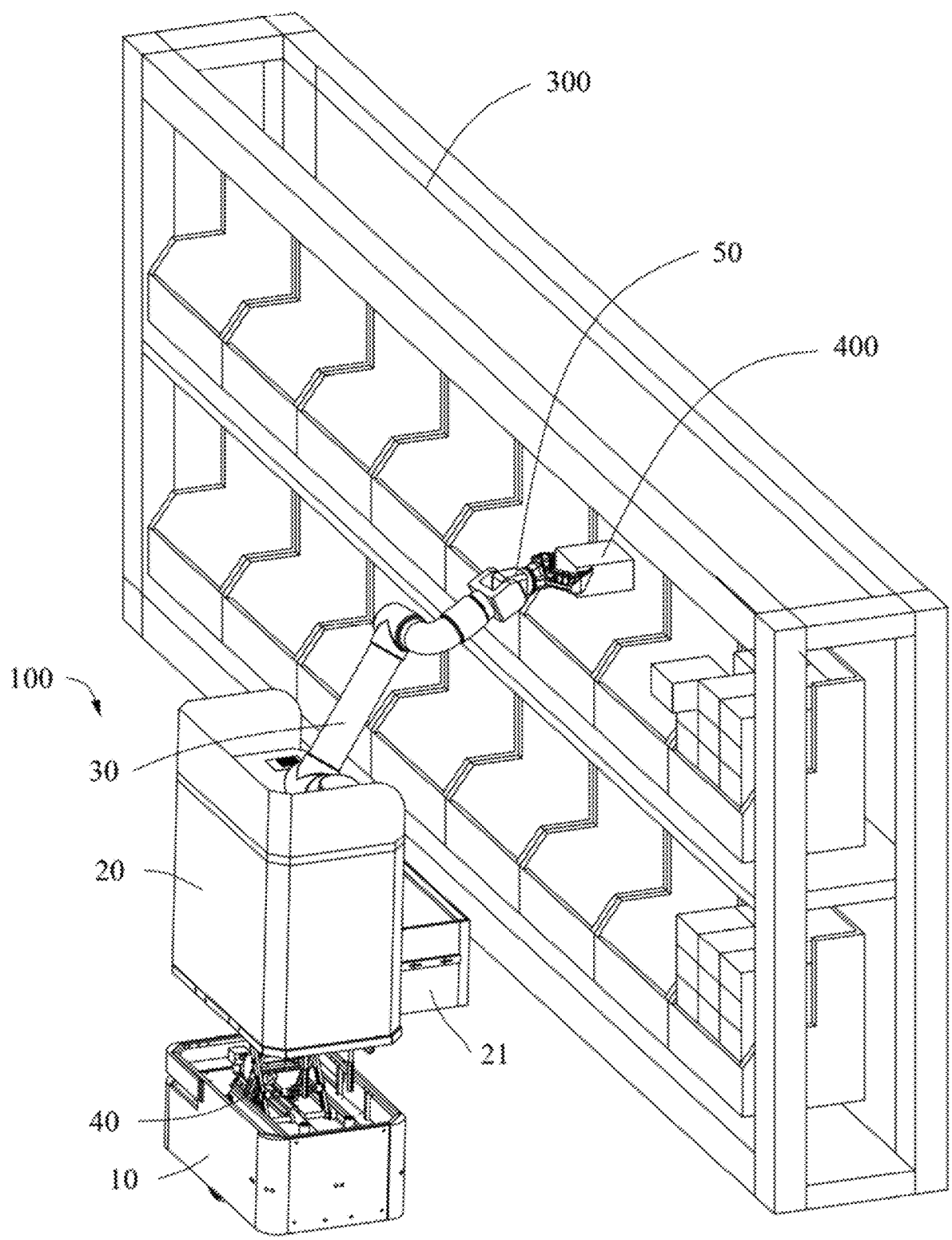
FIG. 26 is a schematic view that shows the robotic assistant picking up a determined object from the storage shelf.

With reference to FIG. 25, the robotic assistant 100, including mechanical and software aspects as described above, can be an autonomous robot having capabilities that include accurate localization, motion planning, and trajectory tracking. The robotic assistant 100 can determine its real-time position in a known map during movement along a planned path. If there is a dynamic obstacle (e.g., obstacle in FIG. 25) on the planned path, the robotic assistant 100 can detect the obstacle and plan a new path to avoid the obstacle. With these capabilities, the robotic assistant 100 can autonomously move between a starting location and a target location so as to achieve an assigned task, such as moving from location A to location B, fetching medicines from location B, and delivering the medicines to location C. This allows for smart logistics and provides for an unsupervised end-to-end logistics solution, With reference to FIG. 26, the robotic assistant 100, including mechanical and software aspects as described above, can be an autonomous robot including a foldable arm 30 with a high dexterous EOAT 50, which is versatile enough to perform precision grasps on small objects, as well as robust power grasps on heavier/bulkier objects. The robotic assistant 100 is able to identify objects in a scene, train or detect an optimal grasp pose for each object geometry, localize objects relative to the manipulator base or the EOAT, plan collision-free or "collision-safe" path to pre-grasp pose, plan grasping configuration, and localize objects in post-grasp configuration. With these capabilities, the robotic assistant 100 can provide an unsupervised end-to-end logistics solution to cater to various delivery and logistics needs. Specifically, as shown in FIG. 26, after the robotic assistant 100 has moved to a target location (e.g., shelf 300), the foldable arm 30 and the EOAT 50 are controlled to be in a state such that the EOAT 50 can reach a determined position to pick up a determined object 400. During this process, the robotic assistant 100 will determine the reachability to the object 400 and may control the elevation mechanism 40 to move the drawer mechanism 20 up to a determined height such that the foldable arm 30 and the EOAT 50 can reach the object 400. In one embodiment, after the EOAT 50 has grasped the object 400, the robotic assistant 100 may open one drawer 21 to allow the foldable arm 30 to load the object 400 into the drawer 21, and close the drawer 21 before the robotic assistant 100 is in motion. After the robotic assistant 100 has moved from the shelf 300 to a determined location, the robotic assistant 100 may open the drawer 21 to allow the foldable arm 30 to unload the object 400. During this loading and unloading process, the robotic assistant 100 may employ a tracking system (e.g. RFID enabled item tracking, or bar code scanner) to track stock of the objects (e.g., medicine, gloves) that are being loaded and unloaded. Additionally, the tracking system allows for the robotic assistant 100 to determine which authorized personnel or patient has loaded, received, and/or opened the drawer mechanism 20. All of this information can be uploaded to a centralized database for tracking purposes and can be used to re-order stock automatically when certain thresholds are met. Moreover, the tracking system can send a visual, audio, or electronic alert when the authorized personnel or patient has loaded, received, and/or opened the drawer mechanism 20 or when stock is depleted.

Figure 27:
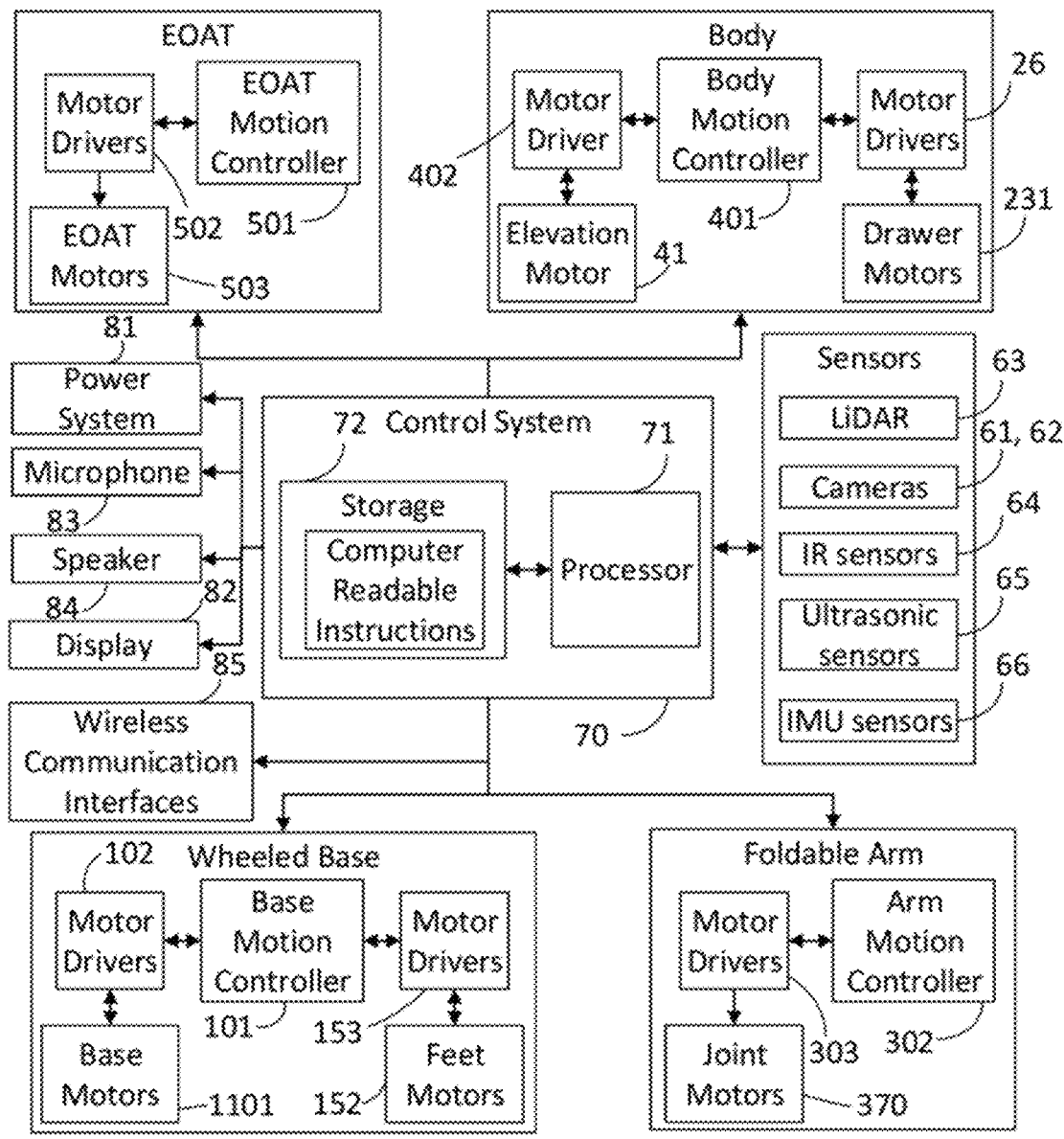
FIG. 27 is a schematic block diagram of the robotic assistant according to one embodiment.

With reference to FIG. 27, in one embodiment, the control system 70 includes a processor 71 and a storage 72 that stores computer readable instructions.

The processor 71 runs or executes various software programs and/or sets of instructions stored in storage 72 to perform various functions for the robotic assistant 100 and to process data. The processor 71 may be a central processing unit (CPU), a general purpose processor, a digital signal processor (DSP), an application specific integrated circuit (ASIC), a field-programmable gate array (FPGA), a programmable logic device, a discrete gate, a transistor logic device, a discrete hardware component, or a combination of some of or all of these components. The general purpose processor may be a microprocessor or any conventional processor or the like.

The storage 72 may store software programs and/or sets of computer readable instructions and may include high-speed random access memory and may include non-volatile memory, such as one or more magnetic disk storage devices, flash memory devices, or other non-volatile solid-state memory devices.

The robotic assistant 100 further includes a base motion controller 101 electrically connected to the processor 71, motor drivers 153 that are electrically connected to the base motion controller 101 and configured to drive the motors 152 (hereinafter "feet motors 152") of the actuated feet 15, and motor drivers 102 that are electrically connected to the base motion controller 101 and configured to drive the motors (hereinafter "base motors 1101") of the base 10.

With reference to FIG. 27, the robotic assistant 100 further includes a body motion controller 401 electrically connected to the processor 71, motor drivers 26 that are electrically connected to the body motion controller 401 and configured to drive the motors 231 or 231a (hereinafter "drawer motors 231") of the drawer mechanism 20, and a motor driver 402 that is electrically connected to the body motion controller 401 and configured to drive the actuator 41 (hereinafter "elevation motor 41") of the elevation mechanism 40.

With reference to FIG. 27, the robotic assistant 100 further includes an arm motion controller 302 electrically connected to the processor 71, and motor drivers 303 that are electrically connected to the arm motion controller 302 and configured to drive joint motors 370 of the revolute 37 of the foldable arm 30. The robotic assistant 100 further includes an EOAT motion controller 501 electrically connected to the processor 71, and motor drivers 502 that are electrically connected to the EOAT motion controller 501 and configured to drive EOAT motors 503 of the EOAT 50. The EOAT motors 503 may include one or more of the motors 511b, 515b, 545b, 53c, 55d, 54e, 55e, 54f, 55f, and 56f described above.

The robotic assistant 100 further includes a power system 81 that powers various components of the robotic assistant 100. The power system 81 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of electrical power. The power system 81 may further include a self-charging unit that can be engaged with a docking charging station in a fixed location, which allows the robotic assistant 100 to be charged.

In one embodiment, the robotic assistant 100 may further include a display 82. The display 82 may be a touch-sensitive screen and provides an input interface and an output interface between the robotic assistant robot 100 and a user. The display 82 displays visual output to the user. The visual output may include graphics, text, icons, video, and any combination thereof.

In one embodiment, the robotic assistant 100 may further include a speaker 83 and a microphone 84 that provide an audio interface between a user and the robotic assistant 100. The microphone 84 receives audio data, converts the audio data to an electrical signal that is transmitted as a command to the control system 70. The speaker 83 converts the electrical signal to human-audible sound waves.

It should be noted that FIG. 27 shows only one example of the robotic assistant 100, and that the robotic assistant 100 may have more or fewer components than shown, may combine two or more components, or may have a different configuration or arrangement of the components. For example, the robotic assistant 100 may further include wireless communication interfaces 85, such as WIFI and BLUETOOTH modules. In another example, the EOAT motion controller may be connected to the arm motion controller. In this example, commands to the EOAT go through the arm motion controller. By contrast, in the embodiment, the commands go directly to the EOAT. Either way, the processor is in charge of commanding the EOAT directly or indirectly. The various components shown in FIG. 27 may be implemented in hardware, software or a combination of both hardware and software, including one or more signal processing and/or application specific integrated circuits.

Figure 28:
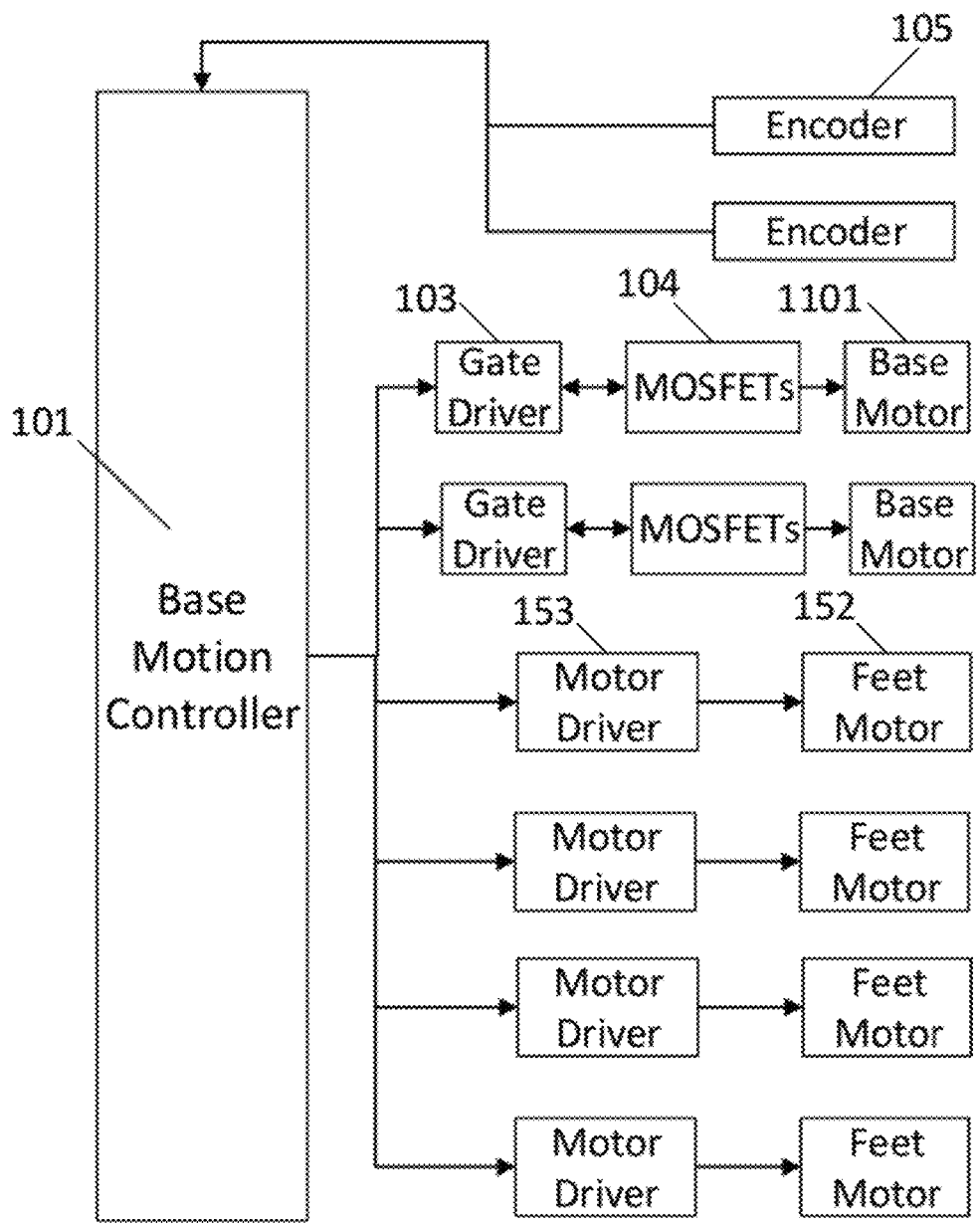
FIG. 28 is a schematic block diagram of a base control subsystem of the robotic assistant according to one embodiment.

With reference to FIG. 28, in one embodiment, the robotic assistant 100 includes two base motors 1101 for driving two wheels 111 of the base 10, respectively. The base motors 1101 can be direct current (DC) motors. The robotic assistant 100 includes two motor drivers 102 to drive the two base motors 1101, respectively. The base motion controller 101 directs the motion of the base motors 1101 in response to command instructions from the processor 71. The base motion controller 101 can be a DC motor controller that can achieve speed control of DC motors using pulse width modulation (PWM) method. The base motion controller 101, based on its programming, performs various calculations and gives an output to the gate drivers of the motor drivers 102 and motor drivers 153, which in turn drive the base motors 1101 and the feet motors 152. In other embodiments, the base motors 1101 and the feet motors 152 may be controlled by two or more separate motion controllers.

In one embodiment, each motor driver 102 includes a gate driver 103 electrically connected to the base motion controller 101, and a number of transistors 104 that are electrically connected to one base motor 1101. The gate driver 103 and the transistors 104 may be separate components, or integrated into one single integrated circuit. Each base motor 1101 includes an encoder 105 that is configured to detect an angular position of a rotor of the base motor 1101, and outputs rotor angle information as a rotor position signal to the base motion controller 101. In other embodiments, the encoder 105 may be replaced by other position sensors, such as Hall effect sensors, back electromotive force (EMF) zero-crossing detectors, and/or generally any other devices that can generate information indicative of the angular position of the rotor of the base motor 1101.

The angular position signals from the two encoders 105 allow the base motion controller 101 to generate closed loop commands that are provided to the gate drivers 103. The angular position signals from the two encoders 105 also serve as additional odometry information to enhance navigation and self-localization performance. The gate drivers 126 then generate variable duty cycle PWM motor drive signals to drive the base motors 1101. Specifically, there may be six transistors 104 that are arranged in three half-H bridge arrangements. Each gate driver 126 generates gate drive signals to drive the six transistors 104, respectively. The six transistors 104 generate the variable duty cycle PWM motor drive signals that cause one base motor 1101 to rotate. In one embodiment, each of the transistors 104 is an N-channel metal oxide semiconductor field effect transistor (MOSFET). It should be noted that the transistors 104 are not limited to N-channel MOSFETs, and other types of switching elements may be employed, for example P-channel MOSFETs, bipolar junction transistors (BJTs), silicon-controlled rectifiers (SCRs), thyristors, triacs, or other similar switching elements. It should be noted that the motor driver 12 is not limited and can change according to actual needs. For example, the motor driver 12 may be replaced by commercially available DC motor drivers.

The base motion controller 101 receives commands from the processor 71. The commands may include many different instructions, including descriptions of the motion to be achieved by the wheels Ill, or instructions to the base motion controller 101 to perform other system maintenance/system monitoring tasks.

An example of an instruction describing motion would be the transmission of a target speed to be achieved over a predetermined time. The base motion controller 101 is programmed in such a manner as to continuously monitor and calculate the speed of the wheels 111 using the signals from the encoder 105 associated with each wheel 111, and can thus determine the difference between the targeted speed and the current speed. The base motion controller 101 can then convert this difference into an instruction to its onboard pulse width modulator (PWM) system to increase or decrease the duty cycle of the PWM signal. This PWM signal is fed through the gate drivers 103 to the transistors 104 and results in a corresponding increase or decrease in the current directed into the coils of the base motors 1101, causing the base motors 1101 to go faster or slower.

Through a similar sequence of operations, the direction of motion may also be controlled, in that a command from the processor 71 to turn left or turn right can be converted by the base motion controller 101 to signals to drive the two wheels Ill at different rates, turning the robotic assistant 100 as it moves. In one embodiment, another sequence of operation for the base motion controller 101 is to receive a command to move the wheeled base 10 a predetermined distance forward, backward, or along a path described as a sequence of positions relative to the current positions of the wheeled base 10.

The base motion controller 101 may also perform other functions. In particular the base motion controller 101 may report to the processor 71 the position of the wheels 111, the angular distance moved by the wheels 111, or the speed by calculating this information from information derived from the encoders 105.

The robotic assistant 100 including the two differentially driven wheels 111 is a differential-drive wheeled mobile robot. The two wheels are independently driven. One or more passive castor wheels are used for balance and stability. If the wheels rotate at the same speed, the robot moves straightforward or backward. If one wheel is running faster than the other, the robot follows a curved path along the arc of an instantaneous circle. If both wheels are rotating at the same speed in opposite directions, the robot turns about the midpoint of the two driving wheels.

In one embodiment, the feet motors 152 are DC motors, and each of the motor drivers 153 may include an H-bridge circuit that includes four switching elements (e.g., MOSFETs). Specifically, the H-bridge circuit includes two high-side switching elements S1 and S2, and two low-side switching elements S3 and S4. The high-side switching element S1 and the low-side switching element S3 are connected in series, and the high-side switching element S2 and the low-side switching element S4 are connected in series. The switching elements S1, S3 and the switching elements S2, S4 are connected in parallel between a power supply and ground. The feet motor 152 driven by the motor driver 153 are connected to a connection point of the switching elements S1 and S3, and a connection point of the switching elements S2 and S4. When the switching elements S1 and S4 of one motor driver 153 are turned on, the feet motor 152 driven by the motor driver 153 rotates in a first direction (e.g., clockwise direction). When the switching elements S2 and S3 are turned on, the feet motor 152 rotates in an opposite second direction (e.g., counterclockwise direction). The configuration of the H-bridge circuit is not limited and may change according to actual needs.

Each motor driver 153 may further include a gate driver. The gate driver is configured to generate gate drive signals to drive the H-bridge circuit. By changing the duty cycle of the PWM input signals from the base motion controller 101, the speed of the feet motors 152 can be adjusted. It should be noted that the configuration of the motor drivers 153 is not limited and other commercially available DC motor drivers may be used instead.

In one embodiment, in response to a command from the processor 71, the base motion controller 101 controls the feet motors 152 to move the feet 151 between their retracted positions (see FIG. 8A) and extended positions (see FIG. 8B). The feet motors 152 can be linear motors that are not back drivable, which means that sliders of the feet motors 152 will be locked when the feet motors 152 are de-energized, thereby enabling the feet 151 to stay in contact with the support surface in the case of power failure during object manipulation tasks. In one embodiment, each feet motor 152 may have built-in mechanical snap-action switches to automatically stop its motion when either end of the feet travel is reached. It should be noted that FIG. 28 shows only one example, and that the robotic assistant 100 may have more components than shown, or may have a different configuration or arrangement of the components.

In one embodiment, the arm motion controller 302 may have a configuration the same as or similar to the base motion controller 101. The motor drivers 303 may have a configuration the same as or similar to the motor drivers 102 or 153. The joint motors 370 can be DC motors. The processor 71 may perform a motion-planning algorithm to generate a probabilistic road map, or PRM. A PRM is a graph consisting of points in obstacle-free space, with lines called "edges" connecting points where direct movement between them doesn't result in a collision. The processor 71 sends a command to the arm motion controller 302, which in turn drives the joint motors 370. Each joint motor 370 then rotates for a determined angle so as to move the foldable arm 30 within the obstacle-free space.

In one embodiment, the EOAT motion controller 501 may have a configuration the same as or similar to the base motion controller 101. The motor drivers 502 may have a configuration the same as or similar to the motor drivers 102, 153 or 303. The EOAT motors 503 can be DC motors. The processor 71 sends a command to the EOAT motion controller 501 after the EOAT 50 has been moved to a position within a predetermined range of a determined object by the arm motion controller 302. The EOAT motion controller 501 then controls the EOAT motors 503 so as to move the fingers of the EOAT 50 as the EOAT 50 is approaching the determined object, which allows the EOAT 50 to grasp the determined object. The processor 71 may monitor the grip force acting on the determined object and send a command to the EOAT motion controller 501 when the grip force has reached to a determined value. The EOAT motion controller 501 then signals the motor drivers 502 to stop motion of the EOAT motors 503, which allows the fingers of the EOAT 50 to grasp the determined object without slippage. The processor 71 may then perform a motion-planning algorithm and signal the arm motion controller 302 to control the foldable arm 30 to move in an obstacle-free space toward one determined drawer 21. After the EOAT 50 has moved to a position within a predetermined range of the drawer 21, the processor 71 then signals the EOAT motion controller 501 to control the fingers of the EOAT 50 to release the object. The object is then placed into the drawer 21.

Figure 29:
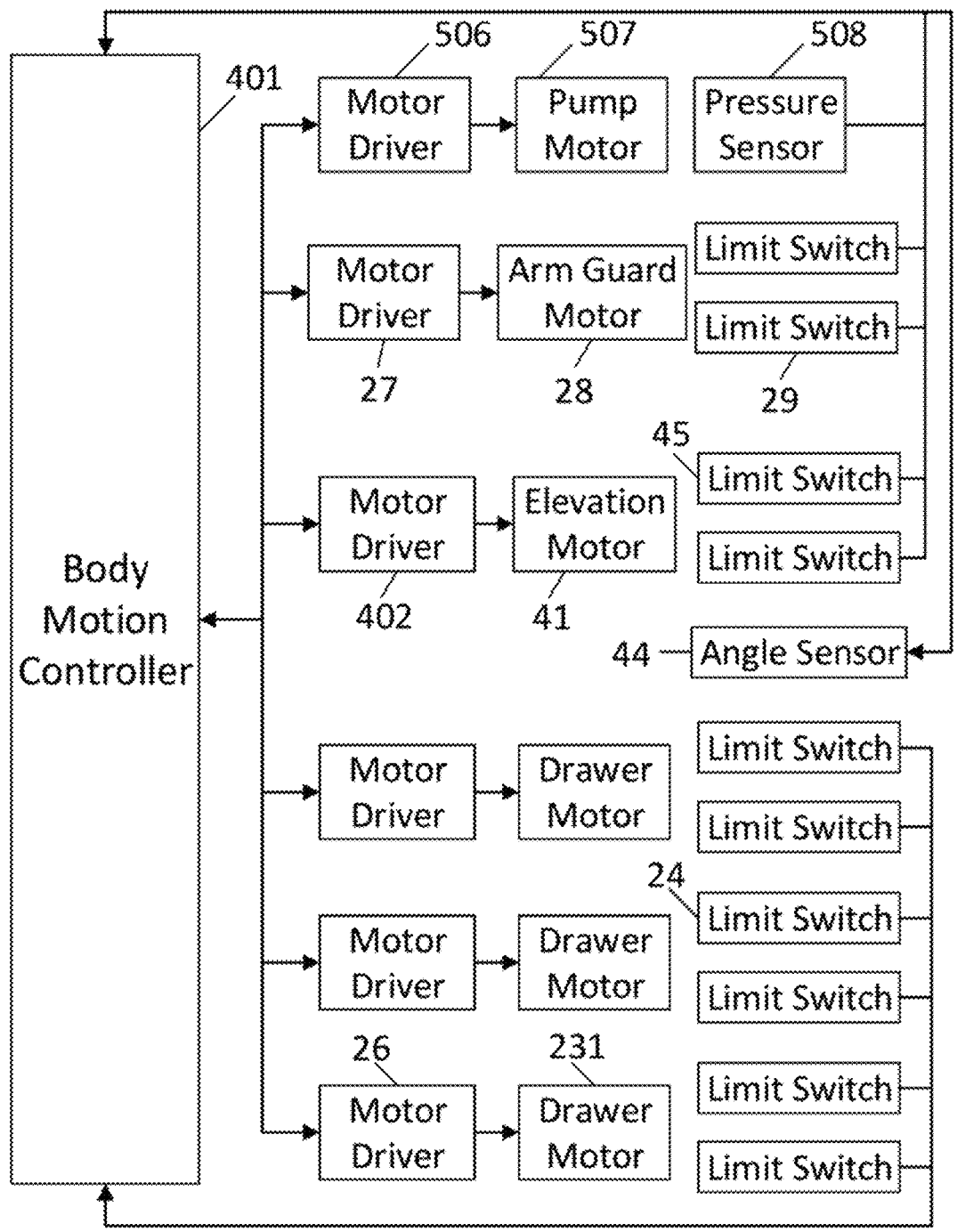
FIG. 29 is a schematic block diagram of a body control subsystem of the robotic assistant according to one embodiment.

With reference to FIG. 29, in one embodiment, the body motion controller 401 may have a configuration the same as or similar to the base motion controller 101. The motor drivers 26 may have a configuration the same as or similar to the motor drivers 102, 153, 303 or 502. The drawer motors 231 can be DC motors. The body motion controller 401 may receive commands from the processor 71. The commands may include many different instructions, including descriptions the motion to be achieved by a determined drawer 21, such as a sliding movement from an open position (see FIG. 1I) to a closed position (see FIG. 1). One motor driver 26 then signals a corresponding drawer motor 231 to rotate so as to drive the determined drawer 21 to slide from the open position to the closed position. The body motion controller 401 may stop operation of the drawer motor 231 upon receipt of a signal from one limit switch 24 which represents that the drawer 21 has reached its travel limit. In another embodiment, the body motion controller 401 may determine the position of the drawer in its working space based on position feedback signals from an encoder device attached to the drawer mechanism.

The motor driver 402 may have a configuration the same as or similar to the motor drivers 102, 153, 303, 502 or 26. The elevation motor 41 can be a DC motor. The body motion controller 401 may receive commands from the processor 71. The commands may include many different instructions, including descriptions the motion to be achieved by the drawer mechanism 20 that is driven by the elevation mechanism 40, such as an upward movement from an original lowered position (see FIG. 1A) to a raised position (see FIG. 3). The body motion controller 401 may monitor the distance that the drawer mechanism 20 has traveled by performing a calculation based on signals from an angle sensor 44 that are indicative of the rotational angle of the rotor of the elevation motor 41. After the drawer mechanism 20 has traveled a predetermined distance and moved to the determined position, the motion controller 401 may stop operation of the elevation motor 41. The body motion controller 401 may stop operation of the elevation motor 231 upon receipt of a signal from one of two limit switches 45 which represents that the drawer mechanism 20 has reached its travel limit.

In one embodiment, the robotic assistant 100 may further include an arm guard 280 (FIG. 1B) or 281 (FIG. 1A) that is made of clear or translucent plastic/polycarbonate and used to obscure and/or protect the foldable arm 30. The arm guard 280/281 is connected to the drawer mechanism 20, and slidable or retractable between a raised position (FIG. 1A) and a hidden position (FIG. 1B). In another embodiment, the arm guard 280/281 is mounted to the outer enclosure and can be retraced or lifted up by lid motor 28. The robotic assistant 100 may further include an arm guard motor 28 for moving the arm guard 280/281 between the raised position and the hidden position. The arm guard motor 28 can be a DC motor. The robotic assistant 100 may further include a motor driver 27 that is configured to drive the arm guard motor 28. The motor driver 27 may have a configuration the same as or similar to the motor drivers 102, 153, 303, 502, 26 or 402. The body motion controller 401 may receive commands from the processor 71. The commands may include many different instructions, including descriptions the motion to be achieved by the arm guard 280/281, such as a sliding movement from the hidden position to the raised position. The body motion controller 401 may stop operation of the arm guard motor 28 upon receipt of a signal from one of two limit switches 29 which represents that the drawer 21 has reached its travel limit.

In one embodiment, the robotic assistant 100 may further include a vacuum pump motor 507 to evacuate most of the air from under the suction cup 513 of FIG. 20. The vacuum pump motor 507 can be a DC motor. The robotic assistant 100 may further include a motor driver 506 to drive the vacuum pump motor 507. The motor driver 506 may have a configuration the same as or similar to the motor drivers 102, 153, 303, 502, 26, 27 or 402. The body motion controller 401 may monitor the level of pressure below ambient atmospheric pressure inside the suction cup according to signals from a pressure sensor 508. The body motion controller 401 can then signal the motor driver 506 to drive the vacuum pump motor 507 such that the level of pressure below ambient atmospheric pressure inside the suction cup can be maintained at a determined value, which allows the suction cup to provide a determined lifting force to the object during an object manipulation task. It should be noted that FIG. 29 shows only one example and that the robotic assistant 100 may have more components than shown, or may have a different configuration or arrangement of the components.

With reference to FIG. 27, in one embodiment, the robotic assistant 100 includes a number of sensors 60 including two RGB-D or 3D cameras 61 and 62, a number of LiDAR sensors 63, a number of IR sensors 64, a number of ultrasonic sensors 65, and a number of IMU sensors 66. One camera 61 described above is disposed on the foldable arm 30 or the EOAT 50. The other camera 62 is disposed on a housing arranged around the drawer mechanism 20, which is shown in FIG. 1A. The IR sensors 64 and the ultrasonic sensors 65 are disposed on a housing arranged around the wheeled base 10, which is shown in FIG. 1A. The IMU sensors 66 are disposed on the wheeled base 10. The sensors 62 to 66 are configured to output data to the processor 71 such that the processor 71 can perform localization, motion planning, trajectory tracking control and obstacle avoidance for the robotic assistant 100, which will be described in detail below. In one embodiment, the sensors 61 to 66 are electrically connected directly to the processor 71.

Figure 30:
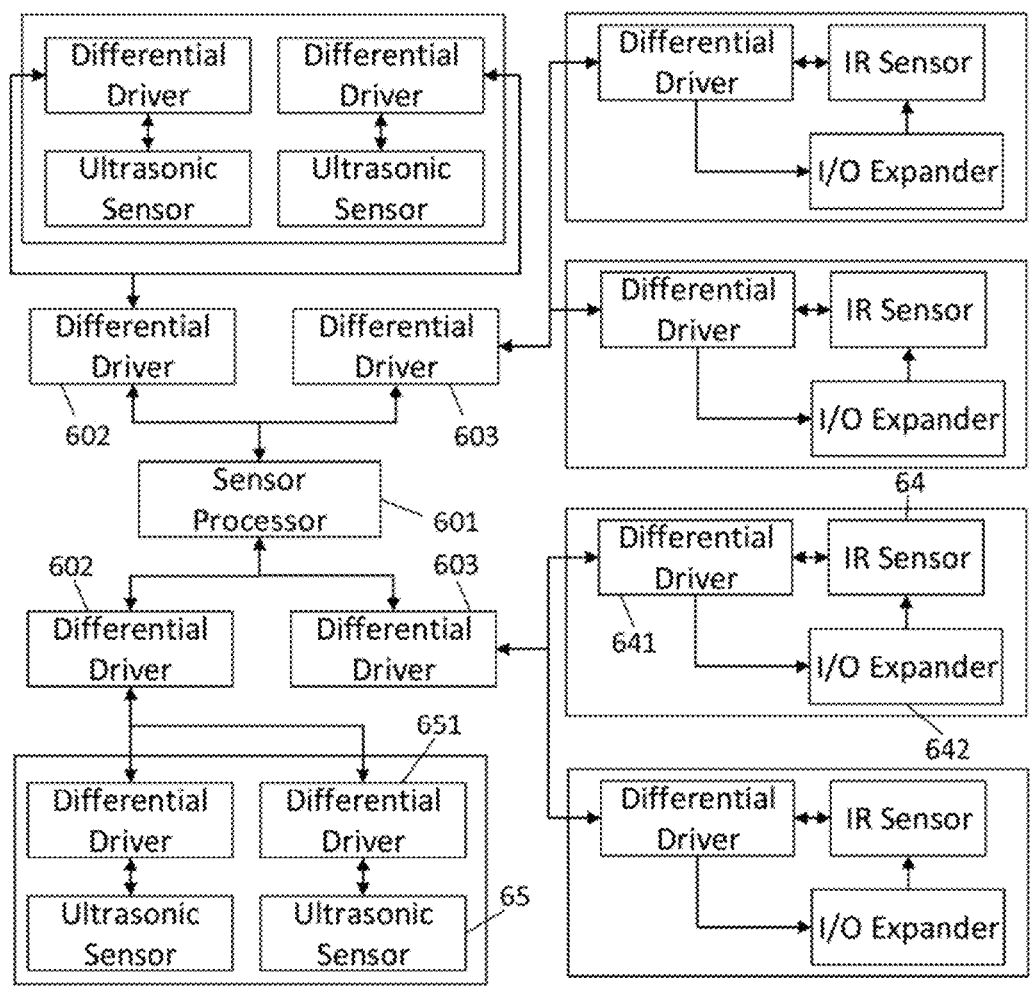
FIG. 30 is a schematic block diagram of a sensing subsystem of the robotic assistant according to one embodiment.

With reference to FIG. 30, in one embodiment, the IR sensors 64 and the ultrasonic sensors 65 may be electrically connected to a sensor processor 601. The sensor processor 601 receives and process data from the IR sensors 64 and the ultrasonic sensors 65 and sends the processed data (e.g., distance from the sensors to an object) to the processor 71 and/or one or more of the motion controllers described above. In one embodiment, two IR sensors 64 and two ultrasonic sensors 65 are disposed on the front side of the robotic assistant 100, and two IR sensors 64 and two ultrasonic sensors 65 are disposed on the rear side of the robotic assistant 100. However, the number and arrangement of the IR sensors 64 and the ultrasonic sensors 65 may change according to actual needs.

In one embodiment, the IR sensors 64 and the ultrasonic sensors 65 are electrically connected to the sensor processor 601 through a number of differential drivers. Specifically, two differential drivers 602 and two differential drivers 603 are electrically connected to the sensor processor 601. Each differential driver 602 is electrically connected to two differential drivers 651, and each differential driver 651 is electrically connected to one ultrasonic sensor 65. Each differential driver 603 is electrically connected to two differential drivers 641, and each differential driver 641 is electrically connected to one IR sensor 64. In one embodiment, the differential drivers 602, 603, 641, and 651 have the same configuration and can be differential PC bus buffers. The differential drivers 602, 603, 641, and 651 can receive digital signal data packets sent by the IR sensors 64 and the ultrasonic sensors 65 and convert them into signals that the sensor processor 601 can recognize. The bus connected to the IR sensors 64 is passed through differential drivers to immunize it against electromagnetic noise emitted by the base motors 1101. The differential drivers also provide level shifting from 3.3V to 5V and back to 3.3V to further increase the signal to noise ratio along sensor cables.

In one embodiment, one I/O expander 642 is connected to each IR sensor 64 and one differential driver 641. The sensor processor 601 can reset/reboot each IR sensor 64 individually via one I/O expander, such that the IR sensors 64 can have different I²C bus addresses that are assigned by the sensor processor 601 sequentially resetting each IR sensor 64 and immediately issuing a WRITE command. In another embodiment, the arrangement of the I/O expanders 642 and the differential drivers 641 can also be applied to sonar sensors. The use of the I/O expanders 642 can provide remote-IO functionality through 12C bus and hence limit the number of wires stretching across the robotic assistant 100. Furthermore, it should be noted that FIG. 30 shows only one example of the arrangement of the sensor processor, the differential drivers, the IR sensors and the ultrasonic sensors, and that the robotic assistant 100 may have more components than shown, or may have a different configuration or arrangement of the components.

Figure 31:
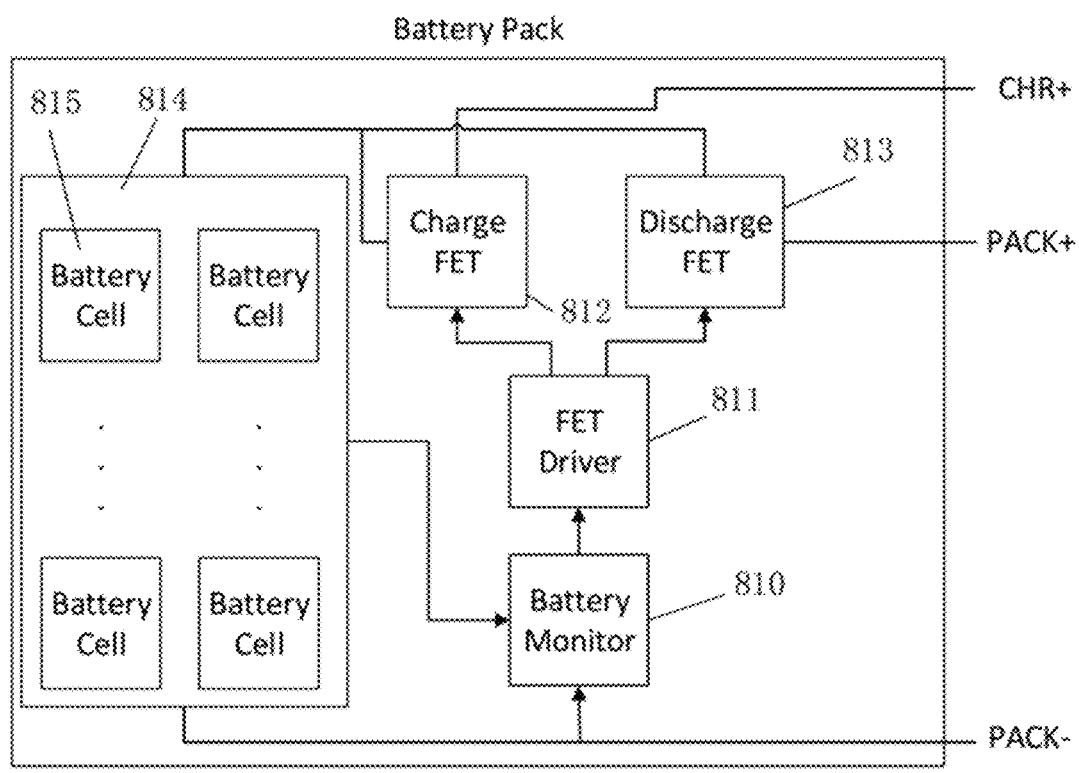
FIG. 31 is a schematic block diagram of a battery pack of the robotic assistant according to one embodiment.

With reference to FIG. 31, in one embodiment, the power system 81 includes a battery pack that includes a battery monitor 810 electrically connected to the processor 71, and a battery module 814 including a number of battery cells 815. The processor 71 can use the battery monitor 810 to implement battery pack management functions, such as monitoring (cell voltages, pack current, pack temperatures), protection (controlling charge/discharge FETs), and balancing. The power system 81 further includes a FET driver 811, a charge FET 812, and a discharge FET 813. In one embodiment, the charge FET 812 is connected to the positive terminal of the battery module 814, and the discharge FET 813 is connected to the positive charging terminal of the battery module 814. In another embodiment, the battery cells 815 may be replaced by separate battery modules that can back up one another and provide more freedom because they can be arranged at different locations according to actual needs.

In one embodiment, the charge FET 812 and the discharge FET 813 can be N-channel MOSFETs. The charge FET 812 and the discharge FET 813 are both electrically connected to the FET driver 811. In response to commands from the battery monitor 810, the FET driver 811 may turn on/off the charge FET 812 and/or the discharge FET 813. When the charge FET 812 is turned on, it allows a charging current from the charging terminal CHR+ to flow into the battery cells 815 to charge the battery cells 815. When the discharge FET 813 is turned on, it allows a discharge current from the cells 815 to flow to the positive terminal of the battery module 814 such that the battery module 814 can power other components of the robotic assistant 100. When the charge FET 812 is turned off, the charging current is blocked by the charge FET 812, which stops the charging process when the cells 815 are fully charged. When the discharge FET 813 is turned off, the discharging current is blocked by the discharge FET 813, which can prevent the battery module 814 from being damaged due to overdischarging. It should be noted that FIGS. 31 and 32 show only one example of the power system 81, and that the power system 81 may have more components than shown, or may have a different configuration or arrangement of the components.

Figure 32:
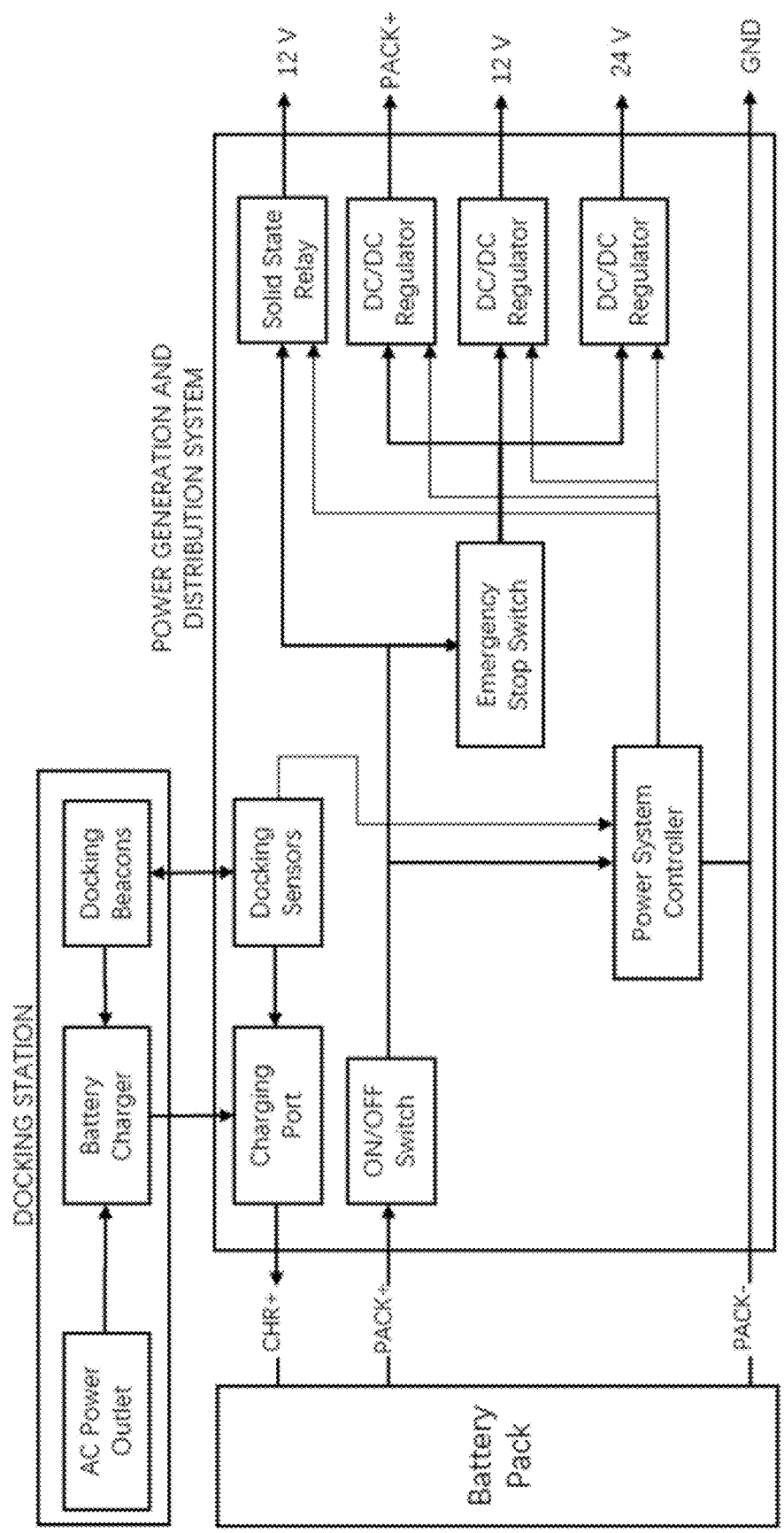
FIG. 32 is a schematic block diagram of a power system of the robotic assistant according to one embodiment.

Referring to FIG. 32, in one embodiment, the power system 81 may further include a power generation and distribution system connected to the battery pack of FIG. 31. The power generation and distribution system may include a power system controller that manages the generation and distribution of different DC supply voltages to the rest of the robotic assistant. In one embodiment, these supply voltages may be 24V, 12V and the voltage on PACK+ for the actuators of the robot as well as 12V for other electronics of the robotic assistant. The power system controller can disable power at each of these different supply outputs. Also, an emergency stop switch can disconnect power from some of these supply outputs to stop the actuators of the robotic assistant in case of an emergency. A docking station for use with the robotic assistant is a stationary element that is connected to the wall outlet. From the electricity available at the outlet, it generates a charging current to charge the battery pack of the robotic assistant when the robotic assistant docks to the docking station. The power system controller also enables the docking to the docking station and the battery charging process. Docking process also involves beacons on the docking station and beacon sensors on the power system of the robotic assistant as well as tits processors, motion controllers, and the other sensing elements. In one embodiment, the beacons on the docking station may comprise infrared light emitting diodes and their driving circuits. The docking sensors on the robotic assistant's power system may comprise infrared sensitive phototransistors and their driving circuits.

Figure 33A:
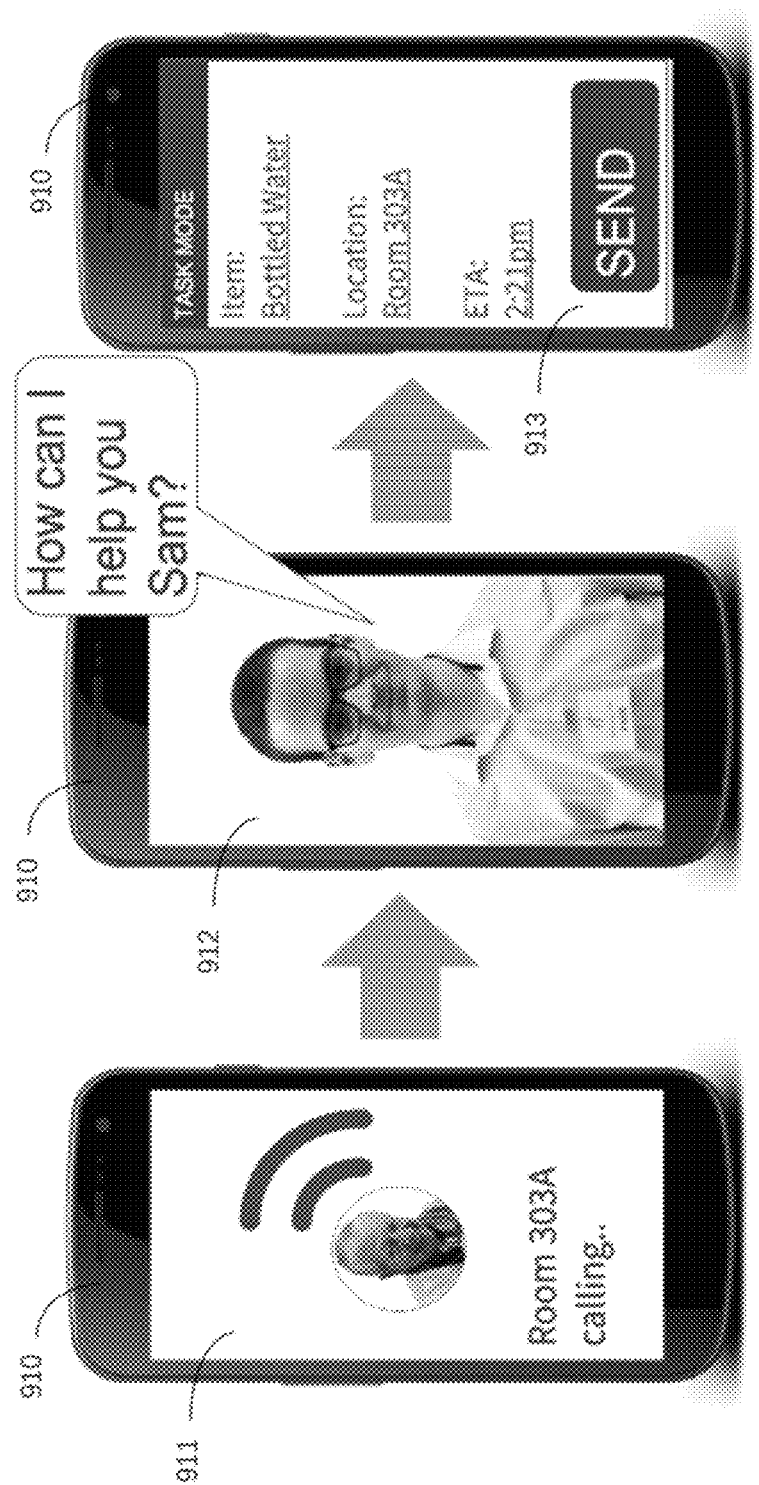
FIG. 33A is a schematic view showing user interfaces for use with the robotic assistant according to one embodiment.

FIG. 33A depicts an example of three user interfaces that can provide for receiving a request from care seekers, communicating with the care seekers, and creating a task request. The user interfaces are rendered on a display of a mobile device 910 and may be generated by a mobile application or a website. The mobile device 910, portrayed in this embodiment as a cell phone, can include any mobile computing device not limited to a smart phone, tablet, or wearable computing device. In the depicted scenario, the user interfaces include a first user interface 911 that allows a healthcare professional to receive a request for video communication from a care seeker. The video communication refers to the transmission of information via live video streaming or through video sharing. With this form of communication, information senders and recipients are able to interact using both audio and video. The user interfaces further include a second user interface 912 that allows the healthcare professional to communicate with the care seeker after he/she has accepted the request for video communication. The healthcare professional can then know the needs of the care seeker. The user interfaces further include a third user interface 913 that allow the healthcare professional to create a task request including objects to be delivered and the location where the objects need to be delivered, and send the task request to a management system that assigns one robotic assistant 100 to perform the task. The task request may be directly sent to one robotic assistant 100 to perform the task. It should be noted that FIG. 33A depicts only an example of user interfaces for use with the robotic assistant 100, and more user interfaces with different elements may be provided.

Figure 33B:
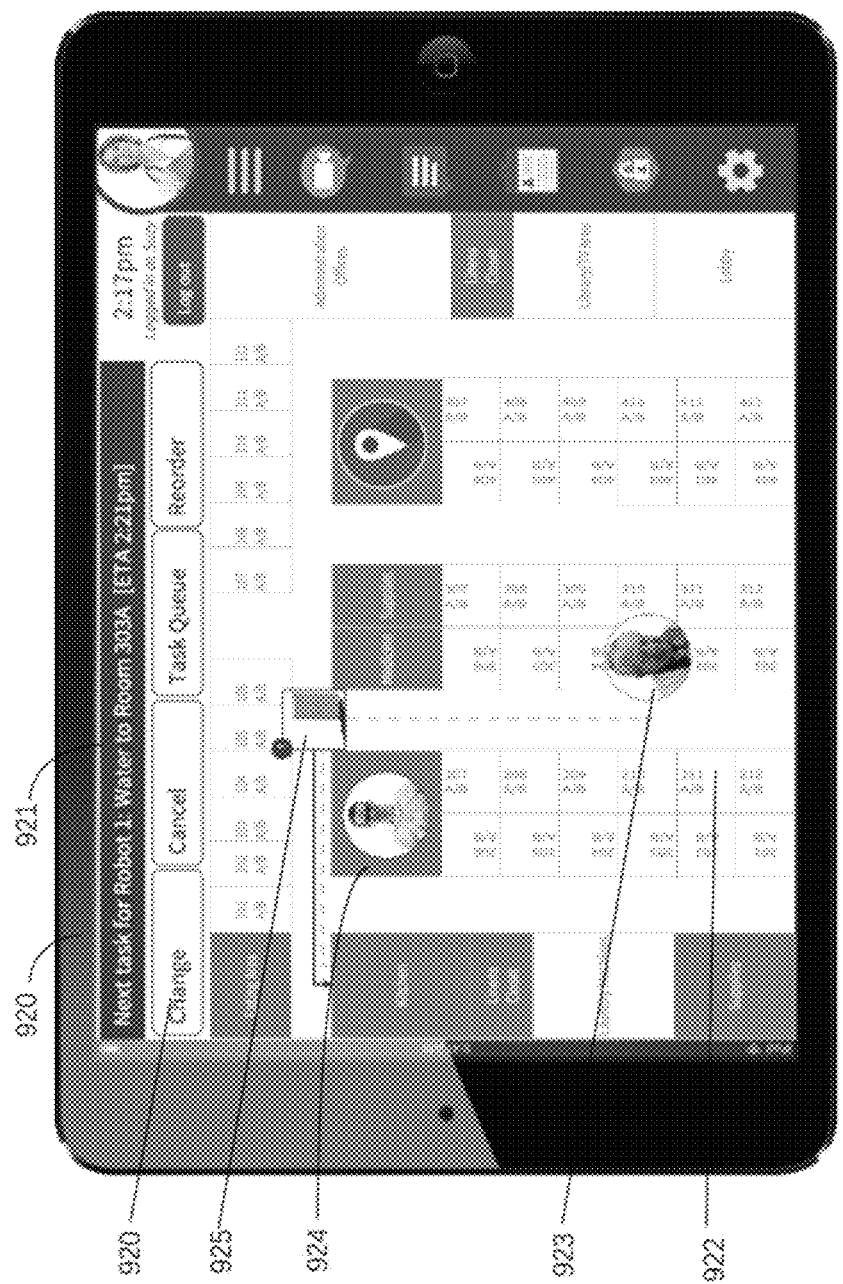
FIG. 33B is a schematic view showing a user interface for use with the robotic assistant according to one embodiment.

FIG. 33B depicts an example of a user interface that can give a more holistic view of a task. The user interface empowers care providers with intuitive fleet management and traceability to locate not just the robotic assistant 100 in action, but also roaming healthcare professionals (e.g., nurses and doctors) or care seekers (e.g., elderly people and patients) at their bedsides or wherever they may be in an elderly care facility. The user interface is rendered on a display of a mobile device 920 and may be generated by a mobile application or a website. The mobile device 920 can be a tablet computer or a lap top computer with a display that can display more content. The user interface presents the user with a task description 921 that can include the name of an object, and the location where the object needs to be delivered. The user interface further includes a schematic floor plan 922 associated with the task. Profile images of the care seeker 923 and the healthcare professional 924 will be displayed on the floor plan at their locations. The user interface further includes an image 925 representing the robotic assistant 100 that performs the current task. The position of the robotic assistant 100 is updated in real time and the position of the image 925 in the floor plan is adjusted accordingly. The moving direction of the robotic assistant may also be displayed. The user interface may further include buttons "Change", "Cancel", "Task Queue", and "Recorder", which allows a user (e.g., healthcare professional) to adjust the current task, access information of all the tasks, and record audio. It should be noted that FIG. 33B depicts only an example of one user interface for use with the robotic assistant 100, and more user interfaces with different elements may be provided.

Figure 33C:
FIG. 33C is a schematic view showing a user interface for use with the robotic assistant according to one embodiment.

FIG. 33C depicts an example of a user interface that may be rendered on a display of a personal computer (e.g., desktop computer, laptop computer) 930 and generated by an application. All capabilities from the foregoing mobile and tablet user interfaces will be available. The displayed information can be customized for care provider. For example, the user interface shows information of all the tasks that is being performed or ready to be performed by one or more robotic assistants. The application will be ideal for healthcare managers or administrators to access the most data-rich user interfaces with full visibility of the overall operation. From prioritization to authorization, full control is centralized for the most efficient workflows. It should be noted that FIG. 33C depicts only an example of one user interface for use with the robotic assistant 100, and more user interfaces with different elements may be provided. All these user interfaces enable care providers with functions required for "smart logistics," which includes responding to requests, optimizing task schedule, identifying optimized routes, etc.

Figure 34:
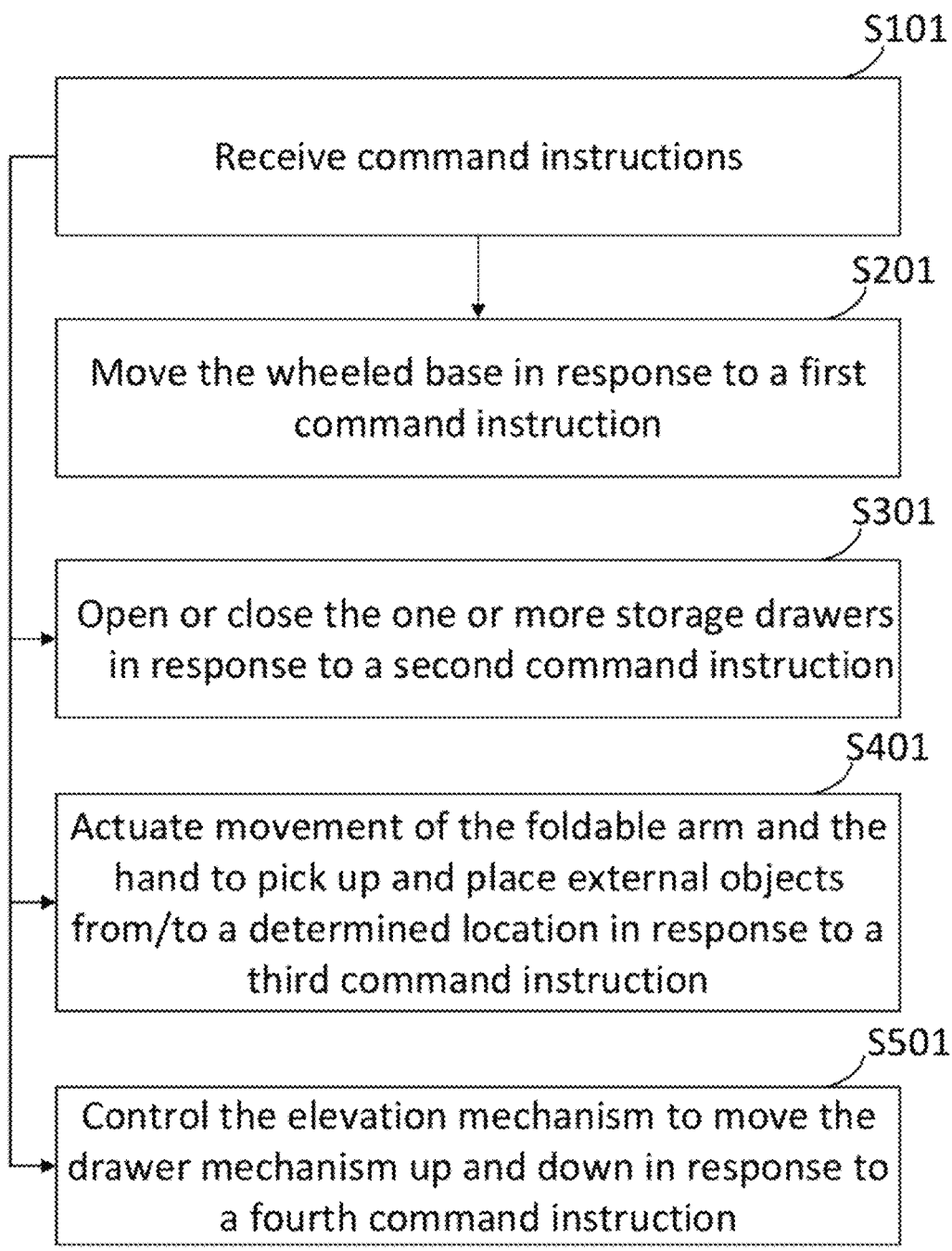
FIG. 34 is a schematic flowchart of a method implemented by a control system of the robotic assistant according to one embodiment.

FIG. 34 is a flowchart illustrating a method of controlling the robotic assistant 100 according to one embodiment, which includes the following steps. It should be noted that the order of the steps as shown in FIG. 34 is not limited and can change according to actual needs. For example, the wheeled base 10 may be controlled to move to a determined location, and the drawer mechanism 20 is then controlled to move up/down to a determined position before one or more drawers 21 are controlled to open. Then, the foldable arm 30 and the EOAT 50 are controlled to grasp one or more determined objects.

Step S101: Receive command instructions. The processor 71 of the control system 70 receives command instructions. For example, the processor 71 may receive a command instruction from a user (e.g., healthcare professional) that request the robotic assistant 100 to fetch an object from one location and deliver the object to another location.

Step S201: Move the wheeled base 10 in response to a first command instruction. The processor 71 may analyze each command instruction and move the wheeled base 10 to a determined location in response to a first command instruction. The first command instruction may include descriptions of locations where the robotic assistant 100 needs to reach. For example, when a user (e.g., healthcare professional) requests the robotic assistant 100 to fetch and deliver an object, the first command instruction may include descriptions of a starting location where the object is stored and a target location where the object needs to be delivered. The processor 71 may execute software programs and/or sets of instructions stored in storage 72 to perform localization, motion planning, and trajectory tracking such that the wheeled base 10 can determine its real-time position in a known map during movement along a planned path. If there is a dynamic obstacle (e.g., obstacle in FIG. 25) on the planned path, the processor 71 can plan a new path to avoid the obstacle. The wheeled base 10 can autonomously move first to the starting location and then to the target location.

Step S301: Open or close the one or more drawers 21 in response to a second command instruction. The processor 71 may analyze each command instruction and open or close the one or more drawers 21 in response to a second command instruction. The processor may receive the second command instruction from a user (e.g., healthcare professional) to open or close the one or more drawers 21. Additionally, the processor 71 may open or close the one or more drawers 21 when certain conditions are met, for example when the robotic assistant 100 has reached the determined location (e.g., starting location and target location). In one embodiment, the healthcare professional may use the tap his/her company badge (either a typical lanyardtype badge or wristband, or other identifying indicators) to the RFID sensor, use voice commands, or face identification unlock to authorize opening of the drawers 21. RFID information of the company badge and/or face identifying information of the person can be uploaded to the tracking system.

Figure 37:
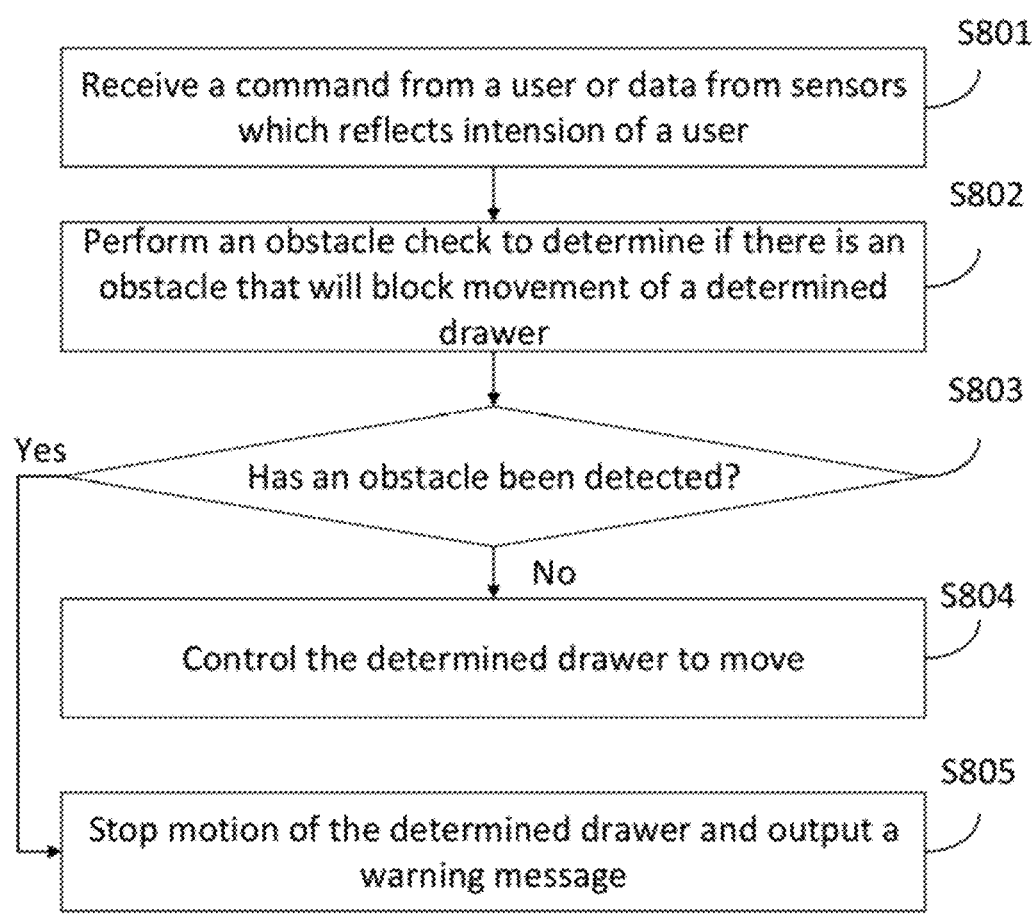
FIG. 37 is a schematic flowchart of a method for controlling the drawers of the robotic assistant.

An exemplary method as shown in FIG. 37 may be performed to control the drawers 2. The drawers open only when there is sufficient space, and close only when potential blockage caused by human fingers or objects that are not properly inserted in the drawers 21 are not detected. The method includes the following steps. Step S801: Receive a command from a user or data from sensors which reflects intension of a user. The processor 71 may receive a command from a user who attempts to open or close the drawers 21. The processor 71 may receive data from one or more sensors that reflects intension of a user. For example, the one or more sensors may include non-contact sensors (e.g. cameras) to detect a user's gestures that are associated with user intention for opening/closing of the drawers 21. Step S802: Perform an obstacle check to determine if there is an obstacle that will block movement of a determined drawer 21. The processor 71 may determine if there is an obstacle that will block movement of a determined drawer 21 based on data from collision detecting sensors (e.g. force sensitive resistors and distance sensors). If an obstacle has been detected, the process goes to Step S805, otherwise, the processor goes to Step S804. Step S804: Control the determined drawer 21 to move. The processor 71 may control the drawer 21 to open or close in response to the command or the data from the sensors. Step S805: Output a warning message. The processor 71 may output a visual and/or audio warning message to alert a user of a potential abnormal condition. The processor 71 may then suspend the response to the command or the data from the sensors.

Step S401: Actuate movement of the foldable arm 30 and the EOAT 50 to pick up and place external objects from/to a determined location in response to a third command instruction. The processor 71 may actuate movement of the foldable arm 30 and the EOAT 50 to pick up and place external objects in response to the third command instruction. The third command instruction may include descriptions of locations where the robotic assistant 100 needs to reach, and an object that needs to be delivered. After the robotic assistant 100 has reached the determined location, the processor 71 may determine where the object is located. For example, the processor 71 may detect objects from a pre-trained list of items based on data from the camera 61 and possibly supplementary range/proximity sensors (collectively referred to as "vision module"). The vision module can report the pose of the detected object(s) relative to the camera 61 as well as the global coordinate frame. Fiducial tags/markers may be added to containers, features in the environment, and/or select objects to make detection more robust. The foldable arm 30 may help reposition and re-orient the vision module mounted on the end of the foldable arm 30 to increase its default field of view and coverage. It can be used in a scanning task to comprehensively search the surroundings for a target object, as well as compensate for a camera module's fixed focus. Coordinated positioning and image acquisition can also be iteratively executed to maximize the accuracy of the object localization. Many object detection and recognition methods have been discussed in publications, such as papers and patents, which will not be described in detail here.

The processor 71 may perform a motion-planning algorithm to generate a probabilistic road map, or PRM. A PRM is a graph consisting of points in obstacle-free space, with lines called "edges" connecting points where direct movement between them doesn't result in a collision. The processor 71 may then control the foldable arm 30 to move in the obstacle-free space. The processor 71 may move the fingers of the EOAT 50 as the EOAT 50 is approaching the determined object, which allows the EOAT 50 to grasp the determined object. The processor 71 may monitor the grip force acting on the determined object such that the fingers of the EOAT 50 to grasp the determined object without slippage. The processor 71 may then control the foldable arm 30 to move in an obstacle-free space toward one determined drawer 21. After the EOAT 50 has moved to a position within a predetermined range of the drawer 21, the processor 71 may then control the fingers of the EOAT 50 to release the object. The object is then placed into the drawer 21.

Figure 35:
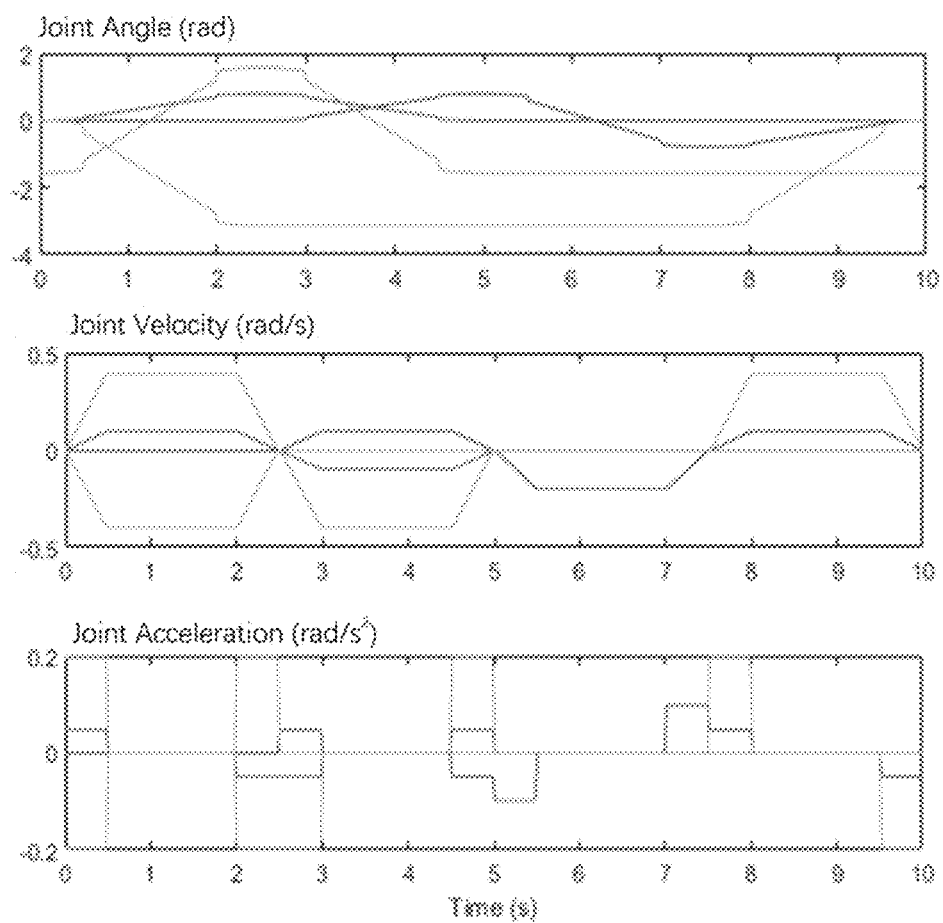
FIG. 35 is a schematic diagram showing motion profile of the foldable arm according to one embodiment.

With reference to FIG. 35, during a manipulation task, motion of the foldable arm 30 needs to follow a given time-profile trajectory within a required time period. An arm motion profile may be created to control motion of the foldable arm 30. For example, when tracking a 4-phase trajectory including unfolding the foldable arm 30 to an extended state, moving the foldable arm 30 to a far-left position, moving the foldable arm 30 to a far-right position, and folding the foldable arm 30 back to the original flat state, the arm motion profile as shown in the diagram below may be created. According to the arm motion profile, the foldable arm 30 is controlled to accelerate for the first 20% of each movement phase, then move in constant speed for the next 60% time, and decelerate in the rest 20% of each movement phase.

Figure 36:
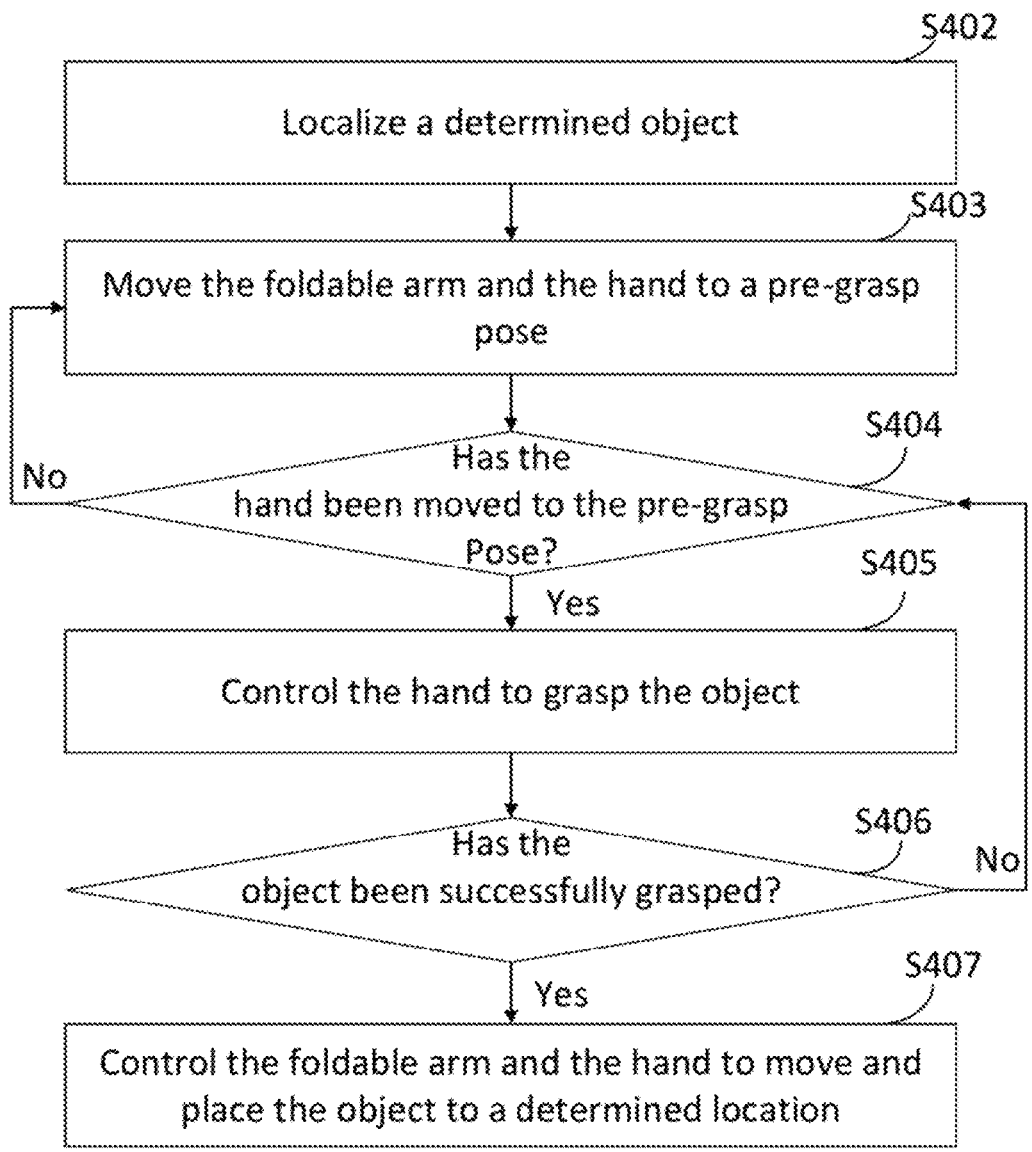
FIG. 36 is a schematic flowchart of a method for controlling the foldable arm and the EOAT of the robotic assistant according to one embodiment.

With reference to FIG. 36, in one embodiment, Step S401 may include the following steps. Step S402: Localize a determined object. Step S403: Move the foldable arm 30 and the EOAT 50 to a pre-grasp pose. Step S404: Determine if the EOAT 50 has been moved to the pre-grasp pose. If the EOAT 50 has been moved to the pre-grasp pose, the process goes to Step S405; otherwise, the process goes back to Step S403. Step S405: Control the EOAT 50 to grasp the object. Step S406: Determine if the object has been successfully grasped. If the object has been successfully grasped, the process goes to Step S407; otherwise, the process goes back to Step S404. Step S407: Control the foldable arm 30 and the EOAT 50 to move and place the object to a determined location.

Step S501: Control the elevation mechanism 40 to move the drawer mechanism 20 up and down in response to a fourth command instruction. The processor 71 may control the elevation mechanism 40 to move the drawer mechanism 20 up and down in response to a fourth command instruction. The fourth command instruction may include descriptions of locations where the robotic assistant 100 needs to reach, and an object that needs to be delivered. After the processor 71 has determined the position of the object, it may determine the reachability to the object. According to the determined reachability, the processor 71 may control the elevation mechanism 40 to move the drawer mechanism 20 up such that the foldable arm 30 can reach the determined object. During the process of placing the object into the drawer, the processor 70 may control the elevation mechanism 40 to move the drawer mechanism 20 down to its original lowered position.

Figure 38:
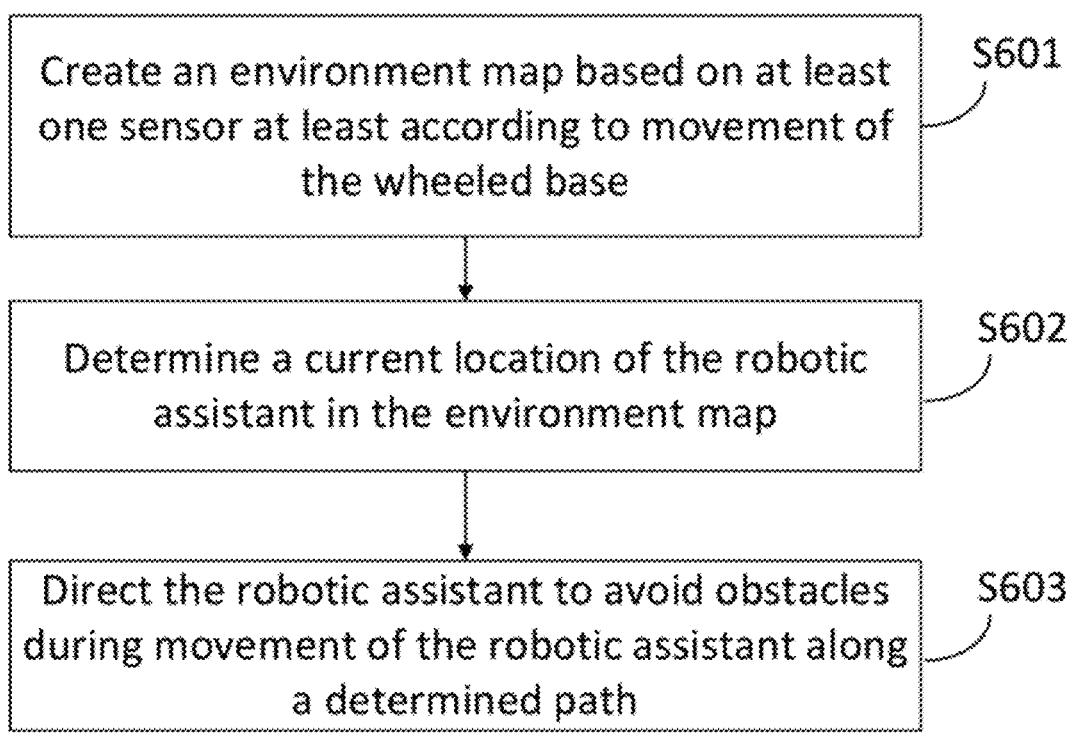
FIG. 38 is a schematic flowchart of a method for the navigation of the robotic assistant according to one embodiment.

FIG. 38 is a flowchart illustrating a method of controlling the robotic assistant 100 according to one embodiment, which includes the following steps.

Step S601: Create an environment map based on at least one sensor at least according to movement of the wheeled base 10. In one embodiment, the environment map may be created using simultaneous localization and mapping (SLAM). SLAM achieves the purpose of simultaneous positioning and map construction based on self-perception. SLAM may combine data from various sensors to simultaneously compute position and construct a map. Starting from the unknown location of the unknown environment, the robotic assistant 100 locates its own position and orientation through repeated observation of environmental features in the movement process, and then builds an incremental map of the surrounding environment according to its own position, so as to achieve the purpose of simultaneous positioning and map construction. Two common SLAM approaches include visual SLAM and LiDAR-based SLAM. In one embodiment, the environment map may be created using the LiDAR-based SLAM that combines data from the LiDAR sensor 63 and the IMU sensor 66. In another embodiment, the environment map may be created using the visual SLAM that combines data from the camera 62 and the IMU sensor 66. However, other types of SLAM approaches may be employed to simultaneously compute position and construct a map.

Step S602: Determine a current location of the robotic assistant 100 in the environment map. In one embodiment, the real-time orientation and position of the robotic assistant 100 may be determined using the LiDAR-based SLAM. In another embodiment, the real-time orientation and position of the robotic assistant 100 may be determined using the visual SLAM. In one embodiment, after the environment map has been created, the real-time orientation and position of the robotic assistant 100 in the previously created environment map may be determined by using Adaptive Monte Carlo Localization (AMCL). Specifically, given a map of the environment, the AMCL algorithm uses a particle filter to represent the distribution of likely states, with each particle representing a possible state, i.e., a hypothesis of where the robotic assistant 100 is. The algorithm typically starts with a uniform random distribution of particles over the configuration space, meaning the robotic assistant 100 has no information about where it is and assumes it is equally likely to be at any point in space. Whenever the robotic assistant 100 moves, it shifts the particles to predict its new state after the movement. Whenever the robotic assistant 100 senses something, the particles are resampled based on recursive Bayesian estimation, i.e., how well the actual sensed data correlate with the predicted state. Ultimately, the particles should converge towards the actual position of the robotic assistant 100.

Step S603: Direct the robotic assistant 100 to avoid obstacles during movement of the robotic assistant 100 along a determined path. In one embodiment, A-star algorithm may be used to determine a collision-free path for the robotic assistant 100. The purpose of A-star algorithm is to avoid collisions with obstacles, and deals with moving the robotic assistant 100 based on the feedback information from sensors (e.g. LiDAR sensor 63, NU sensors 66, camera 62). The A-star algorithm may modify the trajectory of the robotic assistant 100 in real time so the robotic assistant 100 can avoid collisions with dynamic obstacles found on its path. For its map representation A-star algorithm utilizes a grid-based search area divided into squares. Each square can be either a free space or an obstacle. In order to find the shortest path a collision free trajectory is calculated comprised of free space squares (also called nodes). To find the shortest path to the goal the A-star algorithm uses heuristic approach. A-star algorithm first adds its starting node A to OPEN set of free space nodes comprising a possible path. The next step is to look for free space nodes around node A and add them to its list and set node A as their parent node. The next step is to add node A to a CLOSED set and delete it from the OPEN set. The next node to be processed is determined by its minimum cost F towards the goal. The lowest cost F=G+H, where G is the cost for getting to the next node, and H is the estimated distance to the goal point. A-star algorithm provides efficient and complete path finding. However, other obstacle avoidance algorithms may be used to determine a collision-free path for the robotic assistant 100.

In one embodiment, the Dijkstra's algorithm may be used to determine a collision-free path for the robotic assistant 100. The Dijkstra's algorithm is a graph search algorithm that solves the single-source shortest path problem for a graph with non-negative edge path costs, producing a shortest path tree. For a given source vertex (node) in the graph, the algorithm finds the path with lowest cost (i.e. the shortest path) between that vertex and every other vertex. Specifically, let the distance of node Y be the distance from an initial node to Y. Dijkstra's algorithm will assign some initial distance values and will try to improve them step by step. Step 1: Assign to every node a tentative distance value: set it to zero for the initial node and to infinity for all other nodes. Step 2: Mark all nodes unvisited. Set the initial node as current. Create a set of the unvisited nodes called the unvisited set consisting of all the nodes. Step 3: For the current node, consider all of its unvisited neighbors and calculate their tentative distances. For example, if the current node A is marked with a distance of 6, and the edge connecting it with a neighbor B has length 2, then the distance to B (through A) will be 6+2=8. If this distance is less than the previously recorded tentative distance of B, then overwrite that distance. Even though a neighbor has been examined, it is not marked as "visited" at this time, and it remains in the unvisited set. Step 4: When all of the neighbors of the current node have been considered, mark the current node as visited and remove it from the unvisited set. A visited node will never be checked again. Step 5: If the destination node has been marked visited (when planning a route between two specific nodes) or if the smallest tentative distance among the nodes in the unvisited set is infinity (when planning a complete traversal; occurs when there is no connection between the initial node and remaining unvisited nodes), then stop. The algorithm has finished. Step 6: Select the unvisited node that is marked with the smallest tentative distance, and set it as the new "current node" then go back to step 3. The Dijkstra's algorithm may modify the trajectory of the robotic assistant 100 in real time so the robotic assistant 100 can avoid collisions with dynamic obstacles found on its path.

During the movement of the robotic assistant 100 from one location (e.g. the starting location) to another location (e.g. the target location) along the planned path, a trajectory tracking control may be performed to control the robotic assistant 100 to track the planned path. In one embodiment, the trajectory tracking control may be performed using a nonlinear proportional integral derivative (PID) based kinematic controller. PWM signals are generated according to the input PWM values and are fed into the motor controllers of the base motors 1101 so as to drive the base motors 1101. It should be noted that many approaches have been proposed for the trajectory tracking control of wheeled robots using a PID-based kinematic controller, and may be employed to perform the trajectory tracking control for the robotic assistant 100.

Figure 40A:
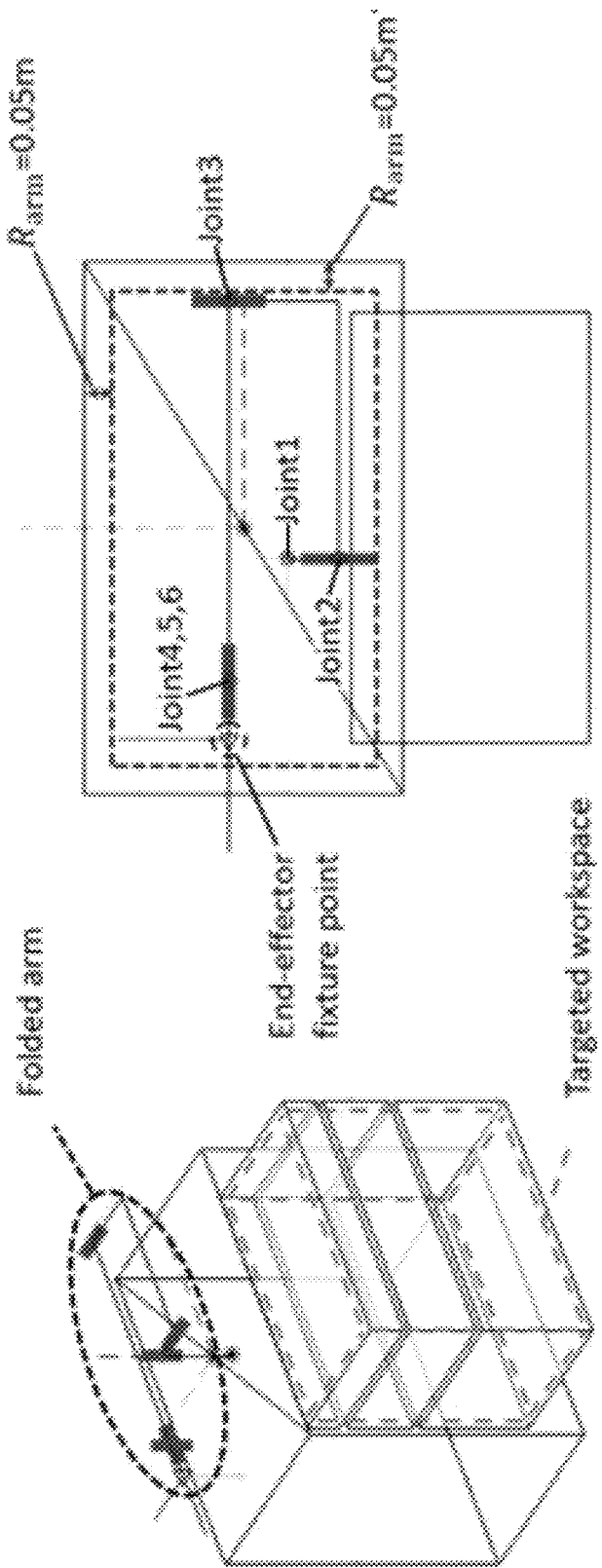
FIG. 40A is a schematic diagram showing configuration and boundary of the foldable arm.
Figure 40B:
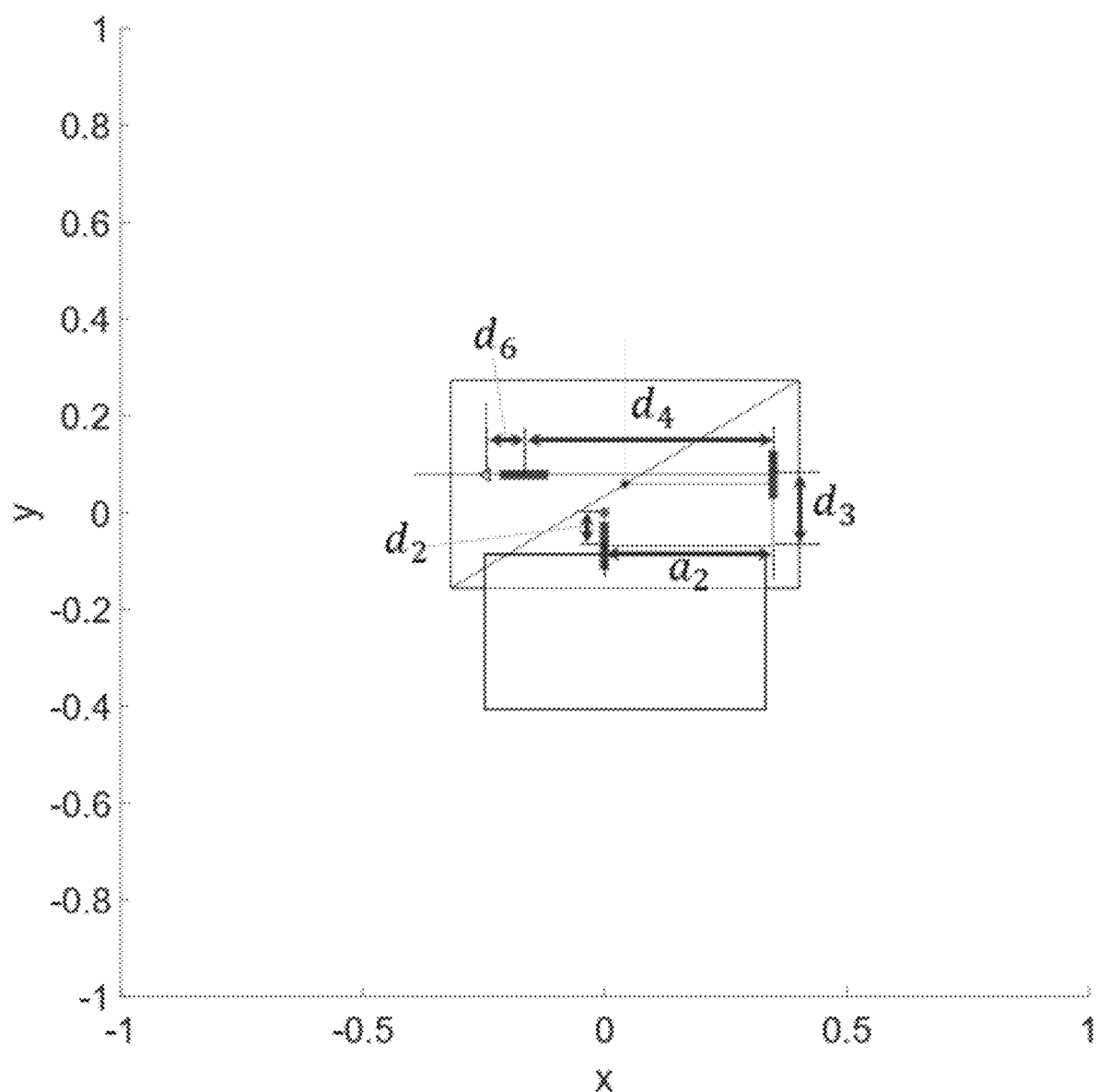
FIG. 40B is a top view of a schematic diagram showing configuration of the foldable arm.
Figure 40C:
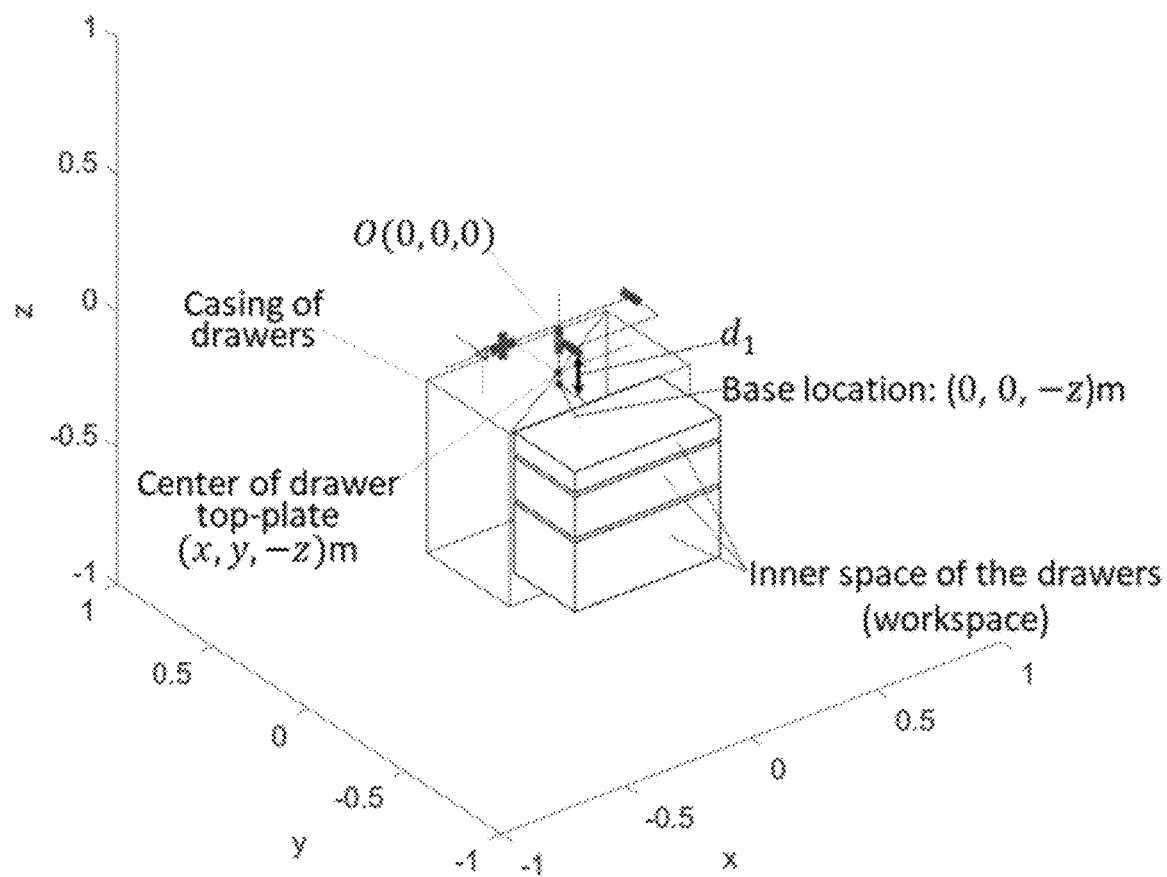
FIG. 40C is a schematic diagram showing configuration of the foldable arm.

With reference to FIGS. 40A to 40C, a kinematics model of the foldable arm 30a in FIG. 1A is created. In one embodiment, the kinematics model may be used to optimize the Denavit-Hartenberg (DH) parameters of the foldable arm 30a such that the foldable arm 30a can have a maximum reachability to one or more workspaces within the drawers 21. Specifically, the joint 1 represents a revolute joint that drives a first link 31a of the foldable arm 30a to rotate about a first, vertical axis. The joint 2 represents a revolute joint that drives a second link 32a to rotate with respect to the first link 31a about a second axis that is substantially perpendicular to the first axis. The joint 3 represents a revolute joint that drives a third link 33a to rotate with respect to the second link 32a about a third axis that is substantially parallel to the second axis. The joints 4, 5 and 6 represent the revolute joints that drive the fourth link 34a to rotate with respect to the third link 33a, drive the fifth link 35a to rotate with respect to the fourth link 34a, and drive the sixth link 36a to rotate with respect to the fifth link 35a, respectively. The joints 1 to 6 are arranged based on the foldable arm 30a in the flat state as shown in FIG. 1A.

FIG. 40A is a schematic diagram showing configuration and boundary of the foldable arm, which shows one kind of optimization problem for the workspace. In one embodiment, a base coordinate system is established, with the center of the joint 1 being the origin, the lengthwise direction of the drawer mechanism 20 as the X axis, the widthwise direction of the drawer mechanism 20 as the Y axis, and the heightwise direction of the drawer mechanism 20 as the Z axis. The coordinates of the center of the top plate of the drawer mechanism 20 is (x, y, −z), where x, y and z are greater than zero. The projections of the joints 1-6 onto the X-Y plane are shown in FIG. 40B. The projection of the joint 1 onto the X-Y plane is a point that coincides with the origin of the base coordinate system. The projection of the joint 2 onto the X-Y plane is a line segment that lies on the X axis. The projection of the joint 3 onto the X-Y plane is a line segment that is perpendicular to the projection of joint 2. The projections of the joints 4 to 6 onto the X-Y plane are represented by a line segment that is parallel to the projection of the projection of joint 2.

The following parameters can be defined after the kinematics model of the foldable arm 30a and the base coordinate system are created. Specifically, d1 is the distance between the joint 2 and the top plate of the drawer mechanism 20. d2 is the distance between the center of the projection of the joint 2 and the origin of the base coordinate system. a2 equals to the length of the projection of the line segment, starting at the center of the joint 2 and ending at the center of the joint 3, onto the X axis. d3 equals to the length of the projection of the line segment, starting at the center of the joint 2 and ending at the center of the joint 3, onto the Y axis. d4 is the distance between the centers of the projections of the joints 3 to 6.

Figure 39:
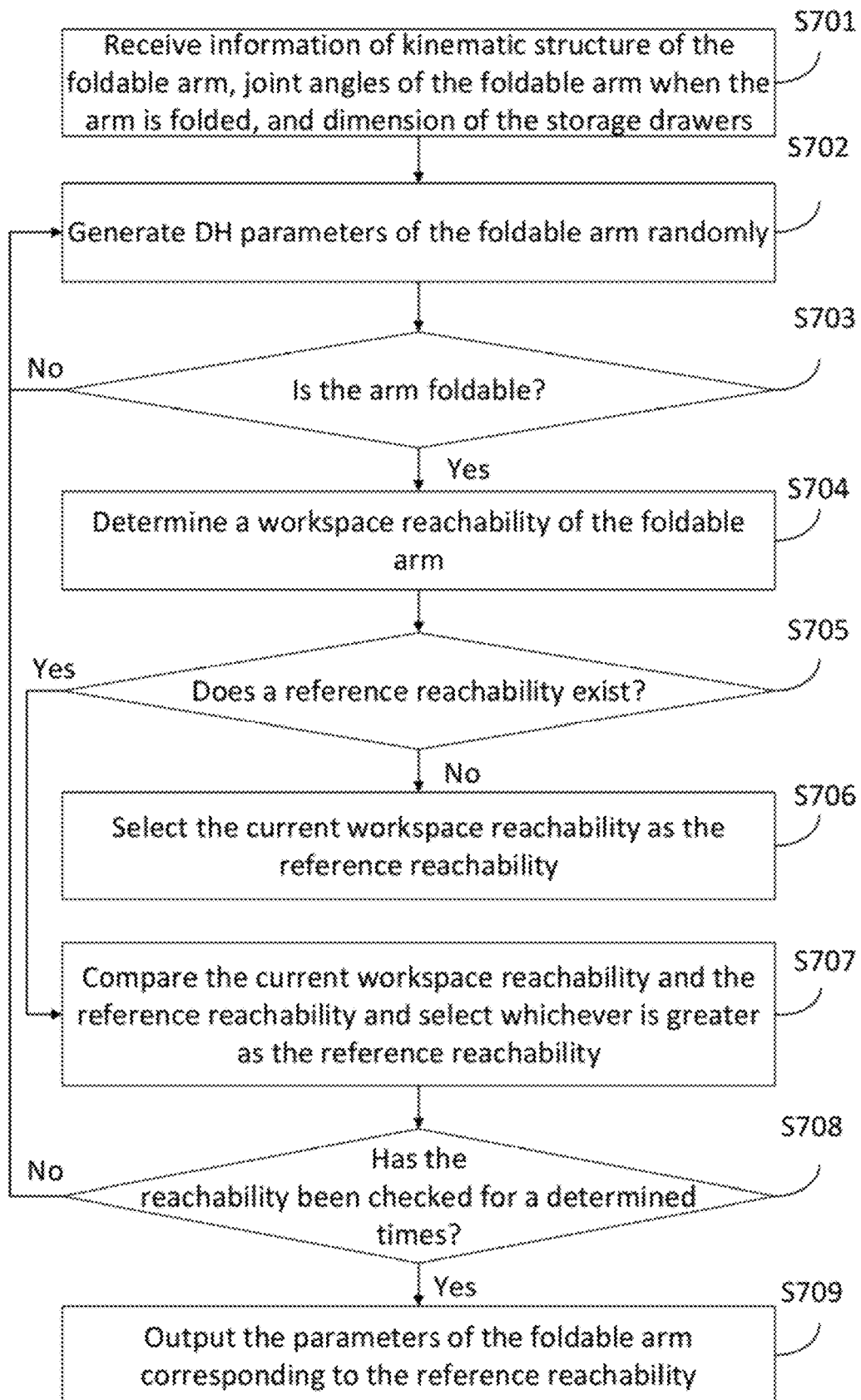
FIG. 39 is a schematic flowchart of a method for determining parameters of the foldable arm.

FIG. 39 is a flowchart illustrating a method for determining parameters of the foldable arm 30a according to one embodiment. The method may include the following steps. Step S701: Receive information of kinematic structure of the foldable arm 30a, joint angles of the foldable arm 30a when the foldable arm 30a is folded, dimension of the drawers 21, and outer envelope of the foldable arm 30a. The information includes the information associated with the kinematic structure of the foldable arm 30a described above. The joint angles of the foldable arm 30a refer to the angles of the revolute joints of the foldable arm 30a when the foldable arm 30a is in the folded, flat state as shown in FIG. 1A. The dimension of the drawers 21 includes the width, the length, and the depth of the drawers 21.

Step S702: Generate the DH parameters of the foldable arm 30a randomly. In one embodiment, the parameters may include the coordinates x and y of the center of the top plate of the drawer mechanism 20, and distances d1, d2, a2, d3, d4, and d6, where d6 is the distance between the center of the projection of the joints 4 to 6 and a center of the EOAT 50. Random values will be generated and assigned to these parameters.

Step S703: Determine if the foldable arm 30a is foldable inside the boundary of the top plate of the drawer mechanism 20. After random values have been assigned to x, y, d1, d2, a2, d3, d4, and d6, it can determine if there exists a point of the joints 1 to 6 and the EOAT 50 that falls out of a predetermined area, based on the information received at the Step S701. If so, the foldable arm 30a cannot be folded inside the boundary of the top plate of the drawer mechanism 20 due to collision with the arm guard 281, and the process goes back to Step S702. Otherwise, the process goes to Step S703. The predetermined area is a rectangular area smaller than the top plate of the drawer mechanism 20. For example, if the maximum radius of each link of the foldable arm 30a is not greater than 0.05 m, the distance between the long sides of the predetermined area and the long sides of the top plate of the drawer mechanism 20 is not less than 0.05 m, and the same applies to the distance between the short sides of the predetermined area and the top plate of the drawer mechanism 20. In addition, the size of the EOAT 50 may also be a factor to determine the predetermined area.

Step S704: Determine a workspace reachability of the foldable arm 30a to the drawers 21. The workspace reachability here refers to the ratio of the volume within the drawers 21 that the EOAT 50 can reach to the total volume of the space within the drawers 21. The workspace reachability can be used to evaluate if kinematic configuration of the foldable arm 30a is sufficient for required tasks. Many approaches have been proposed to determine the reachable workspace that a robotic EOAT can reach.

For example, one approach uses direct kinematics-based algorithms to compute the reachable workspace points. Specifically, in this approach, a redundant robot manipulator is modeled as a series of links connected with either revolute or prismatic joints. It is assumed without loss of generality that each joint has one degree of freedom. A joint with m degrees of freedom is modeled as m joints connected with links of zero lengths. A coordinate frame is attached to each link in order to describe the relationship between two consecutive links. A homogeneous matrix Ai is used in order to describe the relationship between consecutive frames. The elements of matrix A are computed by using Denavit-Hartenberg notations for both prismatic and revolute joints. The Denavit-Hartenberg (DH) convention is used to assign coordinate frames to each joint of a robot manipulator in a simplified and consistent fashion. The transformation matrix A for a revolute joint is:

$$A_i = Rot_{x,\theta_i} Trans_{x,d_i} Trans_{x,a_i} Rot_{x,\alpha_i} = \begin{vmatrix} c_{\theta_i} & -s_{\theta_i} c_{\alpha_i} & s_{\theta_i} s_{\alpha_i} & a_i c_\theta \\ s_{\theta_i} & c_{\theta_i} c_{\alpha_i} & -c_{\theta_i} c_{\alpha_i} & a_i s_\theta \\ 0 & s_{\alpha_i} & c_{\alpha_i} & d_i \\ 0 & 0 & 0 & 1 \end{vmatrix}$$

where the four quantities θi, ai, di, αi are parameters associated with link i and joint i. The four parameters ai, αi, di, and θi in are generally given the names link length, link twist, link offset, and joint angle, respectively. The DH convention for a robot manipulator is well known and will not be described in detail here. In the case of a revolute joint, $\theta_i$, is called the joint variable and the other three fixed quantities ($d_i$, $a_i$, $\alpha_i$) are called the link parameters.

The description of the end effector with respect to the base, denoted by Tn, is given by $Tn=A_1A_2\ldots A_{n-1}A_n$. The computational cost of computing each point is $\theta(n)$, where n is the number of degrees of freedom that are associated with joints in the path from the end effector to the proximal linkage. Workspace points that are computed by direct kinematics don't necessarily lie on the surface boundary. An edge detection algorithm can be used to obtain the workspace boundary as well as the holes and the voids that are buried inside the reachable workspace. This can be achieved by computing the dimensions of the cube that encompasses the workspace points. This cube is divided into cells according to the required resolution of the application. If the cell contains a workspace point, it is marked with one and zero if it does not contain a reachable point. A workspace cell is considered a boundary cell if any of its neighbors is marked with zero. The matrix Tn is squared matrix with dimension 4×4. The first, second and third element in last column of this matrix are the x-coordinate, y-coordinate, and z-coordinate of the position of the end-effector in the base coordinate system. With such an approach, the points that are located within the drawers and can be reached by the EOAT 50 can be determined. The workspace reachability to the drawers 21 can thus be determined. That is, the ratio of the volume occupied by these points to the total volume of the space within the drawers 21 can be determined.

Figure 40D:
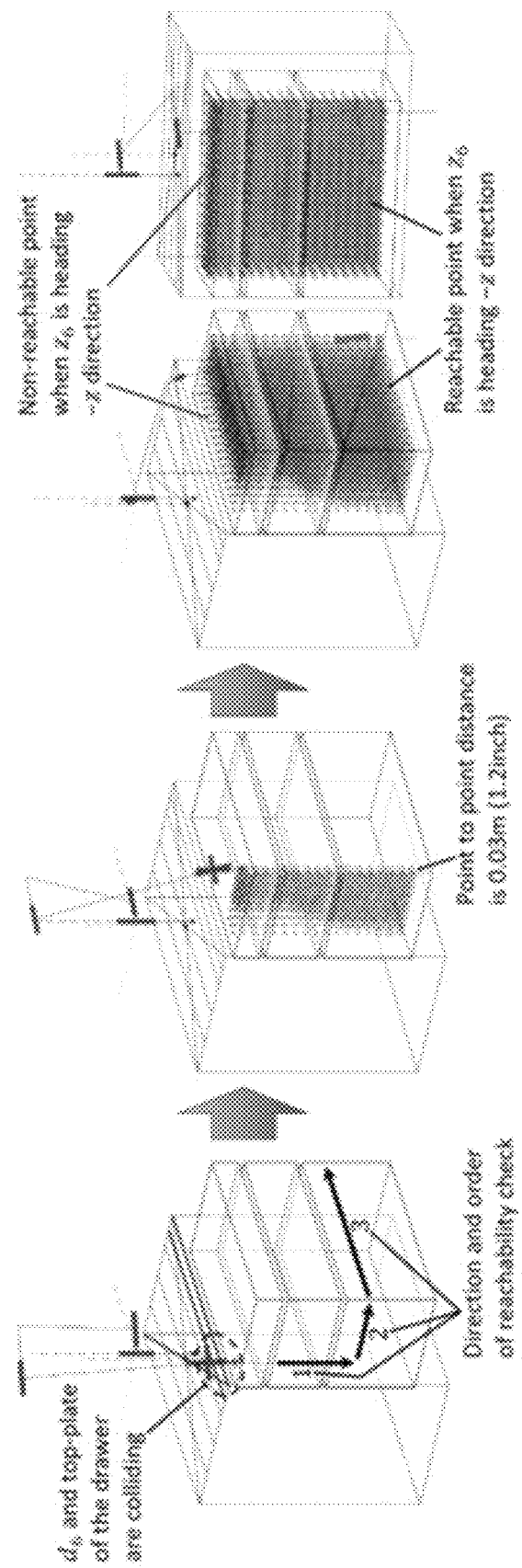
FIG. 40D is a schematic diagram showing in what order the reachability of points within the drawers are determined.

In another embodiment, inverse kinematics may be used to compute the reachable workspace. Specifically, inverse kinematics is the mathematical process of calculating the variable joint parameters needed to place the end effector of a robot manipulator in a given position and orientation. For a given position, if there exists one or multiple solutions for the joint parameters, then the given position is a reachable position. As shown in FIG. 40D, a three-dimensional grid of points within the drawers will be checked to determine which of these points are reachable to the EOAT of the foldable arm. For the position of each of these points, a calculation will be performed using inverse kinematics expressions to determine if there exists one or multiple solutions for the joint parameters that enable the EOAT 50 to reach the point. The points can be checked in a predetermined order. For example, the points can be seen as being located on a number of parallel planes, and all the points on a first plane will be checked first, and then all the points on the second plane until all the points on the last plane. With such an approach, the points that located within the drawers 21 and can be reached by the EOAT 50 can be determined. The workspace reachability to the drawers 21 can thus be determined. That is, the ratio of the volume occupied by these points to the total volume of the space within the drawers 21 can be determined.

Step S705: Determine if a reference reachability exits. If the reference reachability exits, the process goes to Step S707, otherwise, the process goes to Step S706.

Step S706: Select the current workspace reachability as the reference reachability.

Step S707: Compare the current workspace reachability with the reference reachability and select whichever is greater as the reference reachability.

Step S708: Determine if the determination of the workspace reachability of Step S704 has reached predetermined times? If the determination of the workspace reachability of Step S704 has reached predetermined times, the process goes to Step S709, otherwise, the process goes back to Step S702. In one embodiment, the value of the predetermined times may be set to 1000.

Step S709: Output the parameters of the foldable arm 30a corresponding to the reference reachability.

In one embodiment, when the determination of the workspace reachability of Step S704 has not reached predetermined times, then determine if the times of the determination of the workspace reachability of Step S704 is greater than a preset value (e.g. 10). If so, the process goes to Step S710, otherwise, the process goes back to Step S702.

Step S710: Generate parameters of the foldable arm 30a by randomly changing each of the parameters of the foldable arm 30a associated with the reference reachability by ±n %, where n is greater than zero. The process then goes back to Step S703.

The parameters determined according to the method of FIG. 39 enables the foldable arm 30a to have a satisfactory workspace reachability to the drawers 21, such that the EOAT 50 can reach almost any position within the drawers 21.

Figure 41A:
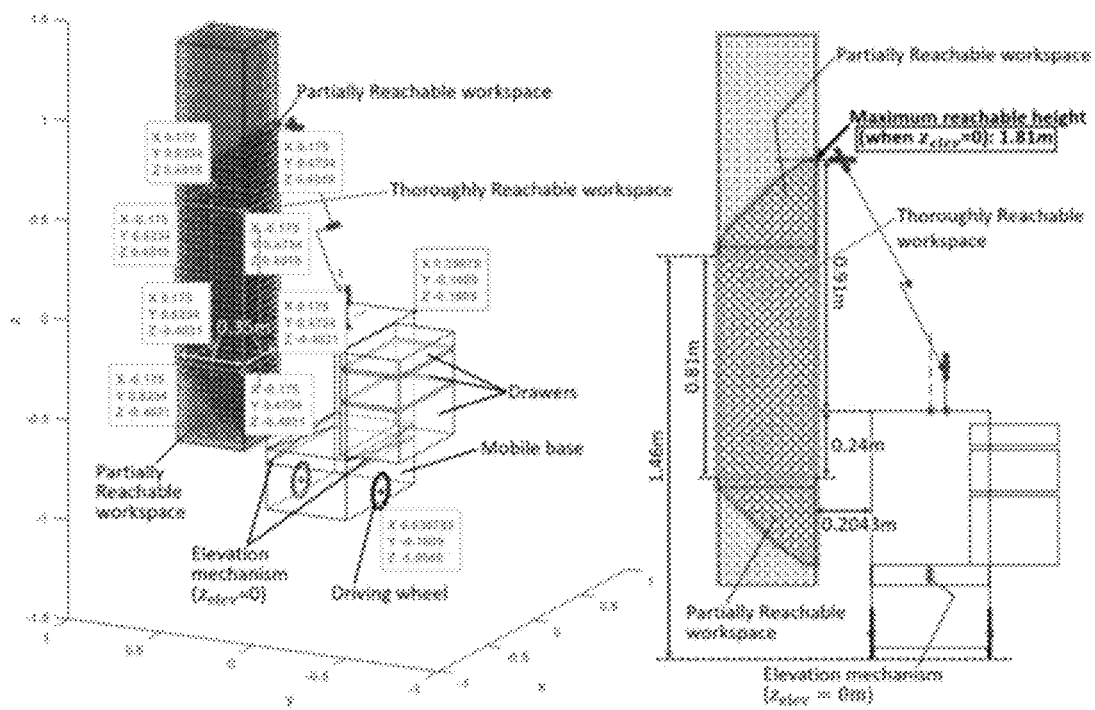
FIGS. 41A and 41B are schematic diagrams showing the reachable workspace for the foldable arm within/on a shelf when an elevation mechanism is at different heights.
Figure 41B:
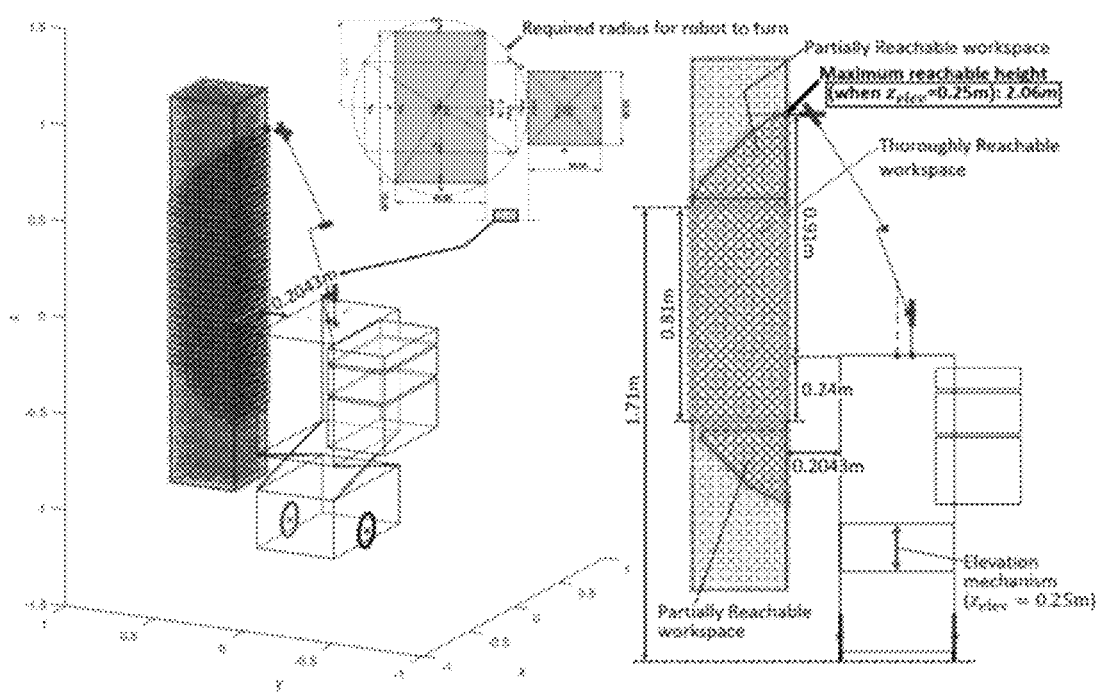

With reference to FIGS. 41A and 41B, after the parameters of the foldable arm 30a has been determined according to the method of FIG. 39, the workspace reachability of the foldable arm 30a within/on a shelf may also be evaluated. In one embodiment, the width and depth of the of the shelf is assumed to be 0.35 m which is half of the width of the drawers 21. The distance from the back of drawer mechanism 20 to the shelf may be set to 0.21 m which is the radius required for robotic assistant 100 to turn 90 degrees. The workspace reachability to the shelf may be determined in a way the same or similar to the workspace reachability to the drawers 21 as described above. As shown in FIGS. 40A and 40B, with the aid of the elevation mechanism, most of the positions within the shelf are reachable by the foldable arm 30a. The reachable workspace includes thoroughly reachable workspace, a lower partially reachable workspace and an upper partially reachable workspace as indicated in FIGS. 40A and 40B.

It should be appreciated the above disclosure detailed several embodiments of the robotic assistant 100 performing logistics and other tasks. As mentioned above, the robotic assistant 100 can be employed in assisted living facilities or healthcare facilities to provide an unsupervised end-to-end logistics solution. However, the disclosure is not limited thereto. In other exemplary usage scenarios, the robotic assistant 100 may be used in schools, offices, or warehouses, etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A robotic assistant, comprising:
a wheeled base;
a storage unit comprising one or more drawers;
a foldable arm comprising an end of arm tooling (EOAT) connected to a distal end of the foldable arm, the foldable arm connected to a top of the storage unit;

an elevation mechanism positioned on the wheeled base, the elevation mechanism configured to move the storage unit up and down; and a control system that receives command instructions, wherein in response to the command instructions, the control system is configured to move the wheeled base, open or close the one or more drawers, actuate movement of the foldable arm and the EOAT to pick up and place external objects from/to a determined location, and control the storage unit to actuate the one or more drawers.

2. The robotic assistant according to claim 1, wherein the elevation mechanism comprises an actuator and a lifting mechanism, wherein the lifting mechanism is connected to the storage unit and the wheeled base, and wherein the actuator is fixed to the wheeled base and configured to drive the lifting mechanism to elongate or retract in a vertical direction.

3. The robotic assistant according to claim 1, wherein the storage unit comprises a housing, and one or more driving devices configured to drive the one or more drawers to slide to an open position and a closed position with respect to the housing.

4. The robotic assistant according to claim 1, wherein the foldable arm comprises N links, M first revolute joints, and a second revolute joint, the N links are rotatably connected to one another, in series, through the M first revolute joints, and a first of the N links is rotatably connected to a top of the storage unit through the second revolute joint, where N is a natural number greater than two, and N=M+1.

5. The robotic assistant according to claim 4, further comprising a camera configured to detect objects, wherein the control system directs the foldable arm to be in a determined orientation and/or position by articulation of one or more of the N revolute joints and N links, and directs the EOAT to pick up and place external objects from/to the one or more drawers based on output from the camera according to the command instructions.

6. The robotic assistant according to claim 5, wherein the camera is disposed on the foldable arm adjacent to the EOAT or disposed on/in the EOAT.

7. The robotic assistant according to claim 1, further comprising an arm guard to protect the foldable arm, wherein the arm guard is stationary or retractable.

8. The robotic assistant according to claim 2, wherein the actuator is a linear actuator configured to apply a pushing force or a pulling force to the lifting mechanism to drive the lifting mechanism to elongate or retract in the vertical direction.

9. The robotic assistant according to claim 1, further comprising a plurality of actuated feet connected to the wheeled base, wherein the control system directs the actuated feet to move down to be in contact with a surface.

10. The robotic assistant according to claim 1, wherein the foldable arm is configured to fold in a substantially flat state on the top of the storage unit.

11. A robotic assistant, comprising:
a wheeled base;
a drawer mechanism comprising one or more drawers;
a foldable arm connected to a top of the drawer mechanism, the foldable arm comprising an end of arm tooling (EOAT), wherein in response to a command instruction, the EOAT is configured to pick up and place external objects from/to a determined location via actuation of the foldable arm; and
an elevation mechanism positioned on the wheeled base, the elevation mechanism configured to move one or more drawers up and down.

12. The robotic assistant according to claim 11, wherein the determined location is a location within the one or more drawers when fully opened.

13. The robotic assistant according to claim 11, wherein the elevation mechanism comprises an actuator and a lifting mechanism, wherein the lifting mechanism is connected to the drawer mechanism and the wheeled base, and wherein the actuator is fixed to the wheeled base and configured to drive the lifting mechanism to elongate or retract in a vertical direction.

14. The robotic assistant according to claim 11, wherein the drawer mechanism comprises a housing, and one or more driving devices configured to drive the one or more drawers to slide to an open position and a closed position with respect to the housing.

15. The robotic assistant according to claim 11, wherein the foldable arm comprises N links, M first revolute joints, and a second revolute joint, the N links are rotatably connected to one another, in series, through the M first revolute joints, and a first of the N links is rotatably connected to the drawer mechanism through the second revolute joint, where N is a natural number greater than two, and N=M+1.

16. The robotic assistant according to claim 15, further comprising a camera configured to detect objects, wherein a control system directs the foldable arm to be in a determined orientation and/or position by articulation of one or more of the N revolute joints and N links, and directs the EOAT to pick up and place external objects from/to the one or more drawers based on output from the camera according to the command instructions.

17. The robotic assistant according to claim 16, wherein the camera is disposed on the foldable arm adjacent to the EOAT or disposed on/in the EOAT.

18. The robotic assistant according to claim 11, wherein the foldable arm is configured to fold in a substantially flat state on the top of the drawer mechanism.

19. A robotic assistant, comprising:
a wheeled base;
a storage unit;
a foldable arm comprising an end of arm tooling (EOAT) connected to a distal end of the foldable arm, the foldable arm connected to a top of the storage unit, wherein the EOAT is configured to pick up and place external objects from/to a determined location via actuation of the foldable arm; and
an elevation mechanism positioned on the wheeled base, the elevation mechanism configured to move one or more drawers up and down.

20. The robotic assistant according to claim 19, wherein the elevation mechanism comprises an actuator and a lifting mechanism, wherein the lifting mechanism is connected to the storage unit and the wheeled base, and wherein the actuator is fixed to the wheeled base and configured to drive the lifting mechanism to elongate or retract in a vertical direction.

\* \* \* \* \*